(12) United States Patent
Richardson et al.

(10) Patent No.: US 12,731,773 B2
(45) **Date of Patent: *Sep. 8, 2026**

(54) USER INTERFACE FOR ION MOBILITY SEPARATION DEVICE

(71) Applicant: Micromass UK Limited, Wilmslow (GB)

(72) Inventors: Sandra Richardson, New Mills (GB); Keith George Richardson, High Peak (GB); Kevin Giles, Marple (GB); Jakub Ujma, Manchester (GB)

(73) Assignee: Micromass UK Limited, Wilmslow (GB)

(*) Notice: Subject to any disclaimer, the term of this patent is extended or adjusted under 35 U.S.C. 154(b) by 1119 days.

This patent is subject to a terminal disclaimer.

(21) Appl. No.: 17/843,402

(22) Filed: Jun. 17, 2022

(65) Prior Publication Data

US 2022/0392755 A1 Dec. 8, 2022

Related U.S. Application Data

(63) Continuation of application No. 16/522,366, filed on Jul. 25, 2019, now Pat. No. 11,398,373.

(60) Provisional application No. 62/703,233, filed on Jul. 25, 2018.

(51) Int. Cl.

| | |
|---|---|
| ***H01J 49/00*** | (2006.01) |
| ***G01N 27/623*** | (2021.01) |
| ***G01N 30/72*** | (2006.01) |
| ***G06F 3/0482*** | (2013.01) |
| ***G06F 3/0484*** | (2022.01) |

(52) U.S. Cl.

CPC ........ *H01J 49/0027* (2013.01); *G01N 27/623* (2021.01); *G06F 3/0482* (2013.01); *G06F 3/0484* (2013.01); *G01N 30/7206* (2013.01); *G01N 30/7233* (2013.01)

(58) Field of Classification Search

None

See application file for complete search history.

(56) References Cited

U.S. PATENT DOCUMENTS 11,398,373 B2 * 7/2022 Richardson .......... G01N 27/623

FOREIGN PATENT DOCUMENTS

EP 2860519 A1 * 4/2015 .............. H01J 49/04

* cited by examiner

*Primary Examiner* — Andrew Smyth

(74) *Attorney, Agent, or Firm* — Goodwin Procter LLP

(57) ABSTRACT

A method of controlling the operation of an ion mobility separation device is disclosed. The method comprises displaying to a user via a user interface a pool of modes of operation of the ion mobility separation device, wherein each one of the modes is selectable by the user for inclusion in an experiment, and the modes are displayed in a first area 202 of the user interface. The method comprises receiving, via the user interface, an indication from the user of a selection of one or more instance of each one of a plurality of the modes from the pool to be included in an experiment, and an indication from the user of a set of one or more parameters for controlling the ion mobility separation device in respect of one or more selected instances of a mode. The selected instances of modes are displayed in a sequence in a second area 204 of the user interface. The operation of the ion mobility separation device is controlled in accordance with the received indications.

19 Claims, 26 Drawing Sheets

14
2
14
4
12
10
12

14
4
2
12

4
2
2
32
30
32

32
2
4
32
2

48
58
46
56
4
2
54
44
52
10
42
50
40

2
4
10
40
42
44
46
48
50
52
54
56
58

2
4
10
40
42
44
46
48
50
52
54
56
58
60

10
2
4
40
42
44
46
48
50
52
54
56
58

62

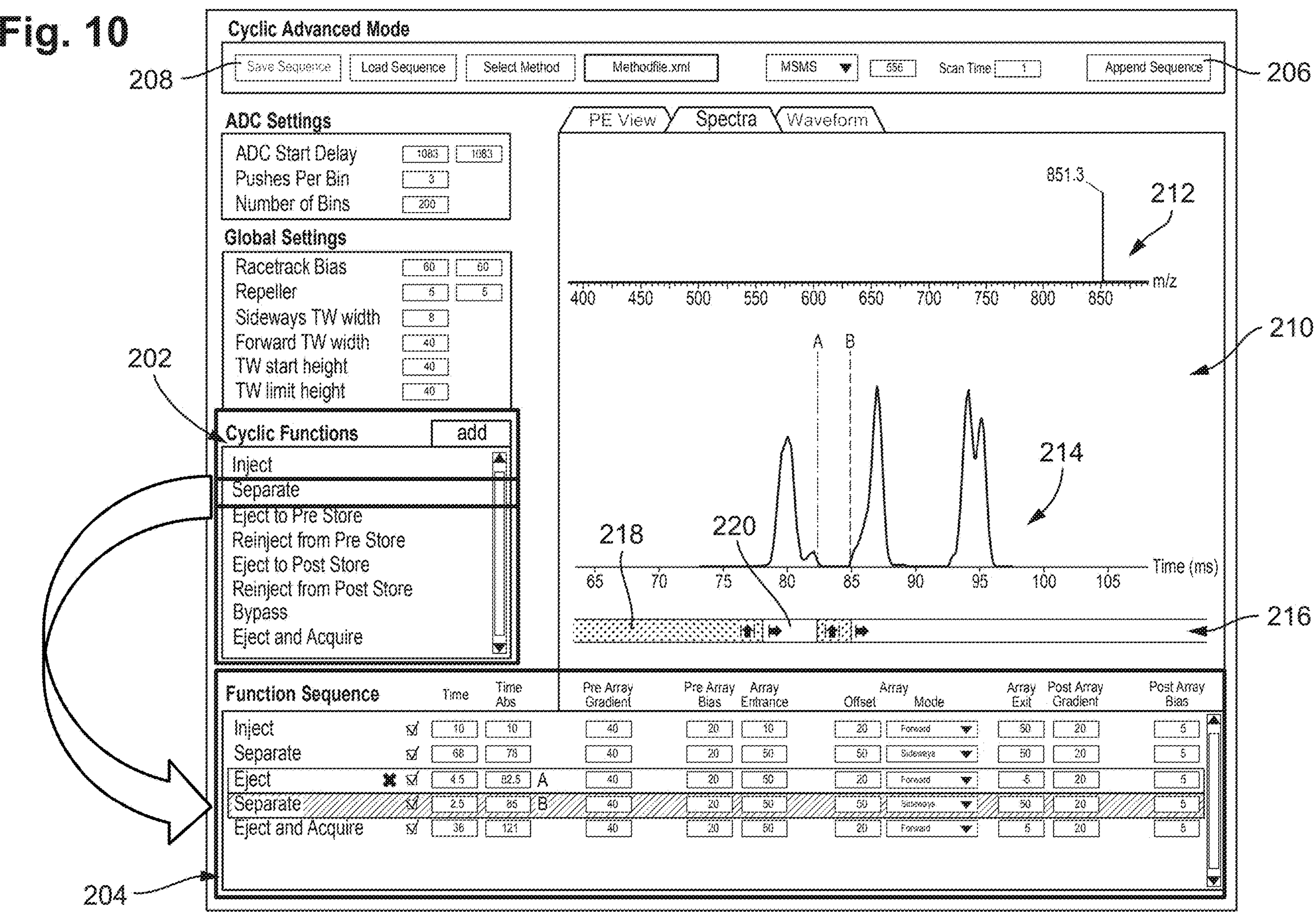
Fig. 10
Cyclic Advanced Mode
Save Sequence
Load Sequence
Select Method
Methodfile.xml
MSMS
556
Scan Time
1
Append Sequence
ADC Settings
ADC Start Delay
Pushes Per Bin
Number of Bins
Global Settings
Racetrack Bias
Repeller
Sideways TW width
Forward TW width
TW start height
TW limit height
Cyclic Functions
add
Inject
Separate
Eject to Pre Store
Reinject from Pre Store
Eject to Post Store
Reinject from Post Store
Bypass
Eject and Acquire
PE View
Spectra
Waveform
851.3
m/z
A
B
Time (ms)
Function Sequence
Time
Time Abs
Pre Array Gradient
Pre Array Bias
Array Entrance
Array Offset
Array Mode
Array Exit
Post Array Gradient
Post Array Bias
Inject
Separate
Eject
Separate
Eject and Acquire
206
208
210
212
214
216
218
220
202
204

Measured Time
Bar Chart (Dead Time Corrected)
Bar Chart (Absolute Time)
70
80
90
100
$t_{dead}$

Figure 23:
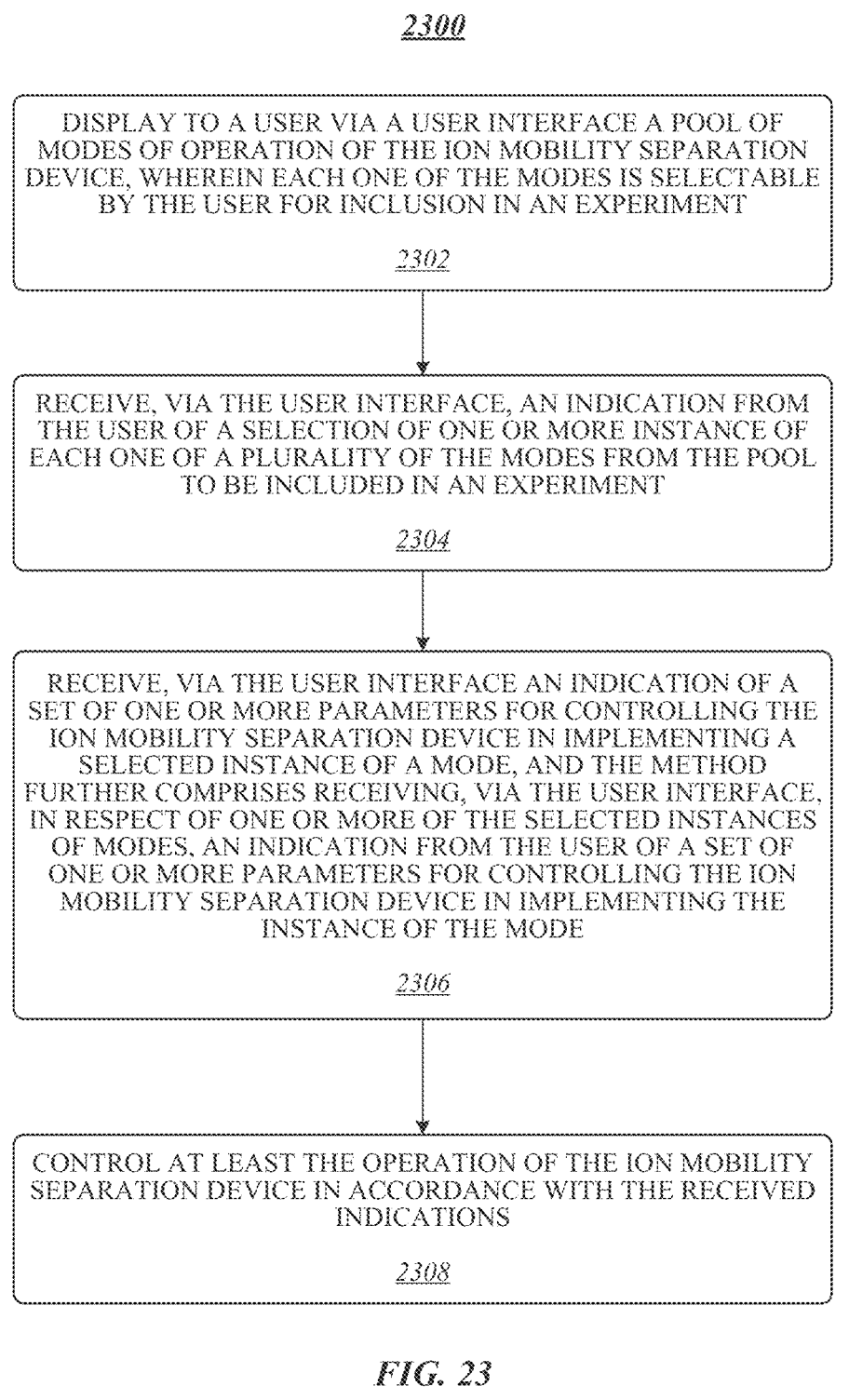

2300

DISPLAY TO A USER VIA A USER INTERFACE A POOL OF MODES OF OPERATION OF THE ION MOBILITY SEPARATION DEVICE, WHEREIN EACH ONE OF THE MODES IS SELECTABLE BY THE USER FOR INCLUSION IN AN EXPERIMENT

2302

RECEIVE, VIA THE USER INTERFACE, AN INDICATION FROM THE USER OF A SELECTION OF ONE OR MORE INSTANCE OF EACH ONE OF A PLURALITY OF THE MODES FROM THE POOL TO BE INCLUDED IN AN EXPERIMENT

2304

RECEIVE, VIA THE USER INTERFACE AN INDICATION OF A SET OF ONE OR MORE PARAMETERS FOR CONTROLLING THE ION MOBILITY SEPARATION DEVICE IN IMPLEMENTING A SELECTED INSTANCE OF A MODE, AND THE METHOD FURTHER COMPRISES RECEIVING, VIA THE USER INTERFACE, IN RESPECT OF ONE OR MORE OF THE SELECTED INSTANCES OF MODES, AN INDICATION FROM THE USER OF A SET OF ONE OR MORE PARAMETERS FOR CONTROLLING THE ION MOBILITY SEPARATION DEVICE IN IMPLEMENTING THE INSTANCE OF THE MODE

2306

CONTROL AT LEAST THE OPERATION OF THE ION MOBILITY SEPARATION DEVICE IN ACCORDANCE WITH THE RECEIVED INDICATIONS

Figure 24:
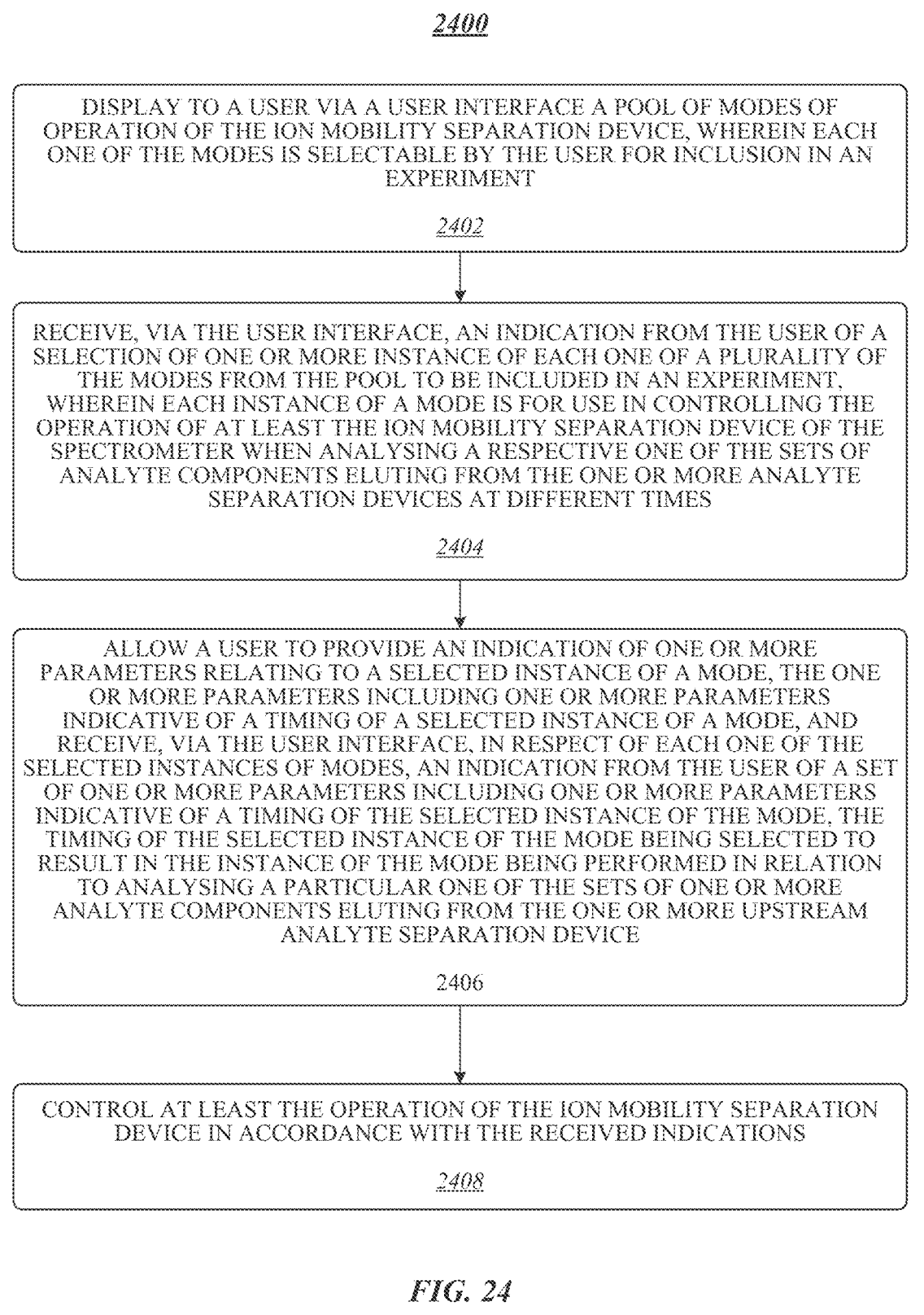

DISPLAY TO A USER VIA A USER INTERFACE A POOL OF MODES OF OPERATION OF THE ION MOBILITY SEPARATION DEVICE, WHEREIN EACH ONE OF THE MODES IS SELECTABLE BY THE USER FOR INCLUSION IN AN EXPERIMENT

2402

RECEIVE, VIA THE USER INTERFACE, AN INDICATION FROM THE USER OF A SELECTION OF ONE OR MORE INSTANCE OF EACH ONE OF A PLURALITY OF THE MODES FROM THE POOL TO BE INCLUDED IN AN EXPERIMENT, WHEREIN EACH INSTANCE OF A MODE IS FOR USE IN CONTROLLING THE OPERATION OF AT LEAST THE ION MOBILITY SEPARATION DEVICE OF THE SPECTROMETER WHEN ANALYSING A RESPECTIVE ONE OF THE SETS OF ANALYTE COMPONENTS ELUTING FROM THE ONE OR MORE ANALYTE SEPARATION DEVICES AT DIFFERENT TIMES

2404

ALLOW A USER TO PROVIDE AN INDICATION OF ONE OR MORE PARAMETERS RELATING TO A SELECTED INSTANCE OF A MODE, THE ONE OR MORE PARAMETERS INCLUDING ONE OR MORE PARAMETERS INDICATIVE OF A TIMING OF A SELECTED INSTANCE OF A MODE, AND RECEIVE, VIA THE USER INTERFACE, IN RESPECT OF EACH ONE OF THE SELECTED INSTANCES OF MODES, AN INDICATION FROM THE USER OF A SET OF ONE OR MORE PARAMETERS INCLUDING ONE OR MORE PARAMETERS INDICATIVE OF A TIMING OF THE SELECTED INSTANCE OF THE MODE, THE TIMING OF THE SELECTED INSTANCE OF THE MODE BEING SELECTED TO RESULT IN THE INSTANCE OF THE MODE BEING PERFORMED IN RELATION TO ANALYSING A PARTICULAR ONE OF THE SETS OF ONE OR MORE ANALYTE COMPONENTS ELUTING FROM THE ONE OR MORE UPSTREAM ANALYTE SEPARATION DEVICE

2406

CONTROL AT LEAST THE OPERATION OF THE ION MOBILITY SEPARATION DEVICE IN ACCORDANCE WITH THE RECEIVED INDICATIONS

USER INTERFACE FOR ION MOBILITY SEPARATION DEVICE

CROSS-REFERENCE TO RELATED APPLICATION

This application is a continuation of U.S. patent application Ser. No. 16/522,366, filed Jul. 25, 2019, which claims priority from and the benefit of U.S. Provisional Patent Application No. 62/703,233, filed Jul. 25, 2018. The entire contents of these applications are incorporated herein by reference.

FIELD

The present disclosure relates to methods of controlling the operation of an ion mobility separation device. The ion mobility separation device may form part of a spectrometer or spectrometry system.

BACKGROUND

Ion mobility separation devices operate by driving ions through a gas such that they collide with the gas molecules and separate according to their ion mobilities through the gas. The ions may be driven through a drift cell filled with a background gas, such that as the ions are urged around the drift cell, they collide with the gas molecules. This occurs in a separator of the device.

Various types of ion mobility separators are known. Some existing ion mobility separators operate in-line with the ion optical path of a mass spectrometer. Such separators have a direct impact on the overall length of the instrument and also must be transited even if ion mobility separation is not required, potentially making timing between rapidly changing ion signals and subsequent analysers more problematic. This becomes more problematic as the length of ion mobility separator is increased in order to increase the resolution of the device. It is also known to separate ions in closed-loop separators in order to overcome the problem of having to provide a relatively long device in order to obtain the required resolution.

SUMMARY

From a first aspect, there is provided a method of controlling the operation of an ion mobility separation device, the method comprising:

displaying to a user via a user interface a pool of modes of operation of the ion mobility separation device, wherein each one of the modes is selectable by the user for inclusion in an experiment;

receiving, via the user interface, an indication from the user of a selection of one or more instance of each one of a plurality of the modes from the pool to be included in an experiment;

wherein the user interface is further configured to allow the user to provide an indication of a set of one or more parameters for controlling the ion mobility separation device in implementing a selected instance of a mode, and the method further comprises receiving, via the user interface, in respect of one or more of the selected instances of modes, an indication from the user of a set of one or more parameters for controlling the ion mobility separation device in implementing the instance of the mode;

and controlling the operation of the ion mobility separation device in accordance with the received indications.

From a second aspect, there is provided an apparatus operative to control the operation of an ion mobility separation device, the apparatus comprising:

at least one memory and logic coupled to the at least one memory, the logic to:

display to a user via a user interface a pool of modes of operation of the ion mobility separation device, wherein each one of the modes is selectable by the user for inclusion in an experiment;

receive, via the user interface, an indication from the user of a selection of one or more instance of each one of a plurality of the modes from the pool to be included in an experiment, wherein the user interface is further configured to allow the user to provide an indication of a set of one or more parameters for controlling the ion mobility separation device in implementing a selected instance of a mode, and the method further comprises receiving, via the user interface, in respect of one or more of the selected instances of modes, an indication from the user of a set of one or more parameters for controlling the ion mobility separation device in implementing the instance of the mode;

and control the operation of at least the ion mobility separation device in accordance with the received indications.

From a third aspect, there is provided an apparatus operative to control the operation of a spectrometer comprising an ion mobility separation device, wherein the spectrometer further comprises one or more analyte separation devices upstream of the ion mobility separation device, wherein, in use, different sets of ions enter the ion mobility separation device at different times based on sets of analyte components eluting at different times from the one or more analyte separation devices upstream thereof, the apparatus comprising:

at least one memory and logic coupled to the at least one memory, the logic to display to a user via a user interface a pool of modes of operation for controlling operation of at least the ion mobility separation device of the spectrometer, wherein each one of the modes is selectable by the user for inclusion in an experiment;

receive, via the user interface, an indication from the user of a selection of one or more instance of each one of a plurality of the modes from the pool to be included in an experiment, wherein each instance of a mode is for use in controlling the operation of at least the ion mobility separation device of the spectrometer when analysing a respective one of the sets of analyte components eluting from the one or more analyte separation devices at different times;

wherein the user interface is further configured to allow the user to provide an indication of one or more parameters relating to a selected instance of a mode, the one or more parameters including one or more parameters indicative of a timing of a selected instance of a mode, and the method further comprises receiving, via the user interface, in respect of each one of the selected instances of modes, an indication from the user of a set of one or more parameters including one or more parameters indicative of a timing of the selected instance of the mode, the timing of the selected instance of the mode being selected to result in the instance of the mode being performed in relation to analysing a particular one of the sets of one or more analyte components eluting from the one or more upstream analyte separation device;

and control the operation of at least the ion mobility separation device in accordance with the received indications.

In accordance with the disclosure, some embodiments may provide multiple technological advantages, including improvements to computing technology, over conventionally systems and methods. For example, a the user is able to specify a selection of at least one instance of each one of a plurality of modes to be included in an experiment using the ion mobility separation device, and a set of one or more parameters for use in controlling the ion mobility separation device in implementing at least one of the selected instances of a mode (and, in embodiments, each selected instance of a mode). The user may therefore readily configure the operation of the ion mobility separation device to their needs for a particular experiment. The selected instances of modes may be customised by the user. This provides great flexibility in the ability of the user to set up a range of different experiments, and to simply modify the selected instances of modes to add or remove instances of modes, and/or modify the parameters in relation to an instance, to provide a new experiment. This enables the effect of a change to be rapidly seen by modifying an experiment appropriately to provide a new experiment. In contrast to prior art methods, the user no longer needs to program or reprogram the control system for the ion mobility separation device, but may specify a desired sequence of instances of modes by interaction with a user interface. Each selectable mode in the pool may be associated with pre-programmed instructions for implementing the mode. By selecting a plurality of instances of modes, a sequence of instances of modes may be provided to build an experiment.

Unless the context demands otherwise, a reference herein to an instance of a mode, or a selected instance of a mode, refers to an instance of any mode which is available for selection from the pool, and does not refer to any particular mode. It will be appreciated that an experiment as used herein may be defined by a given sequence of a plurality of instances of modes of the ion mobility separation device. The sequence may include more than one subset of one or more instances of modes, which subsets may be linked by decision points, as described below. Accordingly, the sequence may include branches. Thus, the sequence may include multiple possible subsets of one or more instances of modes, with a given subset of one or more instances of modes being selected for performance in a given experiment if a set of one or more conditions are met e.g., based on data obtained using detected ions. A subset of one or more instances of modes may comprise a plurality of modes, and hence, may be referred to as a sub-sequence. A plurality of modes defined by a subset of modes includes more than one different mode, and may include multiple instances of the same mode. In other embodiments, the experiment is defined by a single, linear sequence of a plurality of instances of modes.

An experiment includes at least one instance of each one of a plurality of different modes, at least some of which instances of modes are user specified. In embodiments each instance of a mode in the experiment is user selected in accordance with the methods herein described. In embodiments, the methods disclosed herein may be performed on the fly. The ion mobility separation device may therefore operate continuously, with each experiment being defined by the performance of a particular sequence of instances of modes with a particular set of parameters. A change in the sequence of instances of modes and/or parameters thereof may be considered to provide a new experiment (which may be a modification of a preceding one). A new experiment may proceed seamlessly after a preceding experiment e.g., upon receiving an indication that the experiment defined by a new sequence of instances of modes and/or parameters should be commenced. Each experiment may, and typically does, involve performing the defined sequence of instances of modes, with the applicable set of parameters, multiple times e.g., in respect of multiple pulses of ions.

The method involves the user providing, via the user interface, an indication of a selection of one or more instance of each one of a plurality of modes, and an indication of a set of one or more parameters for controlling the ion mobility separation device when implementing a given instance of a mode. Each indication is provided by interaction of the user with the user interface. An indication may involve the user performing one or more actions with respect to the user interface.

In some embodiments, the plurality of modes in respect of which at least one instance is selected by the user to be included in the experiment corresponds to a subset of the pool of modes of operation presented to the user. However, it is also envisaged that that the user may select at least one instance of each available mode of operation. In some embodiments it is envisaged that some constraints may be imposed on the modes which may be included in a sequence of instances of modes used to build an experiment. Thus, in some embodiments, a set of one or more instances of modes, optionally in a predefined order, may be included automatically in a sequence of instances of modes to be included in an experiment. For example, at least one instance of each of an ion introduction, ion separation and ion ejection for detection mode may be automatically included as mandatory modes. The user may then add further instances of modes to the sequence. Thus, the set of one or more instances of each of a plurality of modes which is specified by the user may correspond to only a subset of the set of instances of modes in a sequence which makes up an experiment. The experiment may comprise a sequence of instances of modes, of which some are user specified, and some are automatically specified.

The modes in the pool of modes are available modes of operation for the device. Examples of modes are described in more detail below. The modes in the pool of modes are different modes. The plurality of modes in respect of each of which one or more instances is selected by the user from the pool for inclusion in an experiment are different modes. The user may select one or more instance of each one of the plurality of different modes presented via the user interface for inclusion in an experiment. The method comprises receiving, via the user interface, an indication from the user of a selection of one or more instance of each one of a plurality of the modes. For example, as described below, a mode which causes the ions to be separated in the separator of the ion mobility separation device may be included at different times in a sequence of instances of modes used to build an experiment. This may be appropriate where, for example, a subset of ions is stored after initial separation before being returned to the separator for further separation. It will be appreciated that the selection of at least one instance of each of a plurality of modes of the device specified by a user may include more than one instance of each one of a first set of one or more of the modes in the pool, and only a single instance of each one of a second set of one or more of the modes in the pool. For example, a separate mode may be included multiple times, but an ejection for detection mode may be used only once. Numerous possibilities are envisaged. The number of instances of modes included in an experiment may also vary widely depending upon the complexity of the experiment.

The modes available for selection in the pool may be automatically specified and/or may include user specified modes. For example, the user may be able to specify new modes to be added to the pool of available modes. In some embodiments, the user may be able to specify new modes which are a combination of existing modes. In other words, existing modes may be used as building blocks to provide additional customised modes. At least some of the parameters e.g., voltage parameters for controlling the ion mobility separation device in respect to a user specified mode may be provided by copying across parameters associated with previously specified modes which provide the building blocks making up a new user specified mode, i.e., where the new mode is a combination of existing modes. At least some of the parameters copied across in this manner may then be locked to prevent the user from further modifying the parameters in respect of the new mode. In embodiments, the user interface is configured to allow the user to provide an indication of an order in which the selected one or more instances of each one of the plurality of the modes are to be performed in the experiment, the method further comprising receiving such an indication from the user. The method then comprises controlling the operation of the ion mobility separation device in accordance with the received indication. The method allows the user to specify a sequence of one or more instances of each one of a plurality of different modes of the device to be included in an experiment. Thus, the modes in the pool of modes may be used as building blocks for building a desired experiment made up of a sequence of instances of a plurality of the modes. As mentioned above, the experiment may be made up solely of user specified instances of modes, or may also include one or more automatically selected instances of modes. Where automatically selected instances of modes are included, the user may or may not be able to reorder the automatically selected instances of modes. For example, the user may only be able to specify an order in relation to the user selected one or more instances of modes e.g., relative to one another, and, where applicable, relative to one or more automatically selected instances of modes.

The step of controlling the operation of the ion mobility separation device in accordance with the received indications is carried out automatically. The method may comprise automatically generating a set of instructions and/or a set of one or more control signals for controlling operation of the ion mobility separation device to implement a user specified set e.g., sequence of instances of a plurality of the modes. The step of generating the set of instructions may comprise using one or more sets of pre-programmed instructions for implementing given modes of the device. The set of instructions and/or the set of one or more control signals may cause the device to operate in accordance with a set of one or more parameters specified by the user in respect of a mode or modes and/or in respect of an instance or instances of a mode or modes. Where a sequence of instances of modes includes automatically selected instance(s) of modes and/or parameters for use in controlling operation of the ion mobility separation device when implementing an instance of a mode, the set of instructions and/or set of one or more control signals may further comprise instruction(s) and/or control signal(s) for implementing the automatically selected instance(s) of modes. The control signal(s) may be generated using control circuitry.

A set of one or more processors in communication with the user interface and the ion mobility separation device may receive data indicative of the received indications and cause control circuitry of the ion mobility separation device to cause the ion mobility separation device to operate in accordance with the received indications e.g., through the control circuitry sending one or more control signals. The set of one or more processors may generate a set of instructions based on the received indications which, when executed, causes the control circuitry to operate in this manner. The set of one or more instructions may implement the functions according to the sequence of instances of modes and the parameter(s) specified in relation thereto.

The step of controlling the operation of the ion mobility separation device in accordance with the received indications may be carried out after receiving an indication from the user confirming that an experiment in accordance with the received indications should be commenced. In embodiments the user is able, via the user interface, to modify the selection of one or more instances of a mode and/or the selection of a set of one or more parameters in respect of an instance of a mode. Thus, the user may provide an indication confirming that the experiment may be commenced once they are happy with the selected selection of instances of modes and set of one or more parameters in respect of one or more instances of a mode, and/or with a complete sequence of a plurality of instances of modes and any associated parameters, where the sequence includes some automatically selected instances of modes and/or parameters. The user interface may provide the user with other selectable options, for example to save the selection of instances of modes and the associated set of one or more parameters for one or more instances of a mode i.e., to save the specified experiment. The experiment may then be initiated at a later stage, and the same experiment may be run on multiple occasions simply by retrieving the saved details.

The pool of modes may be presented to the user via the user interface in any suitable manner. The pool of modes may be presented to the user as a list of modes. For example, the modes may be provided in a drop-down list or a list box.

In some embodiments, the pool of modes is displayed to the user in a first area of the user interface e.g., display. The selected one or more instance of each one of a plurality of modes may be displayed to the user in a second area of the user interface. The selected one or more instance of each one of the plurality of modes may be displayed in a list in the second area of the user interface. The second area may be located below the first area.

When an indication of a selection of an instance of a mode from the pool is received from the user, the method may comprise adding the instance of the mode to a list of selected instances of modes e.g., in a second area of the user interface e.g., display. An ordered list of selected instances of modes may be displayed e.g., in a second area of the user interface i.e., a sequence of selected instances of modes. Thus, in these embodiments, the pool of modes, and the selected instances of modes, are simultaneously displayed to the user. It is envisaged that, once selected, a given instance of a mode may be deselected by the user. The instance of the mode may then be removed from the list of selected instances of modes e.g., in the second area of the graphical user interface. Thus, as described above, the user may modify the selected instances of modes and/or an order thereof, until they are happy with a sequence of selected instances of modes, and wish to initiate an experiment in accordance therewith. In embodiments in which one or more instances of modes are automatically selected for inclusion in an experiment i.e., one or more instances of modes are mandatory, the automatically selected one or more instances of modes may be displayed together with the user selected instances of modes i.e., in a list e.g., in the second area of the display. This may then provide an indication of the complete sequence of instances of modes that is to build an experiment. The user may be able to add and/or remove additional instances of modes to/from the automatically selected set of one or more instances of modes, and/or order the user selected instances of modes in relation to those automatically selected instances of modes. The user may be prevented from removing automatically selected mandatory instances of modes from the list.

The selection of an instance of a mode from the pool of modes may be performed by the user in any suitable manner. For example, the user may highlight the mode in the pool and indicate that an instance of the mode is to be added to the selected instances of modes e.g., by pressing an "add" button, or the selection may involve dragging and dropping the mode from the pool into the list of selected modes. Before a first instance of a mode is added to a list of selected instances of modes, the list may simply comprise a heading indicating the area in which the list of instances of modes is to be displayed, or may include one or more automatically selected instances of modes i.e., mandatory instances of modes. In other embodiments, as described below, the user may add a selected instance of a mode to the selected instances of modes e.g., a list thereof indirectly. For example, the user may add a selection of an instance of a mode to a bar associated with the time axis of a chromatogram e.g., by dragging and dropping the mode from the pool onto a portion of the bar. The instance may then automatically be added to a list of selected instances of modes.

Where an order of the modes is received from the user, the method may comprise displaying the selected modes in an order corresponding to the received indicated order e.g., in a second area of the user interface. In embodiments an ordered sequence of selected instances of modes is displayed e.g., in the second area of the user interface. It will be appreciated that the order of the instances of modes may be indicated by the user in any suitable manner. For example, the user may be able to drag and drop a mode from pool of modes e.g., in a first area of the user interface into a particular position in a list of modes e.g., in the second area of the user interface to provide an instance of the mode in the particular position. Alternatively or additionally, the user may be able to specify the order by interaction with another part of the user interface e.g., a bar associated with a chromatogram as described below. In some embodiments, the user may be able to interact with the user interface to order and/or reorder, the instances of modes in the list of selected instances of modes e.g., in the second area of the interface. It is envisaged that an instance of a mode may be added to a list of selected instances of modes in a default position initially, with the user then being able to reorder the instances of modes within the list of selected instances of modes. The default order may be determined as desired e.g., based upon predetermined criteria. For example, it may be assumed that certain instances of modes will be in a particular order in the sequence of instances of modes e.g., introduction of ions occurs before separation, which occurs before ejection etc. Some constraints may be placed on the ability of the user to order or reorder instances of modes in the list. Where one or more automatically selected instances of modes are included in the list, the user may or may not be able to reorder the automatically selected instances of modes.

The set of one or more parameters for use in controlling the device in implementing an instance of a mode may correspond to all or a subset of the set of one or more parameters which may be indicated by a user for controlling the device in respect of the mode. The method may involve receiving an indication of a set of one or more parameters for use in controlling the ion mobility separation device in respect of each selected instance of a mode, or a subset of the selected instances of modes. It will be appreciated that where no indication of a set of one or more parameters is received in relation to an instance of a mode, or where no indication is received in relation to a particular parameter or parameters, default parameters may be used. The set of one or more parameters are for controlling the ion mobility separation device when operating to implement the given instance of the mode. Where more than one instance of a particular mode is selected, the set of one or more parameters in respect of each instance may differ.

In embodiments, the set of one or more parameters for use in controlling the ion mobility separation device in implementing an instance of the mode which may be specified by a user (and, in embodiments, which are specified by the user) include one or more of; one or more voltage related parameters for controlling operation of the ion mobility separation device in implementing the instance of the mode, and one or more timing related parameters for controlling the ion mobility separation device in implementing the instance of the mode. In embodiments the set of one or more parameters indicated in respect of an instance of a mode comprises a first subset of one or more timing related parameters and a second subset of one or more voltage related parameters. However, it is envisaged that in other embodiments, for example to provide simpler arrangements, with greater ease of use, only timing or voltage related parameters may be specified by the user. The degree to which users may specify parameters in relation to modes may depend upon the desired balance between ability to customise experiments and provide ease of use. The user interface may be configured to "lock down" certain parameters, such that they may not be modified by a user. This may enable the set of parameters which are available to be specified by a user to be varied and controlled.

A set of one or more voltage related parameters for controlling the device in implementing an instance of a mode may be indicative of one or more voltage related parameter to be applied to at least a part of the device e.g., to one or more components thereof. It will be appreciated that different voltages may be applied to different components when implementing a mode of operation of the device. In some embodiments one or more voltage related parameter may be specified in respect of one or more of an entrance to the separator and an exit of the separator. Where the separator comprises one or more array of electrodes, one or more voltage related parameter may be specified in relation to one or more of the arrays e.g., an array entrance voltage, an array exit voltage etc. It will be appreciated that only some of the voltage related parameters associated with operation of the device in a given instance of a mode may be user specified. Other voltage related parameters may be set globally and/or may use default values, which may be set e.g., based upon previous instances of the same mode.

A voltage related parameter in relation to an instance of a mode may, for example, be indicative of an absolute voltage to be applied to at least a part of the device, or may be indicative of a voltage to be applied to at least a part of the device in relative terms, or may be indicative of a voltage gradient to be applied to at least a part of the device. A voltage related parameter may be indicative of a voltage offset to be applied to at least a part of the device. Thus, in embodiments, the set of one or more voltage related parameters comprises one or more parameters indicative of one or more of a voltage gradient, a voltage offset, a relative voltage and an absolute voltage to be applied to at least a part of the device. A voltage related parameter may be indicative of an RF amplitude to be applied to at least a part of the device. In embodiments, the voltage related parameters may include a parameter specifying a direction of travel of a travelling wave used to urge ions to travel in a given direction when implementing the instance of a mode. For example, this may be sideways in relation to a separation mode for urging ions around the separator e.g., around an array thereof, forward during ion introduction and ion ejection for detection modes, and reverse for ion ejection to store modes.

Alternatively or additionally, the user interface is configured to allow the user to specify a set of one or more timing related parameters for controlling operation of the device in implementing an instance of a mode. The set of one or more timing related parameters in respect of an instance of the mode may be indicative of at least a duration and a reference time for controlling the timing of the instance of the mode. The reference time may be an absolute time. The reference time may be indicative of a start time or an end time for the instance of the mode. Thus, in embodiments, the set of one or more timing related parameters is indicative of at least a duration and a start time or end time for the instance of the mode. It will be appreciated that a duration may be in absolute or relative terms. A duration or reference time may be specified relative to the timing of another instance of a mode e.g., duration is x % of the duration of a preceding instance of a mode, or starts x secs after the preceding instance of a mode etc. Of course, the user may be able to specify other types of parameter, and the user specifiable parameters are not limited voltage and timing related parameters.

In some embodiments the method may comprise displaying at least some, and optionally all, of the set of one or more parameters in respect of a given instance of a mode which may be (and optionally are) configured by the user in the user interface in association with the instance of the mode in a displayed list of selected instances of modes e.g., in a second area of the user interface. The list of selected instances of modes and (at least some or optionally each of) the associated user configurable parameters may be displayed in a table. In embodiments, the list of selected instances of modes is displayed in a first column, and one or more (optionally each one of the) configurable parameters is displayed in a respective column adjacent to the first column. One column may be provided in respect of each parameter. In embodiments in which the user may specify voltage related and timing related parameters, a first subset of columns may be provided in respect of timing related parameters and a second subset of columns may be provided in respect of voltage related parameters. Each selected instance of a mode and its associated parameters may be displayed on a row of a table comprising the columns. Accordingly, each of the set of one or more configurable parameters indicated by the user may be displayed in accordance with any of the above embodiments.

The user may be able to interact with a displayed parameter to modify the parameter. It is envisaged that initially default values of the parameters may be displayed, which may then be modified by the user. The step of indicating a parameter may therefore comprise modifying a default value for the parameter. It is also envisaged that initially a blank region e.g., text box may be displayed in respect of a parameter into which the user may enter a value for the parameter. Specifying a parameter may be carried out directly by interaction with a region e.g., a text box in which the parameter is, or is to be displayed, e.g., through input of a value, selection from a drop down list etc. and/or through interaction with another part of the user interface e.g., where a chromatogram or potential energy diagram is displayed as described below.

In some embodiments in which the user interface is configured to allow the user to specify a set of one or more voltage related parameters for use in controlling the ion mobility separation device in relation to a selected instance of a mode, the method may comprise displaying to the user via the user interface a potential energy diagram providing a schematic representation of one or more voltage related parameter for use in controlling the ion mobility separation device in implementing a selected instance of a mode to facilitate understanding of one or more (and optionally each) of the voltage related parameters which may be specified by the user. For example, the diagram may provide a schematic representation of one or more voltage, such as voltage level, to be applied to one or more parts of the ion mobility separation device. The potential energy diagram may be displayed to the user in response to an indication by the user selecting the given instance of a mode e.g., in the second area of the user interface. For example, the user may highlight the selected instance of a mode in a list of selected instances of a mode e.g., in a second area of the interface. The diagram may provide a schematic representation of one or more voltage level and/or one or more voltage gradient to be applied to one or more parts of the device. A voltage level may be indicated in absolute or relative terms. The diagram may include a schematic representation indicative of one or more voltage offset or bias to be applied to one or more parts of the device. A representation of other voltage related parameters in relation to the instance of a mode as discussed above may be provided e.g., a direction of a travelling wave.

The method may comprise modifying the potential energy diagram in response to a change in a voltage related parameter in relation to the selected instance of the mode indicated by the user. Thus, in embodiments, a change to a voltage related parameter in relation to an instance of a mode by a user will be reflected in the potential energy diagram. At least some of the voltage related parameters e.g., levels indicated in the diagram are user specifiable. Other voltage related parameters e.g., levels may be shown which are set globally e.g., being applicable to operation in all instances of modes, or otherwise using default voltages to put the user specifiable parameters in context. Some or all of the user specifiable voltage related parameters may be represented in the diagram. A default value for this, or any other parameter described herein, may be defined in any suitable manner, and may or may not be based on a previous value of the parameter.

In some embodiments, the potential energy diagram may further comprise a representation of one or more voltage related parameter for controlling operation of the ion mobility separation device (e.g., voltage level to be applied to a part of the ion mobility separation device) during the preceding instance of a mode in the sequence for comparative purposes e.g., where this differs from the corresponding voltage related parameter e.g., level for the selected instance of a mode.

In some embodiments in which a potential energy diagram is displayed, the method comprises, for one or more voltage related parameter e.g., voltage level which may be specified by a user, displaying a graphical representation indicative of the voltage related parameter e.g., applied voltage level in the potential energy diagram so as to be aligned with a respective region of the user interface in which the parameter may be specified by the user. For example, the region of the display may be a text box or similar, in which a value for the parameter may be input or modified (e.g., where a default value is initially displayed). In embodiments, each one of a plurality of graphical representations indicative of a voltage related parameter e.g., an applied voltage level is aligned with a respective region for specifying the parameter in this manner. A graphical representation indicative of an applied voltage level may comprise one or more graphical element, and may, for example, comprise one or more linear element, such as a bar, line or arrow. In some embodiments in which the voltage related parameters which may be specified by the user are displayed in columns, the graphical representation in respect of the or each parameter e.g., arrow may be aligned with the applicable column for specifying the parameter. The alignment between parts of the diagram and the regions where the applicable parameter may be specified in these embodiments may facilitate understanding by the user of the parameter that is being specified. In embodiments in which the potential energy diagram is modified based upon an input parameter, the user is provided with a graphical illustration of the impact of any change in the parameter. The potential energy diagram may be displayed in the user interface adjacent e.g., above an area in which one or more columns for specifying one or more voltage related parameters in relation to the selected instances of modes is displayed to a user. In some embodiments the graphical representation e.g., bar, line or arrow is vertically aligned with the region for specifying the parameter. This may be applicable e.g., where the potential energy diagram is displayed in a third area of the user interface above a second area in which a list of selected instances of modes and associated parameters is displayed. The potential energy diagram may comprise graphical representations of voltage related parameters which are not indicative of a voltage level to be applied, e.g., a direction of a travelling wave in respect of the instance of a mode.

In some embodiments in which the user interface is configured to allow a user to specify one or more timing related parameters for controlling the ion mobility separation device in relation to a selected instance of a mode the method may comprise displaying to the user via the user interface an ion mobility chromatogram obtained based on ions detected after passing through the ion mobility separation device, wherein the user may specify one or more (e.g., at least some or each of the) timing related parameters for controlling the device in relation to a selected instance of a mode through interaction with the chromatogram.

The chromatogram is, in embodiments, a substantially real time ion mobility chromatogram i.e., based on data which can be considered to be substantially real time data. Thus, the method may comprise updating the displayed chromatogram substantially in real time based upon ions detected after passing though the ion mobility separation device. For example, where ions are introduced to the ion mobility separation device in pulses, the chromatogram may be obtained based on ions from one or more most recent previous pulses detected after passing through the ion mobility separation device. The data therefore is based upon the most recently available detected data, to the extent that it may be considered to be substantially real time data. The data may relate to one or more previous pulses provided that it may be considered to be substantially real time data. The period to which the substantially real time data upon which the chromatogram is based relates may be determined by a data acquisition time, which may be specified by the user, as known in the art. The data acquisition time may define a period over which acquired data is summed in providing output data e.g., which may be used to provide the chromatogram or mass spectrum or any other desired output. The number of pulses upon which the chromatogram is based will therefore depend upon the number of complete sequences of instances of modes defined in respect of a given experiment which occur in a defined acquisition time. In general, each pulse of ions is allowed to pass through the system, and be detected before another pulse of ions is introduced. By way of example, for a sequence length of 100 ms and an acquisition time of 1 s, there would be ten pulses of ions in the acquired data upon which the chromatogram is based, where the chromatogram is based on the data defined by the data acquisition time.

The chromatogram may be obtained by detecting ions after passing through the ion mobility separation device in any suitable manner. The ions may be detected after passing through one or more downstream device e.g., for analysing the ions. The ions may be detected as part of a process of analysing the ions e.g., based upon one or more physicochemical property thereof. For example, the ions may be detected by a detector of a mass spectrometer. The detection may occur as part of a step of obtaining one or more mass spectrum based on the detected ions. An ion mobility chromatogram herein refers to a graphical representation of the quantity of ions detected with respect to time from introduction e.g., injection of the ions to the separator of the ion mobility separator device. The quantity may be indicated by reference to a detected intensity of ions, or any other suitable parameter.

The user may be able to specify a timing parameter through interaction with the chromatogram in any suitable manner. The user may be able to define a time period to be associated with a given instance of a mode in relation to the time axis of the chromatogram. In some embodiments, the method may comprise displaying a pair of markers superposed on the chromatogram which may be manipulated e.g., dragged by a user to define a time period to be associated with a given instance of a mode. The method may comprise displaying the markers when a selected instance of a mode is highlighted by the user in a list of selected instances of modes. In embodiments, the mode may be highlighted in a list in a second area of the user interface, with the chromatogram being displayed in the third area thereof.

It will be appreciated that in the context of an ion mobility separation device, ions which are detected after passing through the device will be detected at different times, depending at least upon the time it takes them to pass through the ion mobility separation device i.e., based upon their mobility. Of course, other factors may also influence the time until an ion is detected e.g., a time to pass through an analyser or analysers, such as a Time of Flight mass analyser, or any other components that must be traversed between leaving the separation device and being detected. An ion mobility chromatogram may be obtained based upon the times at which ions are detected after passing through the ion mobility separation device. In general, it will be seen that the selection of a subset of ions in an ion mobility chromatogram obtained from ions detected after passing through the ion mobility separation device which have been detected at a given time or range of times, may be considered to correspond to the selection of a subset of ions having a particular value or range of values of a physico-chemical property e.g., mobility or range of mobilities. By specifying a time window for operation of the device in a particular instance of a mode to correspond to the time period over which a given subset of ions appear in a chromatogram obtained based on detecting ions that have passed through the ion mobility separation device, that subset of ions may effectively be selected to undergo particular function associated with that instance of the mode e.g., storage, ejection from the separator for disposal without detection etc. It will be appreciated that as the ions are typically introduced in pulses, with ions from each pulse being allowed to travel through the device and be detected before a further pulse of ions is introduced i.e., such that ions from each pulse of ions is subject to a complete sequence of instances of modes defined in respect of the given experiment, the timing of an instance of a mode set by reference to a chromatogram obtained based on data relating to one or more previous pulse may be expected to select the same subset of ions in a subsequent pulse.

In some embodiments the method further comprises displaying a representation of a bar to the user in the user interface, the bar being aligned with the time axis of the chromatogram. The bar may be a horizontal bar. The bar may be provided in a third area of the user interface i.e., display together with the chromatogram. The bar may provide a graphical representation of a sequence of instances of modes which may also be displayed e.g., in a list or tabular format in another area of the user interface e.g., a second area thereof. The bar may represent graphically a sequence of instances of modes displayed and specified elsewhere, and/or may enable the user to define or modify the sequence of instances of modes. In embodiments the user may be able to provide an indication of a selection of an instance of a mode from the pool of modes and/or an indication of a timing related parameter in relation to a selected instance of a mode by interaction with the bar.

The bar may include a plurality of defined portions in a direction aligned with the time axis and indicative of the timing of each selected instance of a mode. Information identifying each instance of a mode may be displayed in association with the bar e.g., a label or a reference to information identifying the mode elsewhere in the user interface e.g., in a list or table. The portions may be horizontal portions. The boundaries of a portion of the bar may be indicative of the start and end times associated with the given instance of a mode. The user may be able to manipulate the boundaries of a portion of the bar representative of a selected instance of a mode, e.g., by dragging the boundaries, in order to indicate the timing of the instance of the mode. In embodiments, when manipulating the boundaries of a portion of the bar, a pair of marker lines indicative of the boundaries may be displayed which extend so as to be superposed on the chromatogram. This may more easily enable the user to define a portion of the bar i.e., a timing of an instance of a mode, so as to result in the selection of a subset of ions based on the chromatogram. The marker lines may be vertical lines. Alternatively or additionally, in some embodiments the user may be able to indicate that a new portion should be defined in the bar indicative of the addition of a new instance of a mode from the pool of modes. For example, the user may be able to drag and drop a mode from the pool of modes onto the bar to result in a new portion being defined in the bar indicating that an instance of the mode is to be included in an experiment. The instance may then be added to a list of instances of modes e.g., in a second area of the user interface. Alternatively or additionally, a new portion may be defined in the bar when an instance of a mode is added to a list of modes e.g., in a second area of the user interface. The portions of a bar may be colour coded by reference to the available modes i.e., such that each type of mode is represented using a particular colour.

It is envisaged that multiple bars representing different sequences of a plurality of instances of modes may simultaneously be displayed in conjunction with a given chromatogram. This may enable different sequences to be compared in the user interface. This may be useful where an experiment is built up from a plurality of sub-sequences, and where certain portions of the sequences should be aligned when combined to provide the experiment (with the sequences then becoming sub-sequences within the experiment), e.g., such that one (sub)sequence starts where the previous finishes. The simultaneous display of multiple bars may also be useful in comparing multiple versions of a sequence that has been elaborated over time or edited by different users. An example of a context in which multiple bars may be useful, and where an experiment may be built up from multiple sub-sequences, is $MS^E$. $MS^E$ is a well-known technique (also referred to as Shotgun) where as an analyte elutes, the instrument repeatedly switches between a fragmentation mode and a non-fragmentation mode. This may provide data to enable fragments to be correlated to their parents.

A chromatogram (and where applicable bar(s) associated therewith) may be scrollable e.g., with respect to the time axis.

In any of the embodiments in which a chromatogram is displayed, some processing of data may be required to provide a chromatogram which enables the user to directly add or modify instances of modes and/or time parameters associated therewith through interaction with the chromatogram. It will be appreciated that, after leaving the separator of the ion mobility separation device, ions will not be detected until they have passed through one or more components e.g., downstream of the separator. Such components may be components of one or more analysers used to analyse the ions leaving the separator. For example, in embodiments, the ions pass through a mass analyser, such as a Time of Flight mass analyser. The time taken for ions to travel from an exit of a separator of the ion mobility separation device to a detector may be referred to as "dead time". In embodiments, the position of the bar relative to the time axis of the displayed chromatogram is corrected to compensate for a time delay between ions leaving a separator of the ion mobility separation device and being detected. The correction may comprise applying an offset to one or both of the time axis and the bar. A suitable offset may be specified by a user, or determined automatically. An offset may be determined empirically. An offset may be determined e.g., automatically based upon one or more physicochemical properties of ions e.g., based on ion mobility and m/z ratio. An offset may be determined e.g., calculated based on a quadrupole mass filter m/z setting. The determination of an offset may involve calculating the offset.

The data used in obtaining the chromatogram may relate to all or a subset of the detected ions. For example, the data may be filtered such that only that data relating to ions having a given value or range of values of one or more physicochemical properties, such as m/z ratio, may be used.

In a hybrid Ion Mobility Separation-Time of Flight analysis hybrid experiment, the data may relate only to ions having a given m/z ratio, or range of m/z ratio. An offset value for compensating for dead time as described above, may be determined e.g., calculated based on m/z and charge state of the ions upon which the chromatogram is based, where the chromatogram is based on data relating to only a subset of detected ions.

In embodiments in which the user interface comprises a first area and a second area as described above for displaying the pool of modes of operation and the selected instances of modes, the user interface may comprise a third area. The third area may be located adjacent, e.g., above at least a portion of the second area. The third area may be vertically aligned with at least a portion of the second area. The third area may be above the second area. This may, for example, more easily permit alignment between representations e.g., the voltage indications in the third area e.g., a potential energy diagram displayed therein, and regions in the second area where a parameter may be specified by a user. The third area may be located to one side of the first area. In embodiments, the second area displays a tabular representation of the selected instances of modes, and optionally the associated parameters, and the third area displays a graphical representation relating to the selected instances of modes and/or the parameters associated therewith.

In embodiments in which a chromatogram or potential energy diagram is displayed, the chromatogram or potential energy diagram may be displayed in the third area.

In some embodiments the third area of the user interface may be arranged to display different content depending upon a user selected display mode of the user interface. The user may be able to provide an indication via the user interface of a selection of a display mode in any suitable manner. For example, the user may be able to indicate the display mode by selecting a tab associated with the third area of the interface. The content displayed in the third area in the different display modes may be content to assist the user in specifying the set of one or more parameters for controlling the ion mobility separation device in relation to a selected instance of a mode. In some embodiments the third area is arranged, in a first display mode, to display first content for assisting the user in specifying one or more voltage related parameters for controlling operation of the device for implementing a selected instance of a mode, and, in a second display mode, to display second content for assisting the user in specifying one or more timing related parameters for controlling operation of the device in implementing a selected instance of a mode. In embodiments the first and second display modes may comprise a potential energy diagram view mode and a spectrum view mode respectively. The spectrum view mode is a mode in which the chromatogram is displayed. Optionally a mass spectrum based on detected ions may also be displayed.

It will be appreciated that in at least, although not limited to, embodiments in which a substantially real time chromatogram is displayed, the methods disclosed herein, e.g., at least the steps of receiving indications e.g., of selected instances of modes, parameters, or an order of selected instances of modes, from the user via the user interface, and controlling the operation of the device in accordance with the received indications, is performed while the ion mobility separation device is in operation i.e., while the device is performing ion mobility separation. Thus, in any of the embodiments, the selected instances of modes and parameters specified by a user may be used to customise e.g., modify the operation of an already operating device. The ability to customise the operation of the device while in operation based upon real time detected data is particularly advantageous, allowing experiments to be performed to explore the effect of small changes in parameters, or to analyse particular subsets of detected ions in more detail etc. Thus, in embodiments, the steps of the methods disclosed herein involving interaction of a user with the user interface, and controlling the operation of the device based thereon, is performed on the fly.

The method comprises controlling the operation of the ion mobility separation device in accordance with the received indications. The method may comprise causing the ion mobility separation device to perform each one of the selected one or more instances of each one of a plurality of the modes in a given sequence. The sequence may be performed one or more times. Where an indication has been received from the user of a set of one or more parameters for controlling the ion mobility separation device in respect of an instance of a mode, the method comprises controlling the device in implementing the mode using the set of one or more parameters e.g., controlling the device using the set of one or more voltage related parameters and/or using a set of one or more timing related parameters e.g., to control a timing of the instance of a mode. Where an indication of an order of the selected instances of the modes has been received by the user, the method comprises causing the ion mobility separation device to perform the instances of modes in the order indicated by the user. Thus, the sequence may at least in part, and optionally entirely, be user specified. It will be appreciated that the sequence may be performed multiple times. In embodiments the sequence is performed repeatedly until a new set sequence of instances of modes and/or parameters associated with instances of modes is specified, and a new experiment commenced based on the new sequence and/or parameters.

Each mode of operation may be for implementing one or more function of the ion mobility separation device. In embodiments the pool of selectable modes of operation include at least an ion introduction e.g., injection mode, an ion separation mode and an ion ejection for data acquisition mode. Optionally the pool may further comprise a bypass mode in which ions bypass the separator of the ion mobility separation device. In this mode, the ions pass through the ion mobility separation device without undergoing separation. As mentioned above, the user may be able to customise the modes e.g., by building new modes from combinations of old modes.

It is also envisaged that alternatively or additionally to displaying modes in the pool individually for selection by the user, modes may be displayed in selectable groups. The selection of a group of modes may result in the selection of a plurality of predefined instances of modes in a predetermined order, e.g., to add such a predefined sequence of modes to a list of selected instances of modes. The groups of modes may be displayed as part of the pool of modes. Thus, rather than a user having to specify each of the modes in a sequence which is frequently used e.g., ion introduction, ion separation and ion ejection for detection modes, a group of modes might be selected to add an instance of each of those modes in order to the selected instances of modes e.g., in a second area of the user interface. Thus, certain groups of modes may be available for selection which correspond to standard sequences of modes which are often used in experiments. The group of modes may be listed by reference to a group name for selection by a user. The user may be able to specify such groups e.g., by saving a common sequence of modes, or they may be predetermined. For example, "single pass" group might add instances of ion introduction, ion separation and ion ejection for detection modes to a list of instances of modes, or "IMS/IMS" group might add a sequence of ion introduction, ion separation, ion ejection to store, ion reinjection from store (optionally with activation), ion separation and ion ejection for detection modes to a selected list of instances of modes. The methods herein may involve a user selecting a plurality of individual modes of operation from the pool, and optionally one or more group of modes for inclusion in an experiment.

In some embodiments the ion mobility separation device further comprises at least one ion store for storing ions before and/or after passing through the separator. The or each ion store may be located immediately adjacent the separator. In some embodiments first and second ion stores are provided, which may be located one on either side of the separator. In embodiments the first and second stores are for storing ions which have passed through the separator. In some embodiments, ions enter or leave the or each ion store along a path which is orthogonal to a direction of travel of ions along the separator of the ion mobility separation device. Such a store may enable ions to be temporarily stored before or after passing through the separator, before being reintroduced to the separator at a later time, or being ejected for detection. This functionality may enable certain ions e.g., having a particular range of mobility to be separated out from a sample of ions. Such ions may be selected as discussed above, by selecting the timing of the applicable instance of a mode appropriately. The stored ions may be the desired ions, such that they are subsequently ejected for data acquisition, optionally after further separation, or they may be the ions that it is desired to discard, such that they are ejected from the store so as to be discarded from further processing. When in a store, ions may be subjected to processing, such as activation or fragmentation.

In embodiments, the or each ion store is local to the separator of the ion mobility separation device. For example, in embodiments, the separator comprises an array of electrodes, and the or each ion store is located immediately adjacent the array.

In embodiments in which the ion mobility separation device comprises at least one store, the pool of modes may further comprise, in respect of one or more of the stores, at least one mode in which ions are introduced to the store, and at least one mode in which ions are ejected from the store. In one example, the modes may include a mode in which ions are introduced to the store after passing through the separator, and one or both of a mode in which ions are ejected from the store for detection and a mode in which ions are ejected from the store and reintroduced to the separator. It is envisaged that yet further modes may be selectable, for example, to result in processing of stored ions. For example, the pool of modes may include a mode in which ions stored in a store are subjected to at least one of fragmentation and activation. Numerous possibilities for the combination of modes may be envisaged. The sequence of modes specified will depend upon what experiment it is desired to perform. Great flexibility is provided in the ability to customise an experiment by simply selecting desired modes, and optionally a desired sequence of the modes, and indicating desired parameters in relation to one or more of the modes. Certain examples are described in relation to the illustrated embodiments below. It will be appreciated that each mode may, in embodiments, be selected by a user and added to a list of selected instances of modes, more than once, at different points in a sequence of selected instances of modes. For example, an ion introduction e.g., injection mode may be performed initially, and then repeated, e.g., after ions are reintroduced to the separator from a store etc. Thus, multiple instances of a given mode may appear in the list of selected instances of modes.

The technology described herein provides great flexibility to customise experiments. More complex arrangements might be envisaged. An experiment may be defined by more than one subset of one or more selected instances of modes, one or more of the subsets of one or more selected instances of modes being linked by a decision point. Thus, a user may be able to specify an experiment comprising multiple sub-sets of one or more instances of modes, with at least some of the sub-sets of modes only being performed if one or more predetermined conditions are met. For example, the user may be able to specify that a selected instance of a mode, or sequence of a plurality of instances of modes, is only performed if one or more conditions are met, or that a first set of one or more instances of modes is performed if condition A is met, and a second different set of one or more instances of modes is performed if condition B is met, and so on. A set of one or more instances of modes may be a single instance of a mode, or a sequence of a plurality of instances of modes. For example, a condition might be a condition determined based by processing data relating to detected ions e.g., that a retention time or other physico-chemical property associated with the ions meets a given criteria, e.g., t1<retention time <t2 etc. Alternatively or additionally, the condition may relate to an external signal, such as a feedback signal, meeting one or more criteria.

It is envisaged that certain modes of operation of the ion mobility separation device may involve the sending a signal to one or more components external to the ion mobility separation device, such as a laser for implementing an ion activation device.

It will be appreciated that implementing a given mode i.e., instance of a mode of the ion mobility separation device, may, depending upon the function(s) associated with the mode, additionally involve controlling one or more components external to the ion mobility separation device to carry out one or more operations in relation to ions within the ion mobility separation device. For example, in an ion store and fragment mode, a laser may be caused to be activated to perform fragmentation of ions e.g., in an ion store of the ion mobility separation device. This may be based upon a laser pulse duration specified by the user in respect of the mode. Thus, in embodiments the user may be able to specify an indication of a set of one or more parameters for controlling at least the ion mobility separation device, and optionally one or more external components, in implementing a given instance of a mode, and the method may comprise controlling operation of at least the ion mobility separation device, and optionally one or more external components, in accordance with the received indications. A parameter, such as a laser pulse duration, may be specified by a user in relation to an external component. It will be appreciated that when performing activation, the ion mobility separation device may still be controlled e.g., to maintain the ions in the given store, or to cause the start or end of the instance of the mode to occur at a given time etc. It is envisaged that in some embodiments the user may be able to specify a further set of one or more parameters for use in controlling one or more external components i.e., external to the ion mobility separation device when implementing an instance of a mode. For an instance of a mode in which such additional parameters are specified, one or more parameters may or may not be specified by the user in relation to controlling the ion mobility separation device.

A set e.g., sequence of one or more instances of modes of the ion mobility separation device, and any parameters associated therewith, provided at least in part by a user in accordance with the disclosure herein, may form part of a wider set of instructions for controlling an instrument e.g., spectrometer comprising the ion mobility separation device, such as an apparatus including a Quadrupole mass filter, Ion Mobility Separation Device and Time of Flight mass analyser. The specified instances of modes, and any associated parameters, may, by way of example, be saved to a standalone file, and/or saved into a set of instructions for controlling implementation of the instrument more generally, or may be added into such a more general set of instructions at a later time, and so on. It is envisaged that the user interface described herein may form part of a more general user interface for use in controlling an instrument comprising the Ion Mobility Separation Device.

In accordance with the disclosure in any of its aspects or embodiments, the ion mobility separation device comprises a separator. The separator may be a separator in which the ions separate along a longitudinal axis of the separator according to their ion mobilities. The ion mobility separation device may be a device in which ions are driven through a gas such that they collide with the gas molecules and separate according to their ion mobilities through the gas. The separator may thus comprise a drift cell. Thus, in embodiments, the ions may be driven through a drift cell filled with a background gas, such that as the ions are urged around the drift cell, they collide with the gas molecules.

The ion mobility separation device may include any or all of the features of the ion separation devices disclosed in the Applicant's U.S. Pat. No. 9,984,861, entitled "Ion Entry/Exit Device", in the name of Micromass UK Limited. The entire contents of this application is incorporated herein by reference. In embodiments the ion separator comprises is a cyclic separator i.e., a closed loop separator. The separator may comprise an ion guide, which may be a closed loop ion guide. The separator e.g., closed-loop ion guide may start and end with an ion entry/exit device. The ion entry/exit device may be provided by a region of a closed-loop ion guide. Features of embodiments of an ion entry/exit device which may be used in these embodiments are described below.

When the device is operating in a separation mode, ions may be caused to pass around the separator e.g., ion guide (and, where applicable, through an ion entry/exit device) a plurality of times, and as many times as desired. For example, the ions may pass around the separator e.g., ion guide, and, where applicable, through the ion entry/exit region ≥x times, wherein x is 2, 3, 4, 5, 6, 7, 8, 9, 10, 15 or 20. This may be determined using a timing parameter in respect of an instance of the mode.

In some embodiment the ion mobility separation device comprises an ion entry/exit device, and the step of controlling the operation of the ion mobility separation device in accordance with a specified instance of a mode may comprise controlling the ion entry/exit device to implement a given function of the ion mobility separation device. The ion mobility separation device may comprise an ion entry/exit device having at least two arrays of electrodes. In some embodiments, the pool of modes includes a first mode in which DC potentials are successively applied to successive electrodes of at least one of the electrode arrays in a first direction such that a potential barrier moves along the at least one array in the first direction and drives ions into and/or out of the device in the first direction; and a second mode in which DC potentials are successively applied to successive electrodes of at least one of the electrode arrays in a second, different direction such that a potential barrier moves along the at least one array in the second direction and drives ions into and/or out of the device in the second direction.

Ions ejected from the separator may be ejected for detection (and hence data acquisition). In this case, ions may be ejected into an ion guide, ion trap, or ion processing device. The ions may pass through one or more components prior to detection.

It will be appreciated that ions may separate according to their ion mobilities as they pass through the separator. Thus, switching between modes of the ion mobility separation device at an appropriate time may be used to cause a desired subset of ions to be ejected from the separator e.g., for detection, or to an ion store as desired. A sequence of instances of modes may be constructed to provide such functions. Ions ejected out of the ion separator may be ejected into an ion guide, ion store, ion trap, or ion processing device. The selectively ejected ions may be stored, mass analysed, fragmented to form fragment ions, or reacted with ions or molecules to form product ions within an ion store, ion guide, ion trap, or ion processing device. The ion mobility separation device may be switched back to a separation mode once a desired subset of ions have been ejected. The ejected subset of ions may be a subset of ions having a first ion mobility, or first range of ion mobilities. Other ions having a second ion mobility, or second range of ion mobilities may be allowed to continue to pass through the separator. The method may comprise reintroducing the selectively ejected ions, fragment ions or product ions into the ion entry/exit device whilst operating the device in the second mode such that the reintroduced ions pass into the second ion guide again.

The ion mobility separation device of any of the embodiments disclosed herein may form part of a system further comprising one or more detector for detecting ions after passing through the ion mobility separation device. The ions may or may not be subjected to further separation before being detected. For example, the ions may pass through a mass analyser, such as a Time of Flight mass analyser. The detector may be a detector of a mass spectrometer comprising the ion mobility separation device and a mass analyser. The detection of ions may be performed as part of a process of obtaining mass spectra based on ions which have passed through the mass analyser after leaving the ion mobility separation device. The ion mobility separation device may form part of a spectrometer, which may be arranged to perform one or both of ion mobility and mass spectrometry. Ions leaving the ion mobility separation device may be subject to analysis to obtain a mass spectrum and/or ion mobility chromatogram. It will be appreciated that data relating to ion mobility, such as an ion mobility chromatogram may be obtained using a mass spectrometer based on ions detected after passing through a mass analyser, such as a Time of Flight mass analyser, of the spectrometer. For example, ion mobility timing data may be obtained based upon a spectrum number and a knowledge of the temporal length of each spectrum, as described below. The spectrometer may comprise a mass analyser e.g., ToF mass analyser. It will be appreciated that a spectrometer may be arranged to operate in ion mobility or mass spectrometry modes, at the same or different times. Alternatively, the spectrometer may only be able to perform one of these functions. In embodiments the spectrometer is arranged to perform at least ion mobility spectrometry. The spectrometer may comprise various additional components upstream and/or downstream of the ion mobility separation device, as known in the art. For example, any arrangement of ion guides may be used. Ions may be subjected to gas or liquid column chromatography before entering the ion mobility separation device.

In any of the embodiments, the method may comprise detecting ions after passing through the ion mobility separation device controlled in accordance with the received indications. The method may comprise outputting data based on analysis of ions output from the ion mobility separation device after one or more performances of a sequence of instances of modes including (or corresponding to) the indicated selection of one or more instances of a plurality of modes from the pool. Data obtained based on analysis of ions detected after multiple consecutive performances of the sequence may be summed to provide output data. As described above, a data acquisition time may be defined, which will determine the number of consecutive performances of the sequence upon which output data is based. The method may comprise obtaining an ion mobility chromatogram and/or a mass spectrum based on ions output from the ion mobility separation device (after one or more performance of the sequence), and/or may comprise mass analysing ions output from the ion mobility separation device (after one or more performance of the sequence).

The method of the present disclosure may therefore be performed as part of a method of performing mass and/or ion mobility spectrometry.

In embodiments in which the ion mobility separation device forms part of a spectrometer, the spectrometer may comprise:

(a) an ion source which may be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MATT") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or
(b) one or more continuous or pulsed ion sources; and/or
(c) one or more ion guides; and/or
(d) one or more Field Asymmetric Ion Mobility Spectrometer devices; and/or
(e) one or more ion traps or one or more ion trapping regions; and/or
(f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or
(g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or
(h) one or more energy analysers or electrostatic energy analysers; and/or
(i) one or more ion detectors; and/or
(j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or
(k) a device or ion gate for pulsing ions; and/or (l) a device for converting a substantially continuous ion beam into a pulsed ion beam.

The spectrometer may comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes.

The spectrometer may comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

According to an embodiment, analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

In some further embodiments, the ion mobility separation device forms part of a spectrometer, which spectrometer further comprises one or more analyte separation devices upstream of the ion mobility separation device, wherein, in use, different sets of ions enter the ion mobility separation device at different times based on sets of analyte components eluting at different times from the one or more analyte separation devices upstream thereof. The ions may enter the ion mobility separation device in distinct groups. These may correspond to groups of analyte component(s) eluting from the analyte separation device(s). The analyte components eluting from an analyte separation device may, depending upon the type of device, comprise e.g., molecules or ions. While in embodiments the one or more analyte separation devices comprise, or consist of, one or more chromatography devices, e.g., one or more gas or liquid chromatography device or combinations thereof, other separation device(s) may be used, as described in more detail below.

In these further embodiments the instances of modes may be used to control the operation of at least the ion mobility separation device of the spectrometer in relation to analysing sets of analyte components eluting from the one or more upstream analyte separation devices at different times. Each such set of analyte components may comprise one or more analyte components. The instances of the modes may be used to control the operation of the ion mobility separation device when performing ion mobility separation in relation to respective ones of the different sets of ions entering the ion mobility separation device at different times based on sets of analyte components eluting at different times. Thus, in embodiments the ion mobility separation device forms part of a spectrometer, which spectrometer further comprises one or more analyte separation devices upstream of the ion mobility separation device, wherein, in use, different sets of ions enter the ion mobility separation device at different times based on different sets of analyte components eluting from the one or more analyte separation devices upstream thereof, wherein the instances of the modes are used to control the operation of at least the ion mobility separation device in relation to analysing respective sets of analyte components eluting from the one or more analyte separation devices at different times e.g., when performing ion mobility separation in relation to respective ones of the different sets of ions based on the sets of analyte components entering the ion mobility separation device at different times. In these embodiments the ion mobility separation device is optionally a cyclic ion mobility separation device. The modes in these embodiments may be referred to as "acquisition modes" of the spectrometer.

The set of one or more parameters for controlling the ion mobility separation device in implementing a selected instance of a mode which be configured by the user may, in these embodiments, comprise a set of one or more timing parameters. The set of one or more timing parameters may include a start time and an end time for the instance of the mode. The set of one or more timing parameters will control the operation of at least the ion mobility separation device, and, where other component(s) of the spectrometer are controlled by the mode, may additionally control the operation of those component(s). For example, a timing of the instance of a mode may control the timing of the operation of all components controlled by the mode. The user may then select the timing e.g., start time and end time to result in the instance of the mode being performed in relation to a particular set of ions entering the ion mobility separation device based on the one or more analyte components eluting from the one or more upstream analyte separation device in a given time period. In these embodiments the user may therefore build up a sequence of instances of modes for inclusion in the experiment, wherein each instance of a mode customises the operation of at least the ion mobility separation device in relation to a particular set of analyte components e.g., ions to be considered in the experiment. The mode may set the conditions to be used when analysing a particular set of analyte components e.g., ions.

It is believed that such embodiments are advantageous in their own right.

In accordance with a further aspect there is provided;

a method of controlling the operation of a spectrometer comprising an ion mobility separation device, wherein the spectrometer further comprises one or more analyte separation devices upstream of the ion mobility separation device, wherein, in use, different sets of ions enter the ion mobility separation device at different times based on sets of analyte components eluting at different times from the one or more analyte separation devices upstream thereof, the method comprising:

displaying to a user via a user interface a pool of modes of operation for controlling operation of at least the ion mobility separation device of the spectrometer, wherein each one of the modes is selectable by the user for inclusion in an experiment;

receiving, via the user interface, an indication from the user of a selection of one or more instance of each one of a plurality of the modes from the pool to be included in an experiment, wherein each instance of a mode is for use in controlling the operation of at least the ion mobility separation device of the spectrometer when analysing a respective one of the sets of analyte components eluting from the one or more analyte separation devices at different times;

wherein the user interface is further configured to allow the user to provide an indication of one or more parameters relating to a selected instance of a mode, the one or more parameters including at least one or more parameters indicative of a timing of a selected instance of a mode, and the method further comprises receiving, via the user interface, in respect of each one of the selected instances of modes, an indication from the user of a set of one or more parameters including one or more parameters indicative of a timing of the selected instance of the mode, the timing of the selected instance of the mode being selected to result in the instance of the mode being performed in relation to analysing a particular one of the sets of one or more analyte components eluting from the one or more upstream analyte separation device;

and controlling the operation of at least the ion mobility separation device in accordance with the received indications.

From a further aspect there is provided an apparatus operative to control the operation of a spectrometer comprising an ion mobility separation device, wherein the spectrometer further comprises one or more analyte separation devices upstream of the ion mobility separation device, wherein, in use, different sets of ions enter the ion mobility separation device at different times based on sets of analyte components eluting at different times from the one or more analyte separation devices upstream thereof, the apparatus comprising:

at least one memory and logic coupled to the at least one memory, the logic to:

display to a user via a user interface a pool of modes of operation for controlling operation of at least the ion mobility separation device of the spectrometer, wherein each one of the modes is selectable by the user for inclusion in an experiment;

receive, via the user interface, an indication from the user of a selection of one or more instance of each one of a plurality of the modes from the pool to be included in an experiment, wherein each instance of a mode is for use in controlling the operation of at least the ion mobility separation device of the spectrometer when analysing a respective one of the sets of analyte components eluting from the one or more analyte separation devices at different times;

wherein the user interface is further configured to allow the user to provide an indication of one or more parameters relating to a selected instance of a mode, the one or more parameters including one or more parameters indicative of a timing of a selected instance of a mode, and the method further comprises receiving, via the user interface, in respect of each one of the selected instances of modes, an indication from the user of a set of one or more parameters including one or more parameters indicative of a timing of the selected instance of the mode, the timing of the selected instance of the mode being selected to result in the instance of the mode being performed in relation to analysing a particular one of the sets of one or more analyte components eluting from the one or more upstream analyte separation device;

and control the operation of at least the ion mobility separation device in accordance with the received indications.

It will also be appreciated by those skilled in the art that all of the described embodiments of the technology described herein can, and in an embodiment do, include, as appropriate, any one or more or all of the features described herein. In particular, the further aspects and embodiments of the technology relating to "acquisition modes" for analysing groups of components resulting from upstream separation may be used in conjunction with the earlier aspects and embodiments of the technology relating to modes for controlling operation of an ion mobility device. For example, modes of operation of the ion mobility separation device or sequences of instances of such modes as obtained in accordance with the earlier aspects and embodiments may be imported into the settings of the ion mobility separation device for the "acquisition modes" of these further embodiments and aspects.

The one or more parameters indicative of a timing of the instance of a mode in these further aspects and embodiments may be indicative of a start time and an end time, or any other parameters which may be used to determine a timing of the mode e.g., a duration and reference time as described above. Parameters indicative of a start time and an end time may, for example, indicate one of the start time and end time as a reference time and a duration of the mode. The timing parameters may be indicative of an absolute start time and end time, or may define a timing for an instance of a mode in relative terms e.g., relative to a previous instance of a mode.

The set of one or more timing parameters will control the operation of at least the ion mobility separation device, and, where other component(s) of the spectrometer are controlled by the instance of the mode, may additionally control the operation of those component(s). The user may then select the timing e.g., start time and end time of an instance of a mode to result in the instance of the mode being performed in relation to a set of one or more analyte components eluting from the one or more upstream analyte separation devices in a given time period, and/or a particular set of ions entering the ion mobility separation device based on the one or more analyte components eluting from the one or more upstream analyte separation device in the given time period. In these embodiments the user may therefore build up a sequence of instances of modes for inclusion in the experiment, wherein each instance of a mode customises the operation of at least the ion mobility separation device of the spectrometer in relation to a particular set of analyte components to be considered in the experiment. The instance of a mode may set the conditions to be used when analysing a particular set of components e.g., ions.

In these further aspects and embodiments, each mode may be associated with a set of one or more preset conditions relating to the operation of at least the ion mobility separation device in relation to analysing a set of analyte components to be considered in the experiment, and optionally relating to the operation of other components of the spectrometer. Thus, the selection of an instance of a mode may define such a set of one or more preset conditions. The set of one or more conditions is predefined i.e., preset, such that the selection of the instance of the mode defines the conditions rather than being selected by a user. These may provide default settings for the mode. It is envisaged that the user may be able to change these default settings. Of course, the user interface is configured to allow additional parameters relating to the operation of the ion mobility separation device, and optionally other components of the spectrometer, to be specified by the user in relation to the instance of the mode.

In embodiments, the set of one more pre-set conditions relating to the operation of at least the ion mobility separation device includes a number of passes of the ion mobility separation device to be performed by ions in the applicable mode, or whether the ion mobility separation device is to be operated in a bypass mode.

Each mode may, and embodiments does, also control the operation of a component of the spectrometer upstream of the ion mobility separation device through which the sets of analyte components emanating from the one or more analyte separation device upstream of the ion mobility separation device pass before entering the ion mobility separation device. The analyte components may undergo fragmentation before reaching the ion mobility separation device. It will be appreciated that the analyte components may or may not be in the form of ions when passing through components upstream of the ion mobility separation device during analysis.

The set of one or more parameters which may be specified by the user in relation to an instance of a mode may comprise one or more voltage related parameters, such as one or more of a capillary voltage or cone voltage, or a voltage for controlling the desolvation of ions upstream or downstream of the ion mobility separation device In some embodiments the spectrometer comprises a mass filter, and the set of one or more parameters may comprise one or more parameters for controlling the operation of the mass filter. The mass filter may be a quadrupole mass filter. Such parameters may be pre-set.

Alternatively or additionally, the spectrometer may comprise one or more ion trap and/or one or more collision, fragmentation or reaction cells, and the set of one or more parameters may comprise one or more parameters for controlling the operation of the one or more ion trap and/or the one or more of the collision, fragmentation or reaction cells.

The set of one or more pre-set conditions may additionally relate to one or more of a mass filter e.g., quadrupole mass filter, an ion trap and a collision, fragmentation or reaction cell of the spectrometer.

These further aspects and embodiments of the technology described herein are particularly applicable to the case in which sets of analyte components elute from the one or more upstream separation devices separated over a relatively long timeframe (at least compared to the separation of sets of ions which emanate from the ion mobility separation device being controlled in accordance with the modes). For example, the sets of ions may be separated by periods in the order of minutes, or at least tens of seconds, rather than milliseconds.

While an upstream analyte separation device for use in these aspects and embodiments may comprise an ionic separation device, such as an ion mobility separation device, e.g., a non-cyclic ion mobility separation device, optionally the one or more upstream analyte separation devices include one or more analyte separation device other than an ion mobility separation device, and optionally include one or more non-ionic analyte separation device. In embodiments the one or more upstream analyte separation devices comprise or consist of one or more analyte separation devices located upstream of an ion source of the spectrometer.

In embodiments the one or more upstream analyte separation devices comprise or consist of one or more chromatography device, such as a size exclusion chromatography device or a gas or liquid chromatography device, or combinations thereof. Any suitable type of chromatography device may be used. In embodiments the one or more upstream analyte separation devices comprise or consist of a liquid or gas chromatography device. In these embodiments the instances of modes specify the operation of at least the ion mobility separation device in relation to sets of analyte components eluting from the chromatography device e.g., liquid or gas chromatography device at different times. However, other types of upstream separation device may alternatively or additionally be used, which may or may not be, or include a chromatography device. For example, the one or more upstream analyte separation devices may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; (iv) a supercritical fluid chromatography separation device. or v) a size exclusion chromatography (SEC) device. Some exemplary, although non-limiting types of upstream chromatography device with which the techniques might be used include any one or ones of; paper chromatography, thin-layer chromatography (TLC), displacement chromatography, affinity chromatography, supercritical fluid chromatography, ion exchange chromatography, chiral chromatography, size-exclusion chromatography, expanded bed adsorption chromatographic separation, pyrolysis gas chromatography, reversed-phase chromatography, hydrophobic interaction chromatography, two-dimensional chromatography, simulated moving-bed chromatography, fast protein liquid chromatography, counter current chromatography, periodic counter-current chromatography, and aqueous normal-phase chromatography devices.

The features of the user interface which enable the instances of modes to be selected from the pool and incorporated in an experiment to be performed may be in accordance with any of the earlier described embodiments in which they relate to modes of operation of an ion mobility separation device The user interface may be configured to allow the user to provide an indication of an order in which the selected one or more instances of each one of the plurality of modes are to be performed in the experiment, the method further comprising receiving such an indication from the user.

The pool of modes may be displayed to the user in a first area of the user interface, and, the method may comprise, when an indication of a selection of an instance of a mode is received from the user, adding the instance of the mode to a list of selected instances of modes in a second area of the user interface.

The method may comprise displaying the set of one or more parameters in respect of a given instance of a mode which may be configured by the user in association with the instance of the mode in the displayed list of selected instances of modes in the second area of the user interface.

The user interface may comprise a third area arranged to display content to assist the user in specifying the set of one or more parameters for configuring (at least) the ion mobility separation device in relation to a selected instance of a mode.

The third area may be arranged to display content for assisting the user in specifying one or more timing related parameters for controlling operation of the device during operation in a selected instance of a mode (e.g., for specifying a timing of the mode).

The user interface may comprise a third area arranged to display different content depending upon a user selected display mode of the user interface, wherein the content displayed in the third area in the different modes is content to assist the user in specifying the set of one or more parameters for configuring (at least) the ion mobility separation device in relation to a selected instance of a mode.

The third area may be arranged, in one display mode, to display content for assisting the user in specifying one or more timing related parameters for controlling operation of the device during operation in a selected instance of a mode. In another display mode the third area may display a schematic overview of the components of the spectrometer to facilitate understanding of the components thereof, and the various conditions which may be set using a mode.

In embodiments the spectrometer comprises a chromatography device, such as a gas or liquid chromatography device, upstream of the ion mobility separation device, and the method comprises displaying to the user via the user interface a chromatogram e.g., an LC (liquid chromatography) or GC (gas chromatography) chromatogram obtained based on ions eluting from the chromatography device e.g., LC or GC device, wherein the user may specify one or more timing related parameters for controlling (at least) the ion mobility separation device in relation to a selected instance of a mode through interaction with the chromatogram. Thus, the user may specify a timing of the mode in this manner. This may be performed in the manner described in relation to any of the earlier embodiments. In these embodiments the chromatogram may be a pre-stored chromatogram, such as a chromatogram generated during a previous run using the same analyte sample composition that is to be analysed in the experiment. The method may extend to generating and storing such a chromatogram. The chromatogram is thus, in embodiments, not a real-time chromatogram.

The method may comprise displaying a representation of a bar to the user in the user interface, the bar being aligned with the time axis of the chromatogram, wherein the user may provide an indication of a selection of an instance of a mode from the pool of modes and/or an indication of a timing related parameter in relation to a selected instance of a mode by interaction with the bar.

The bar may include a plurality of defined portions in a direction aligned with the time axis indicative of the timing of each selected instance of a mode.

The boundaries of a portion of the bar may be indicative of the start and end times associated with the given instance of a mode and the user may be able to manipulate the boundaries of a portion of the bar representative of a selected instance of a mode to indicate the timing of the instance of the mode.

The spectrometer may be arranged to perform one or both of ion mobility and mass spectrometry.

The method may further comprise obtaining an ion mobility chromatogram and/or a mass spectrum based on the analysis of ions detected after one or more performances of a sequence of instances of modes including the indicated selection of one or more instances of a plurality of modes from the pool.

The method may comprise controlling the operation of at least the ion mobility separation device in accordance with the received indications upon receipt of an indication from the user that the experiment is to be performed e.g., that the selection of instances of modes and indication of parameter(s) is complete. Thus, the method may comprise causing the spectrometer e.g., at least the ion mobility separation device thereof to perform an experiment including the received selection of the instances of modes. The method may comprise triggering the initiation of separation e.g., chromatographic separation by the one or more upstream devices upon receipt of an indication that the experiment is to be performed.

The step of controlling the operation of at least the ion mobility separation device in accordance with the received indications is carried out automatically in these further embodiments as in the earlier embodiments described. The method may comprise automatically generating a set of instructions and/or a set of one or more control signals for controlling operation of at least the ion mobility separation device (and, where applicable, any other components of the spectrometer controlled by the instances of the modes) to implement a user specified set e.g., sequence of instances of a plurality of the modes. The step of generating the set of instructions may comprise using one or more sets of preprogrammed instructions for implementing given modes. The set of instructions and/or the set of one or more control signals may cause the device or spectrometer to operate in accordance with a set of one or more parameters specified by the user in respect of a mode or modes and/or in respect of an instance or instances of a mode or modes. Where a sequence of instances of modes includes automatically selected instance(s) of modes and/or parameters for use in controlling operation of at least the ion mobility separation device when implementing an instance of a mode, the set of instructions and/or set of one or more control signals may further comprise instruction(s) and/or control signal(s) for implementing the automatically selected instance(s) of modes. The control signal(s) may be generated using control circuitry.

A set of one or more processors in communication with the user interface and control circuitry of the spectrometer may receive data indicative of the received indications and cause the control circuitry of the spectrometer to cause at least the ion mobility separation device of the spectrometer to operate in accordance with the received indications (and optionally to cause any other components controlled by the instances of modes in the sequence of instances of modes to operate in accordance with the received indications). The set of one or more processors may generate a set of instructions based on the received indications which, when executed, causes the control circuitry to operate in this manner. The set of one or more instructions may implement the functions according to the sequence of instances of modes and the parameter(s) specified in relation thereto.

In accordance with any of the embodiments of the disclosure, where an indication is received from the user via the user interface, the indication may be provided by the user in any suitable manner, through interaction with the user interface. For example, this may be through touch, or through selection using a cursor, etc., or any combination of techniques. The user interface may be a visual user interface. In embodiments, the steps performed in relation to a user interface may be performed in relation to a display.

It will also be appreciated by those skilled in the art that all of the described embodiments of the technology described herein can, and in an embodiment do, include, as appropriate, any one or more or all of the features described herein.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, unless otherwise indicated, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

The methods described herein may be implemented at least partially using software e.g., computer programs. Thus, in further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc. The technology extends to a computer program product comprising computer readable instructions adapted to carry out any or all of the methods described herein when executed on suitable data processing means.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

In accordance with a further aspect there is provided a computer readable storage medium storing computer software code which when executing on a processor performs a method of controlling the operation of an ion mobility separation device, the method comprising:

- displaying to a user via a user interface a pool of modes of operation of the ion mobility separation device, wherein each one of the modes is selectable by the user for inclusion in an experiment;
- receiving, via the user interface, an indication from the user of a selection of one or more instance of each one of a plurality of the modes to be included in an experiment;
- wherein the user interface is further configured to allow the user to provide an indication of a set of one or more parameters for controlling the ion mobility separation device in implementing a selected instance of a mode, and the method further comprises receiving, via the user interface, in respect of one or more of the selected instances of modes, an indication from the user of a set of one or more parameters for controlling the ion mobility separation device in respect to the instance of the mode;
- and controlling the operation of the ion mobility separation device in accordance with the received indications.

In accordance with a further aspect there is provided a computer readable storage medium storing computer software code which when executing on a processor performs a method of controlling the operation of a spectrometer comprising an ion mobility separation device, wherein the spectrometer further comprises one or more analyte separation devices upstream of the ion mobility separation device, wherein, in use, different sets of ions enter the ion mobility separation device at different times based on sets of analyte components eluting at different times from the one or more analyte separation devices upstream thereof, the method comprising:

displaying to a user via a user interface a pool of modes of operation for controlling operation of at least the ion mobility separation device of the spectrometer, wherein each one of the modes is selectable by the user for inclusion in an experiment;

receiving, via the user interface, an indication from the user of a selection of one or more instance of each one of a plurality of the modes from the pool to be included in an experiment, wherein each instance of a mode is for use in controlling the operation of at least the ion mobility separation device of the spectrometer when analysing a respective one of the sets of analyte components eluting from the one or more analyte separation devices at different times;

wherein the user interface is further configured to allow the user to provide an indication of one or more parameters relating to a selected instance of a mode, the one or more parameters including at least one or more parameters indicative of a timing of a selected instance of a mode, and the method further comprises receiving, via the user interface, in respect of each one of the selected instances of modes, an indication from the user of a set of one or more parameters indicative of a timing of the selected instance of the mode, the timing of the selected instance of the mode being selected to result in the instance of the mode being performed in relation to analysing a particular one of the sets of one or more analyte components eluting from the one or more upstream analyte separation device;

and controlling the operation of at least the ion mobility separation device in accordance with the received indications.

The term "spectrometer" as used herein may be replaced by "spectrometer instrument". It will be understood that a spectrometer is a spectrometer instrument. It will be appreciated that a spectrometer or spectrometer instrument as used herein encompasses a spectrometer arranged to perform a hybrid technique, such as liquid chromatography-mass spectrometry (LC-MS) or gas chromatography-mass spectrometry (GC-MS).

It will also be appreciated by those skilled in the art that all of the described embodiments of the technology described herein can, and in an embodiment do, include, as appropriate, any one or more or all of the features described herein.

BRIEF DESCRIPTION OF THE DRAWINGS

Various embodiments will now be described, by way of example only, and with reference to the accompanying drawings in which:

FIG. 10 illustrates a user interface for specifying instances of modes to be included in a sequence of instances of modes to build an experiment in one embodiment, showing the user interface in a spectra view mode;

FIG. 23 illustrates an embodiment of a logic flow;

FIG. 24 illustrates another embodiment of a logic flow; and

DETAILED DESCRIPTION

Figures 1A, 1B:
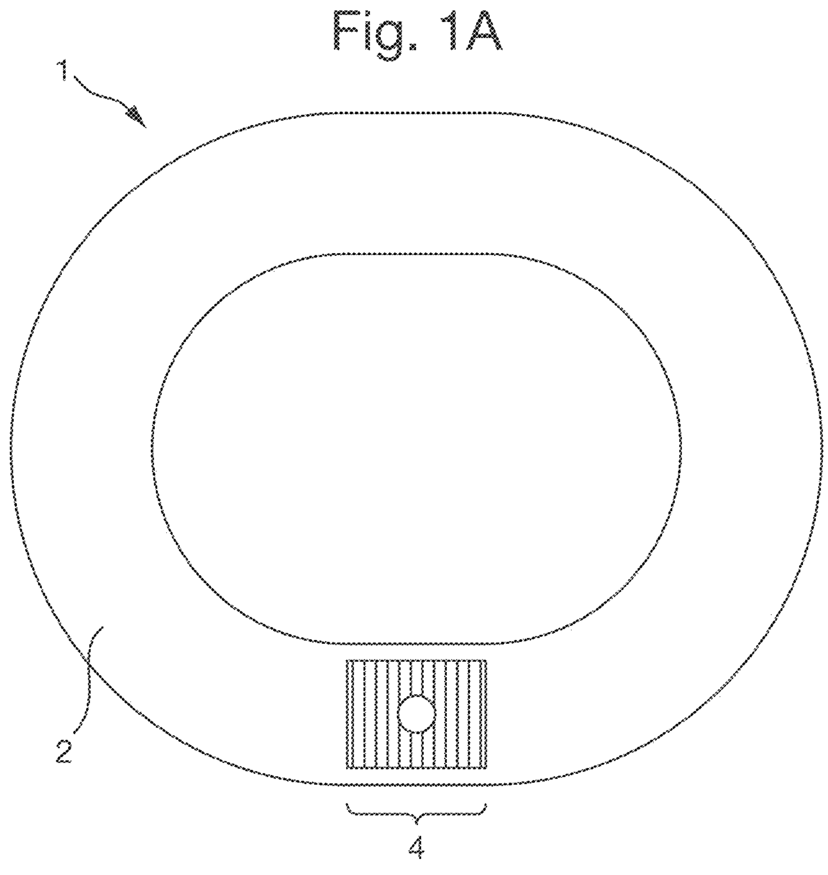
FIG. 1A shows a front view of a schematic of an ion mobility separator (IMS) device according to an embodiment.
FIG. 1B shows a cross-sectional side view of a portion of the drift cell of the IMS device of FIG. 1A, and FIGS. 1C and 1D show different views of the embodiment of FIG. 1A.

The present disclosure is generally, although not exclusively, concerned with an ion mobility separation device comprising a closed-loop ion separator. The ion mobility separation device may include any or all of the features of the ion separation devices disclosed in U.S. Pat. No. 9,984,861, entitled "Ion Entry/Exit Device", in the name of Micromass UK Limited, the entire contents of which is incorporated herein by reference. Other examples of a cyclic ion mobility separator system, to which the method disclosed herein are applicable, are described in US 2009/014641 (Micromass), the entire contents of which are herein incorporated by reference.

When performing experiments using an ion mobility separation device, the device may be operated in various modes. The modes may implement certain functions of the device. For example, an experiment will typically involve at least the device being operated in a mode such that ions are introduced into the device, a mode in which ions are separated within the device, and a mode in which ions are ejected from the device for detection. However, in certain experiments it may be desirable for the ion mobility separation device to be able to perform a more complex sequence of functions. For example, the ion mobility separation device may comprise one or more ion stores, in which ions may temporarily be stored before and/or after passing through the separator. Such stores may e.g., allow ions to be ejected from the separator and temporarily stored before being reintroduced to the separator, at desired times, or be temporarily stored before being combined with other ions which have passed through the separator, to be passed together with those other ions to a detector. The timing of e.g., the ejection or reintroduction of ions from or to the separator may be controlled to result in subsets of ions having a particular mobility or mobility range being selected for ejection or reintroduction. In other embodiments, it may be desired that at least certain subsets of ions do not pass through the separator. The ion mobility separation device may thus be operable in additional modes, such as a bypass mode in which ions bypass the separator, and e.g., pass straight to a downstream device, or a mode in which ions are ejected to a store, rather than to a detector, and so on. An experiment may be made up of a sequence of instances of modes, with a particular instance of a mode potentially being included more than once in the sequence. For example, a separation mode may be included at multiple times e.g., before and after a subset of ions is ejected from or reintroduced to the separator.

Various parameters in relation to each instance of a mode e.g., relating to the timing of the instance of the mode and/or relating to voltages for use in controlling the ion mobility separation device when operating in the instance of the mode, may need to be specified. The complexity of controlling the ion mobility separation device may be increased for closed-loop separators, as it may be desired for ions, or certain subsets of ions, to pass through the separator more than once. Thus, the duration of an instance of a separation mode may be selected depending upon the number of cycles of separation it is desired for ions to undergo. This may correspondingly affect the timing of other instances of modes in a sequence of modes defining an experiment.

Previously it has been necessary for the user to effectively reprogram the control system for the ion mobility separation device each time they wished to configure the device for a new experiment e.g., to specify the instances of modes of operation required, the parameters of each instance of a mode, and, where applicable, an order for the instances of modes, to result in the required functions being performed by the device. This may be time consuming for the user, and may require a certain degree of programming expertise.

It is desired to provide an improved technique for controlling the operation of an ion mobility separation device. In particular, it is desired to provide a method in which an ion mobility separation device may be more easily used, and which provides greater flexibility to the user in customising the device e.g., to implement a desired experiment. It is also desired to provide an improved spectrometer i.e., an improved mass spectrometer and/or ion mobility spectrometer.

FIGS. 1A-8B are included by way of background to illustrate an example of an ion mobility separator (IMS) device to which the methods described herein may be applied. The embodiments of the IMS device shown in FIGS. 1A-8B are as described in U.S. Pat. No. 9,984,861 (Micromass), previously incorporated herein by reference. It will be appreciated that the methods described herein are not limited to use with this type of IMS device. For example, the IMS device need not be a closed loop IMS device. If the IMS device is a closed loop device, it need not be of the construction described in U.S. Pat. No. 9,984,861 e.g., including the particular ion exit/entry device. Other types of cyclic IMS device are described in the aforementioned US 2009/014641 (Micromass), which is herein incorporated by reference, and in US 2007/0076926 (Micromass), the entire contents of which is incorporated herein by reference. US 2017/0076926 (Micromass) describes techniques for performing mass spectrometry on ions eluting from an IMS device.

FIG. 1A shows a front view of a schematic of an ion mobility separator (IMS) device according to an embodiment. The IMS device 1 comprises a closed-loop drift cell 2 around which the ions are guided in use. The drift cell 2 comprises a plurality of electrodes that act to confine the ions to an axial path that extends around the closed-loop drift cell 2. The drift cell 2 also comprises electrodes that urge the ions along the axial length of the drift cell. The ion guide is filled with a background gas such that as the ions are urged around the drift cell 2 they collide with the gas molecules and separate according to their ion mobilities through the gas. The ions may be urged around the closed-loop drift cell 2 once or multiple times before being extracted through an exit region 4. The ions may be urged around the drift cell 2 by applying one or more electrical potential that travels axially along the drift cell 2, or by a static DC potential gradient that is arranged axially along the drift cell 2.

FIG. 1B shows a cross-sectional side view of a portion of the drift cell 2 of the IMS device of FIG. 1A. FIG. 1B shows an embodiment of an electrode unit arrangement 5 that may be used to confine ions to the axis of the ion guiding path in the drift cell 2. At a given point along the axial length of the ion guiding path, the path may be defined between two RF electrodes 6 that are spaced apart in a first direction and two DC electrodes 8 that are spaced in a second, optionally orthogonal, direction. RF voltages are applied to the RF electrodes 6 so as to confine the ions between the RF electrodes 6, in the first direction. DC voltages are applied to the DC electrodes 8 so as to confine the ions between the DC electrodes 8, in the second direction. The electrode unit 5 is repeated along the axial length of the drift cell 2 such that ions are confined in the drift cell 2 at all points around the ion guide, except when ions are ejected from the ion entry/exit region 4, which will be described further below. The electrode units 5 are axially spaced along the ion guiding path and one of more DC potential may be successively applied to successive electrode units 5 such that a travelling DC potential travels around the drift cell 2 and hence forces the ions around the drift cell. Alternatively, different DC potentials may be applied to successive electrode units 5 around the ion guide such that a static DC gradient is applied along the axis that forces the ions around the drift cell 2.

The upper and lower sides of the drift cell 2 may be formed from printed circuit boards having the DC or RF electrodes 6,8 arranged thereon. Alternatively, or additionally, the radially inner and outer sides of the drift cell 2 may be formed from printed circuit boards having the RF or DC electrodes 6,8 arranged thereon.

Figure 1C:
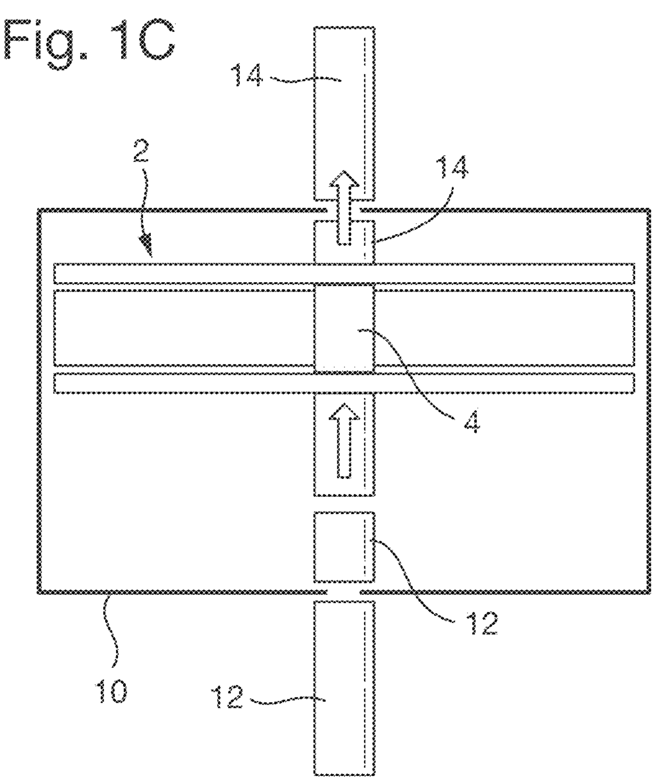
Figure 1D:
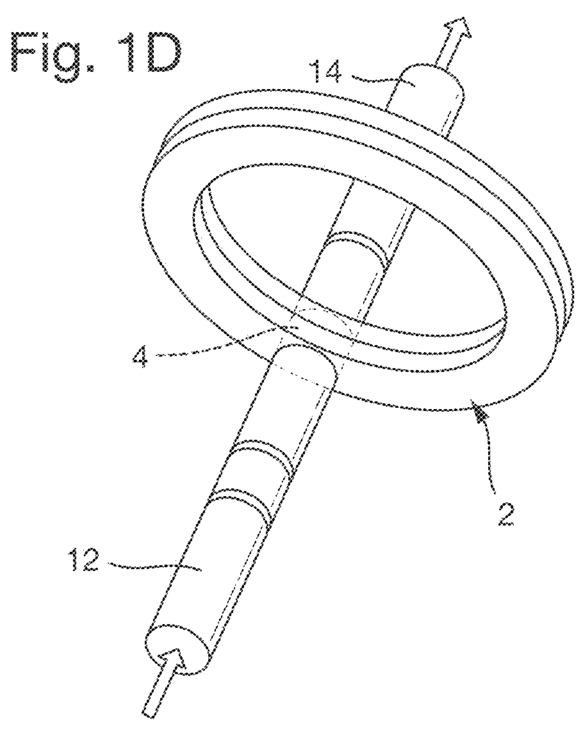

FIG. 1C and FIG. 1D show an orthogonal view and a perspective view of the embodiment of FIG. 1A respectively. The drift cell 2 is arranged inside a chamber 10 that is filled with drift gas. Ions are guided into and out of the chamber 10 using RF ion guides 12,14. The RF ion guides 12,14 are also coupled with the ion entry/exit region 4 of the drift cell 2 such that ions can be guided into the drift cell 2 and out of the drift cell 2. In this embodiment, ions are guided into the chamber 10 and into the entry/exit region 4 of the drift cell 2 by input ion guides 12. If the ions are desired to be separated by their ion mobility then the ions are urged in an orthogonal direction to the ion entry direction and are urged around the oval or racetrack ion path of the drift cell 2 e.g., when the ion entry/exit device 4, and hence the ion mobility separation device comprising the ion entry/exit device 4 is operated in an ion separation mode. As the ions pass along the ion path they separate according to their ion mobility through the drift gas that is present in the chamber 10 and hence the drift cell 2. When ions are desired to be extracted from the drift cell 2 e.g., when the ion entry/exit device 4 and hence the ion mobility separation device, is operated in an eject for detection mode, they are ejected in a direction towards the exit RF ion guides 14. The ions are then guided out of the chamber 10 by the exit ion guides 14.

On the other hand, if ion mobility separation of the ions is not required then ion species can be caused to pass from the input ion guide 12 to the output ion guide 14 directly through the entry/exit region 4 of the drift cell 2 and without passing around the drift cell 2. In other words, the ion entry/exit device 4, and hence the ion mobility separation device, may be operated in a by-pass mode.

In embodiments, it is possible to extract ions having a desired range of ions mobilities from the drift cell 2. This is achieved by causing ions to traverse around the drift cell 2 so that they separate and then synchronising the activation of one or more ejection voltages at the ion entry/exit region 4 with the time at which the ions of interest are at the entry/exit region 4. This may be achieved by timing a transition between separation and eject for detection modes appropriately. The desired ions are therefore ejected from the drift cell 2 and the other ion species remaining in the drift cell 2 can continue to pass through the drift cell 2 and separate according to ion mobility. Alternatively, the remaining ions may be discarded from the drift cell 2, for example, by removal of the RF voltages from the electrodes 6 such that the ions are no longer confined within the drift cell 2.

The ejected ions having the desired ion mobilities can be immediately transported away from the drift cell 2 to a detector, optionally first passing through a mass analyser. This may occur if an eject for detection mode is specified. Alternatively, if an eject for storage mode is specified, such ions may be trapped in an ion store whilst the next mobility cycle occurs in the drift cell 2 and until more ions of the same ion mobility range are ejected from the drift cell 2 into the ion store. An embodiment including first and second ion stores is described by reference to FIG. 9. After sufficient mobility cycles have been performed to accumulate the desired number of ions in the ion store, these ions may then be ejected for detection (when an appropriate mode of the IMS device is specified), optionally being transported to an analyser for further analysis prior to detection. This method may be used to increase the ion signal of the desired ions. Additionally, or alternatively, if an appropriate mode of the IMS device is specified, the desired ions that have been ejected from the drift cell 2 may be fragmented, activated or dissociated. A further injection mode followed by a separation mode may then be specified to result in the ions being reintroduced back into the drift cell such that the ion mobilities of the fragment, activated or product ions can be analysed by the drift cell 2.

Figure 2:
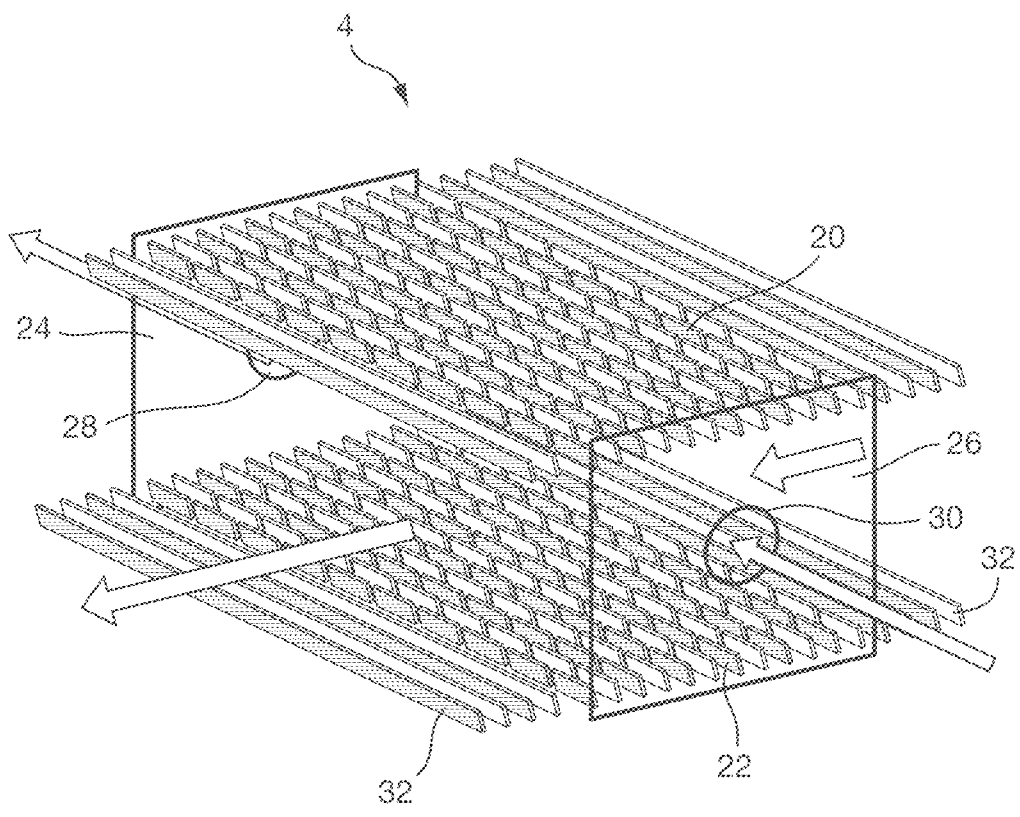
FIG. 2 shows a schematic perspective view of an embodiment of the ion entry/exit device of the drift cell.

FIG. 2 shows a schematic perspective view of an embodiment of the ion entry/exit device 4 of the drift cell 2. The ion entry/exit device 4 comprises two parallel, rectangular arrays of electrodes 20,22 that are spaced apart from each other. Each array of electrodes 20,22 comprises a plurality of electrodes arranged in rows and columns. Various electrical potentials are applied to these electrodes so as to manipulate the ions, as will be described in more detail below. The device has four sides that extend between the four edges of the arrays 20,22. Two of the opposing sides are formed by end plates 24,26, wherein each end plate has an orifice 28,30 therein. One of the end plates 26 has an ion injection orifice 30 for injecting ions into the device 4 from outside of the drift cell 2. The opposing end plate 24 has an ion ejection orifice 28 for ejecting ions out of the device 4 and the drift cell 2. The other two opposing sides are junctions with the drift electrodes 32 of the main drift cell 2. One of the junctions, the entrance junction, allows ions to pass into the device 4 from within another part of the drift cell 2. The other junction, the exit junction, allows ions to pass out of the device 4 and into another part of the drift cell 2.

RF electrical potentials are applied to the electrodes in the arrays of electrodes 20,22 in order to confine ions in the direction between the arrays 20,22. The same phase RF potential may be applied to all of the electrodes in the same column of electrodes (a column extends in the direction between the end plates 24,26 having orifices 28,30). Adjacent columns of electrodes may be maintained at different RF phases, optionally opposite RF phases. However, it is alternatively contemplated that same phase RF potential may be applied to all of the electrodes in the same row (a row extends in the direction parallel to the apertured plates 24,26). Adjacent rows of electrodes may be maintained at different RF phases, optionally opposite RF phases.

It will be seen that the ion entry/exit device 4 has plurality of modes of operation which may be used to implement modes of operation of the IMS device. Each such mode may be used to implement a given function in respect of ions, such that an experiment may be constructed from a sequence of modes of operation of the IMS device with appropriate timings. According to a first mode of operation the device 4 is operated in a manner that injects or loads ions into the device 4 from outside of the drift cell 2. The device 4 may also be operated in another mode that urges ions out of the ion entry/exit device 4 into an adjacent part of the drift cell 2. The device 4 may also be operated in another mode which ejects ions out of the device 4 to a region outside of the drift cell 2. These modes will now be described with reference to FIGS. 3 and 4.

Figure 3:
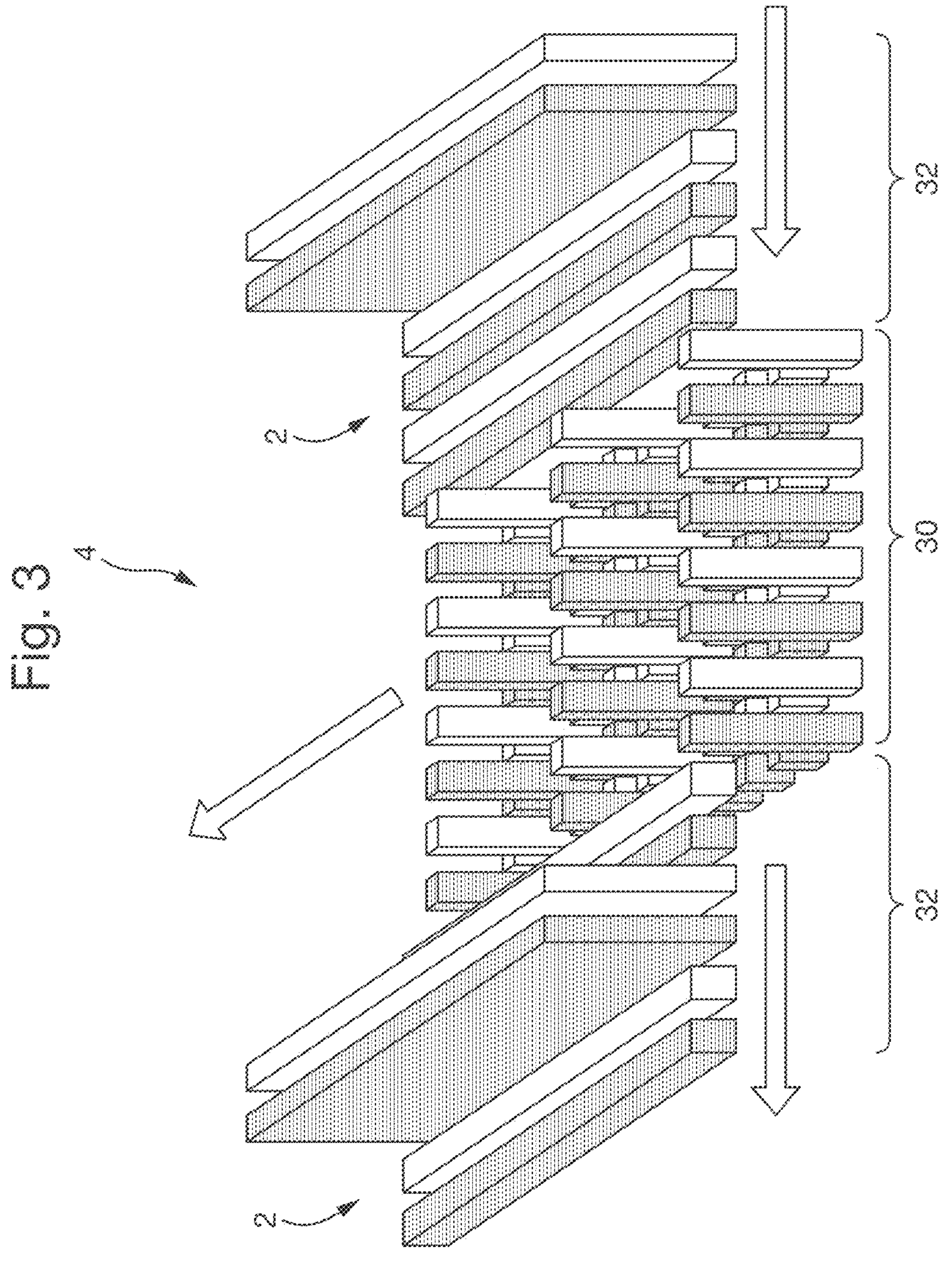
FIG. 3 shows a schematic of the electrical potentials that are applied to the ion entry/exit device during a mode in which ions are injected/loaded into the entry/exit device from outside of the drift cell.

FIG. 3 shows a schematic of the electrical potentials that are applied to the ion entry/exit device 4 and the adjacent parts of the drift cell 2 on either side of the device 4 during a mode in which ions are injected/loaded into the entry/exit device 4 from outside of the drift cell 2. The array of dark and light vertical bars 30 represent the potentials applied to either or both of the electrode arrays 20,22 in the ion entry/exit device 4. The colours of the vertical bars 30 represent the RF phases applied to the electrodes in the arrays 20,22, e.g., light coloured vertical bars represent one RF phase and dark coloured RF bars represent the opposite RF phase. The vertical heights of the vertical bars 30 represent the magnitudes of the DC voltages applied to the electrodes in the array(s) 20,22. It can be seen that relatively high amplitude DC potentials are applied to all of the electrodes in some of the rows of electrodes, and that relatively low amplitude DC potentials are applied to all of the electrodes in the adjacent rows of electrodes. During the mode in which ions are injected/loaded into the device 4, the DC potentials applied to the electrodes in the arrays 20,22 are varied with time such that the high DC voltages are successively applied to successive rows of electrodes in a direction from the ion injection orifice 30 towards the ion ejection orifice 28, and such that DC potential barriers travel in the direction from the ion injection orifice 30 towards the ion ejection orifice 28. Simultaneously, the low DC voltages are successively applied to successive rows of electrodes in a direction from the ion injection orifice 30 towards the ion ejection orifice 28. This causes ions to be forced into the ion entry/exit device 4 by the high amplitude DC voltages, wherein the ions travel in the regions of low DC voltages. The end plate having the exit orifice 28 may be maintained at a DC or RF potential such that ions are prevented from exiting the ion entry/exit device 4 during loading/injection of ions. Alternatively, or additionally, the amplitude of the high DC potentials may decrease as they travel in the direction towards the exit orifice 28. Alternatively, or additionally, a row of electrodes proximal to the exit orifice 28 may be maintained at high DC potentials so that the ions cannot be forced past this row and out of the ion entry/exit device 4 during loading.

The horizontally elongated bars 32 in FIG. 3 represent the potentials of electrodes in regions of the drift cell 2 that are adjacent to the ion entry/exit device 4. The colours of these horizontal bars represent the RF phases applied to the electrodes, e.g., light-coloured bars represent one RF phase and dark-coloured bars represent the opposite RF phase. The vertical heights at which the horizontally elongated bars 32 are located represent the magnitudes of the DC voltages applied to the electrodes. As can be seen, most of the horizontally elongated bars 32 are at a relatively low DC potential, but some of these bars are at a higher DC potential. These higher DC potentials are successively applied to successive electrodes along the axial length of the drift cell 2 so that a DC potential barrier travels along the axial length of the drift cell 2 and drives ions around the drift cell 2, which will be described in more detail in relation to FIG. 4. The aperture plates 24, 26 may have high and low DC voltages applied, respectively.

Referring again to FIG. 3, the vertical heights at which the upper surfaces of the horizontally elongated bars 32 are located represent the magnitudes of the DC voltages applied to the electrodes. It can be seen that the magnitude of the low DC potentials applied to the electrode arrays 20,22 during ion loading/injection is smaller than the DC potentials at which the axially adjacent regions of the drift cell 2 is maintained. As such, the ions are prevented from passing from the ion entry/exit region 4 into the adjacent regions of the drift cell 2 during the ion loading/injection mode. This may implement an ion introduction/injection mode of the IMS device.

Once the ions have been loaded/injected into the ion entry/exit device 4, all of the electrodes in the array 20,22 may be maintained at the relatively low DC potential, i.e., there is no longer a need to drive ions in the direction between the end plates 24,26 having the orifices 28,30 and so the high DC potentials may be replaced by low DC potentials. The two end plates 24,26 may be maintained at DC or RF potentials that prevent ions from exiting through the end plates 24,26. The DC potentials applied to the end plates 24, 26 may match the DC potential of the electrode 8. The DC potentials applied to the electrodes in the arrays 20,22 may then be increased to the same value as the low DC potentials of the axially adjacent regions of the drift cell 2. There is then no DC barrier between the ion entry/exit region 4 and the axially adjacent portions of the drift cell 2. As such, ions may then pass easily from the ion entry/exit device 4 into the adjacent portion of the drift cell 2 so as to be separated according to their ion mobilities, as will be described with reference to FIG. 4. This may implement a separation mode of the IMS device.

Figure 4:
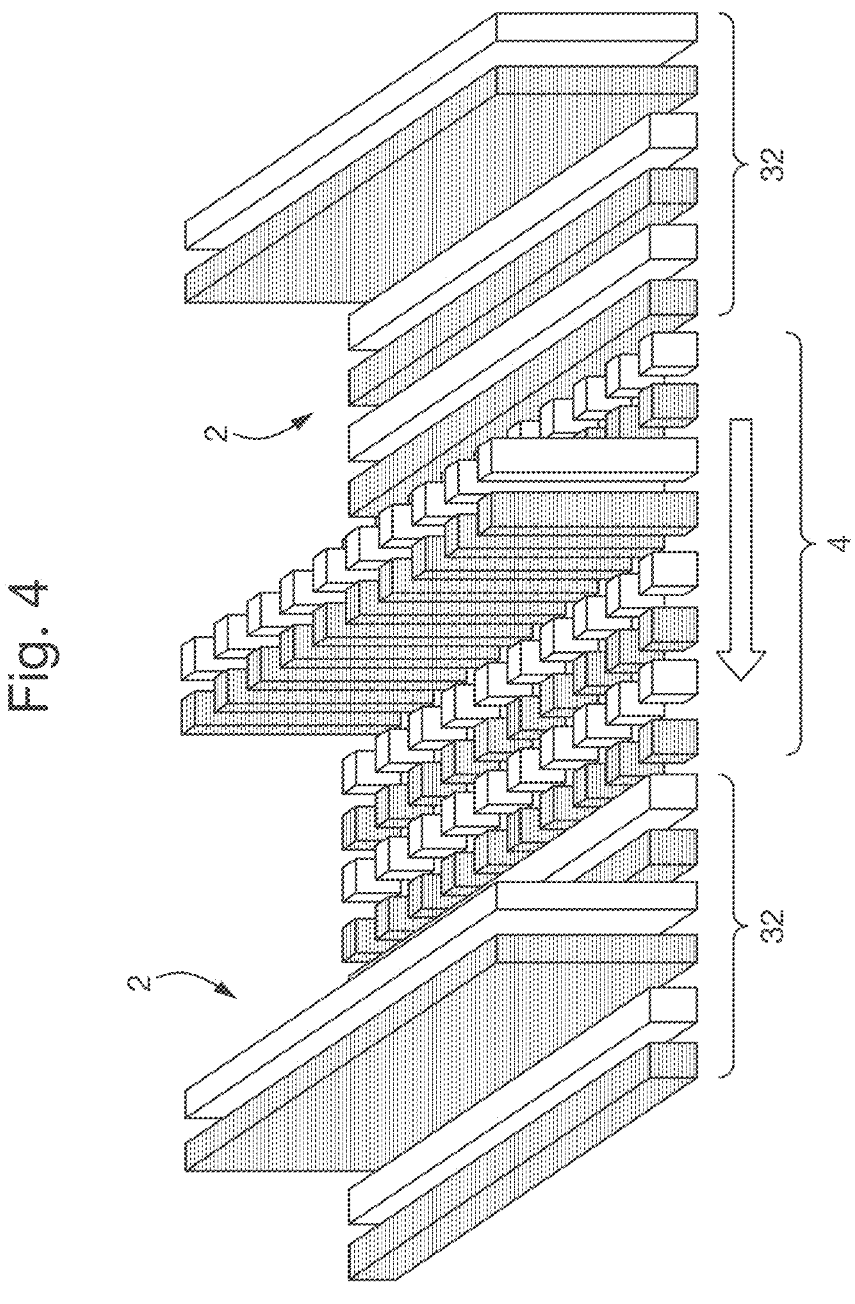
FIG. 4 shows the electrical potentials that are applied to the ion entry/exit device during a mode in which ions are driven out of the ion entry/exit region and into the adjacent part of the drift cell.

FIG. 4 shows the electrical potentials that are applied to the ion entry/exit device 4 and the axially adjacent parts of the drift cell 2 during a mode in which ions are driven out of the ion entry/exit region 4 and into the adjacent part of the drift cell 2. As described above, after ions have been loaded/injected into the ion entry/exit device 4 the DC potentials applied to the arrays of electrodes 20,22 are raised to correspond to the DC potentials of the adjacent parts of the drift cell 2. As such, there is no longer a DC barrier between the ion entry/exit device 4 and the adjacent parts of the drift cell. As shown in FIG. 4, the DC potentials applied to two columns of electrodes in the electrode arrays 20,22 are then increased to high DC voltages relative to the other electrodes in the arrays 20,22. These high DC voltages are successively applied to successive columns in the arrays 20,22 such that the high DC voltages move along the arrays in the axial direction of the drift cell 2, as indicated by the arrow in FIG. 4. This causes the ions to be driven out of the ion entry/exit device 4 and through the exit junction. The ions then pass into the axially adjacent portion of the drift region 2. The high DC voltages that drove the ions out of the ion entry/exit device 4 may then be successively applied to successive electrodes along the axial length of the remainder of the drift region 2 so as to continuously drive the ions around the entire drift region 2. Examples of such voltages are shown by the relatively high horizontally elongated bars in FIG. 4.

The ions are driven around the closed-loop drift cell 2 by the travelling DC voltages and back into the ion entry/exit device 4 through the entrance junction. The ions may be ejected from the drift cell 2 at this point, as will be described in more detail below. Alternatively, the ions may again be driven through the ion entry/exit device 4 by applying the travelling DC potentials to the columns of electrodes in the electrode arrays 20,22 and then driven around the drift cell 2 by the travelling DC potentials applied to the remainder of the drift cell electrodes. The ions may be driven around the drift cell 4 by this process as many times as is desired, until the ions have separated according to their ion mobility as desired. In this mode, the translation of the high DC potentials that drive ions through the ion entry/exit device 4 and into the axially adjacent part of the drift region 2 is optionally synchronised with the translation of the high DC potentials around the rest of the drift region. As such, the ion entry/exit region 4 is substantially ion-optically identical to the remainder of the drift region 2 during the mode of operation in which the ions are translated around the closed-loop drift cell a plurality of times.

When it is desired to eject ions from the drift cell, the DC potentials applied to the arrays of electrodes 20,22 in the ion entry/exit region 4 may be lowered again relative to the adjacent parts of the drift cell 2 as shown in FIG. 3. This may implement an ion ejection mode of the IMS device e.g., for detection. DC potentials may then be applied to the arrays of electrodes 20,22 so as to drive ions in the direction from the injection orifice 30 of the injection end plate 26 to the ejection orifice 28 of the ejection end plate 24. Aperture plates 24, 26 may have low and high DC voltages applied respectively. This is performed in the same manner as the ion loading/ejection mode of FIG. 3, except that in the ejection mode there is no potential barrier preventing the ions exiting the ion entry/exit device through the ejection orifice 30 of the ejection end plate 26. It will be appreciated that alternatively the ions could be ejected from the ion entry/exit device 4 through the same orifice 30 that they were loaded/injected by translating the high DC potentials in the opposite direction to the loading/injection direction.

The ion entry/exit region 4 may operate in a bypass mode in which ions are not desired to be driven around the closed-loop drift cell 2, and in which the ions are not caused to separate. This mode is the same as that described in relation to FIG. 3, except that the ions simply pass directly from the entrance orifice 30 and out of the exit orifice 28 without being transmitted orthogonally into the axially adjacent portion of the drift cell 2. The aperture plates 24, 26 may both have low DC voltages applied, respectively. This may implement a bypass mode of the IMS device. The ions may be prevented from passing into the axially adjacent portion of the closed-loop drift cell 2 by the DC potentials on the electrodes arrays 20,22 being lower than those of the adjacent parts of the drift cell 2. The ions may or may not be driven through the ion entry/exit region 4 by the high DC potentials described in relation to FIG. 3.

Figures 5A, 5B:
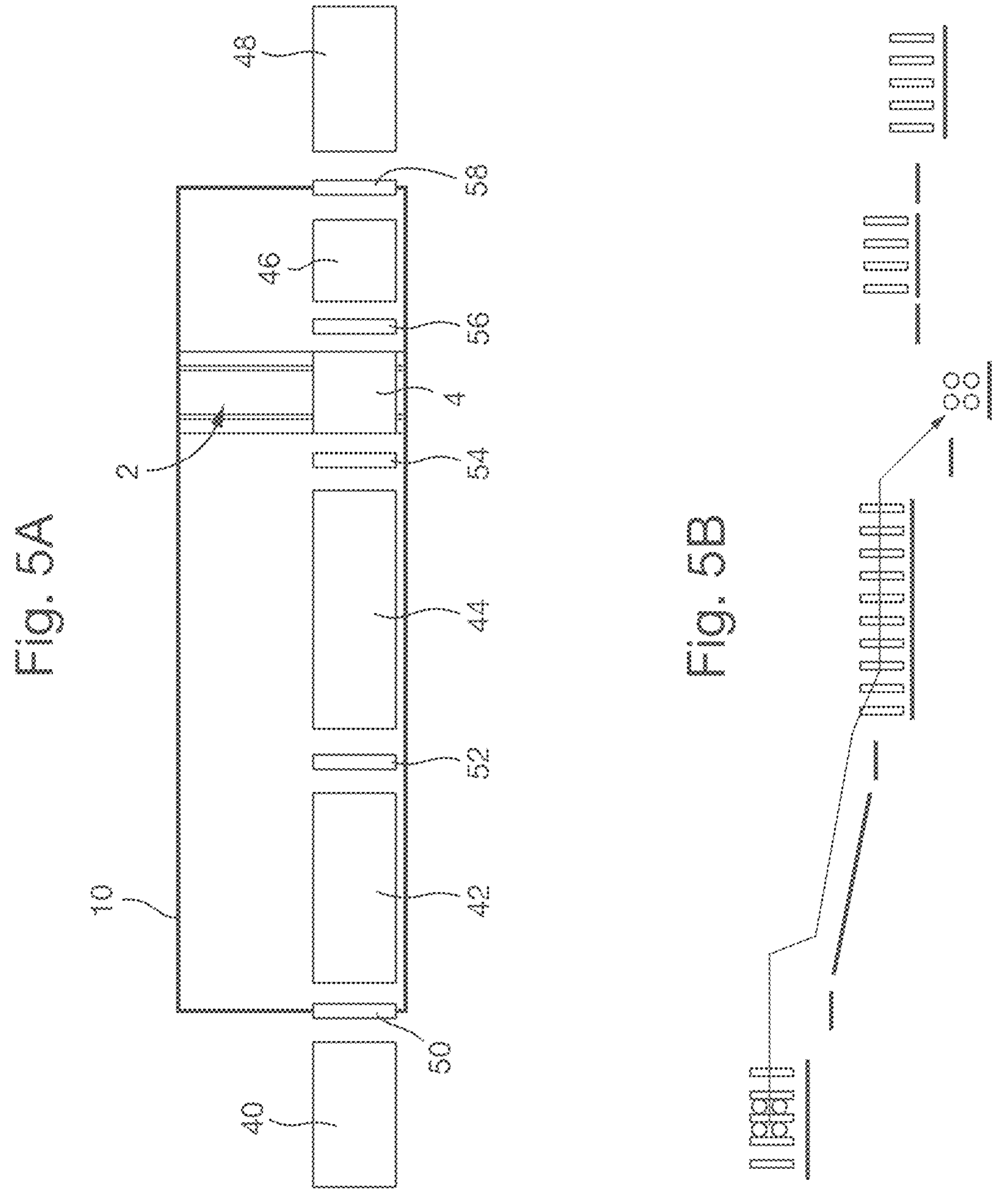
FIG. 5A shows a schematic of an embodiment of a spectrometer comprising the IMS device.
FIG. 5B shows a potential energy diagram of the DC potentials applied to the components of the spectrometer in a mode in which ions are being accumulated in the ion entry/exit device of the drift cell.

FIG. 5A shows a schematic side view of an embodiment of a spectrometer comprising the IMS device. The spectrometer comprises a drift gas chamber 10, an ion trap 40, a helium cell 42, an ion accumulation cell 44, the IMS device 2, an exit cell 46 and an ion transfer cell 48. Electrode gates 50-58 are arranged between the above described successive components. In particular, an entrance gate 54 is arranged upstream of the ion entry/exit device 4 and an exit gate 56 is arranged downstream of the ion entry/exit device 4. The IMS device 2 corresponds to that shown in FIG. 1C.

FIG. 5B shows a potential energy diagram of the DC potentials applied to the components of the spectrometer in a mode in which ions are being accumulated in the ion entry/exit device 4 of the drift cell 2. Ions are released from the ion trap 40 and are then driven through the helium cell 42 by an axial electric field. The ions then pass through the ion accumulation cell 44 and into the ion entry/exit device 4 through the ion entrance orifice 30 in the entrance end plate 26 described above in relation to FIG. 2. The DC potentials of the electrodes in the electrode arrays 20,22 of the ion entry/exit device 4 are maintained lower than the DC potentials applied to the accumulation cell 44, the entrance gate 54 and the exit gate 56. As such, ions are axially trapped and accumulate in the ion entry/exit device 4. The ions enter the ion entry/exit device 4 through the entrance orifice 30 of the entrance end plate 26 described above in relation to FIG. 2. A travelling DC wave may be applied to the rows of electrodes in the electrode arrays 20,22 in order to urge ions into the ion entry/exit device 4, as described with reference to FIG. 3. The DC potential of the IMS drift cell 2 (excluding the ion entry/exit device 4) is represented by the horizontal line that is parallel and vertically above the line representing the DC voltage applied to the arrays 20,22 of the ion entry/exit device 4. The potential difference represented by the gap between these two lines prevents ions from passing out of the ion entry/exit device 4 and into the axially adjacent parts of the IMS drift cell 2.

Figures 6A, 6B:
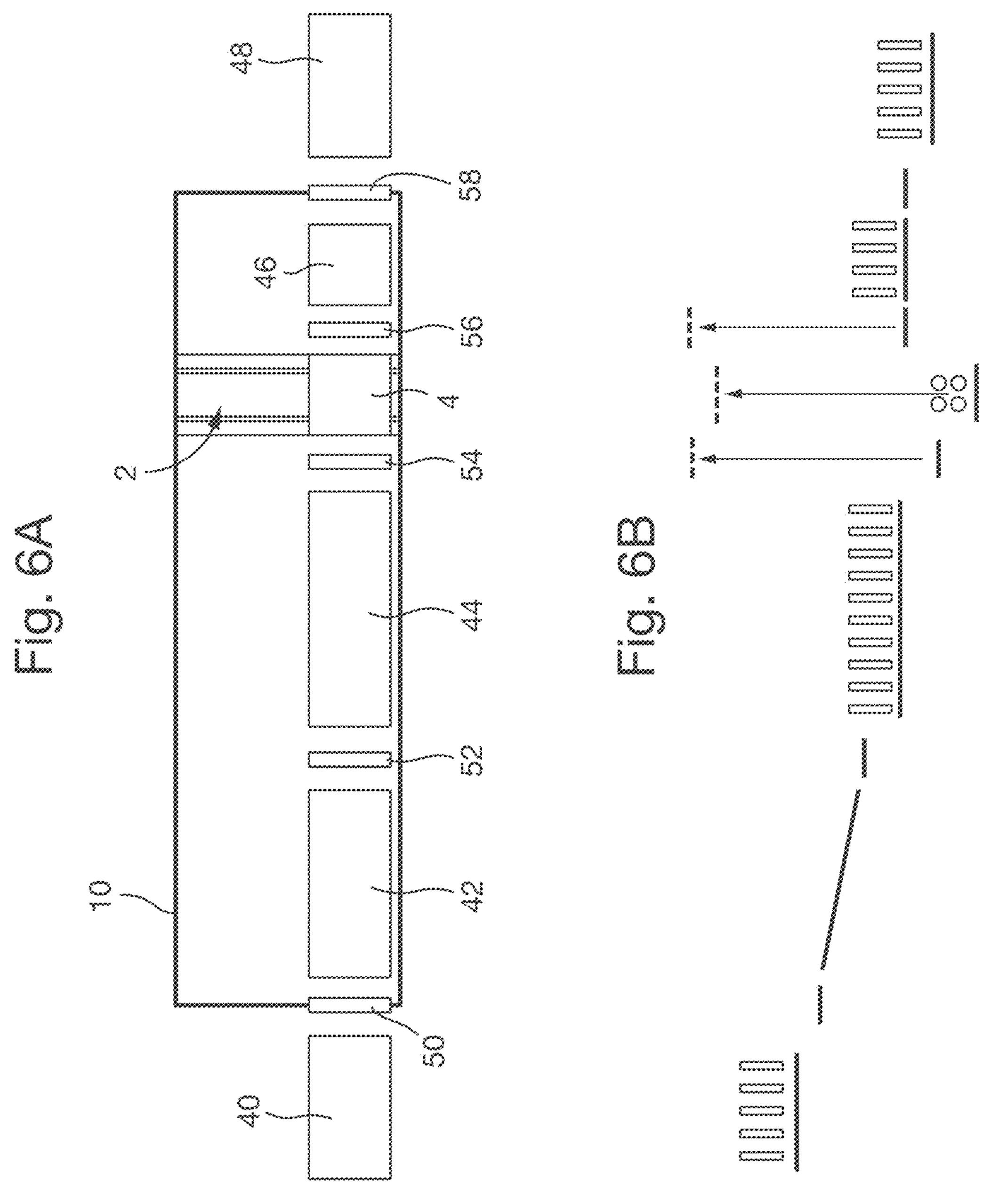
FIGS. 6A and 6B show how the potentials applied to the spectrometer are altered in preparation for moving ions from the ion entry/exit device into the axially adjacent part of the IMS drift cell.

FIGS. 6A and 6B correspond to FIGS. 5A and 5B, except that they show how the potentials applied to the spectrometer are altered in preparation for moving ions from the ion entry/exit device 4 into the axially adjacent part of the IMS drift cell 2. As shown by the arrows in FIG. 6B, the DC potentials of the entrance gate 54, array electrodes 20,22 and exit gate 56 are raised to the DC potentials illustrated by the horizontal dashed lines. The DC potentials applied to the arrays of electrodes 20,22 are then equivalent to the DC potentials applied to the adjacent parts of the IMS drift cell 2, and hence there is no DC barrier preventing ions from passing from the ion entry/exit device 4 into the adjacent part of the IMS drift cell 2.

Figures 7A, 7B:
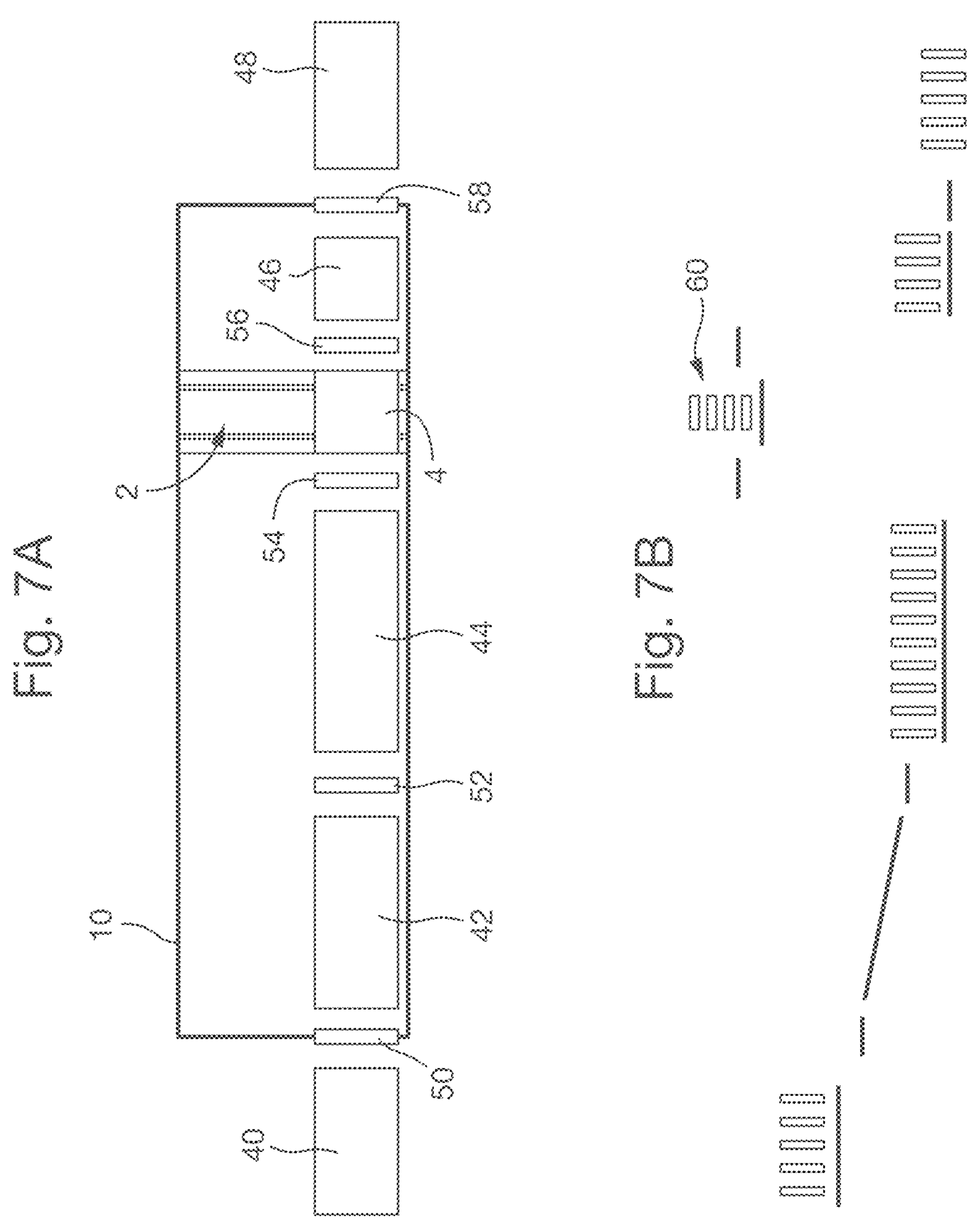
FIGS. 7A and 7B show the DC potentials applied to the spectrometer at a stage when the ions are driven out of the ion entry/exit device into the adjacent part of the IMS drift cell.

FIGS. 7A and 7B correspond to FIGS. 6A and 6B, except that they show the potentials at a stage when the ions are driven out of the ion entry/exit device 4 into the adjacent part of the IMS drift cell 2. As described above with reference to FIG. 4, the ions are driven out of the exit aperture 28 in the apertured exit plate 24 by applying DC travelling potentials to the columns of electrodes in the arrays of electrodes 20,22. These travelling potentials are illustrated by the series of parallel horizontal lines 60 in FIG. 7B. The ions are then driven around the drift cell 2 by travelling DC potentials such that the ions separate according to their ion mobilities, as has been described above. When the ions have passed around the drift cell 2 the desired number of times, the ions may be ejected at the ion entry/exit device 4. The length of time the potentials of the electrode arrays 20,22 are in the mode shown in FIG. 7B dictates how many passes the ions of given ion mobility make around drift cell 2. This timing may be based upon a desired path length, and hence resolution, for the ion separation mode of the IMS device.

Figures 8A, 8B:
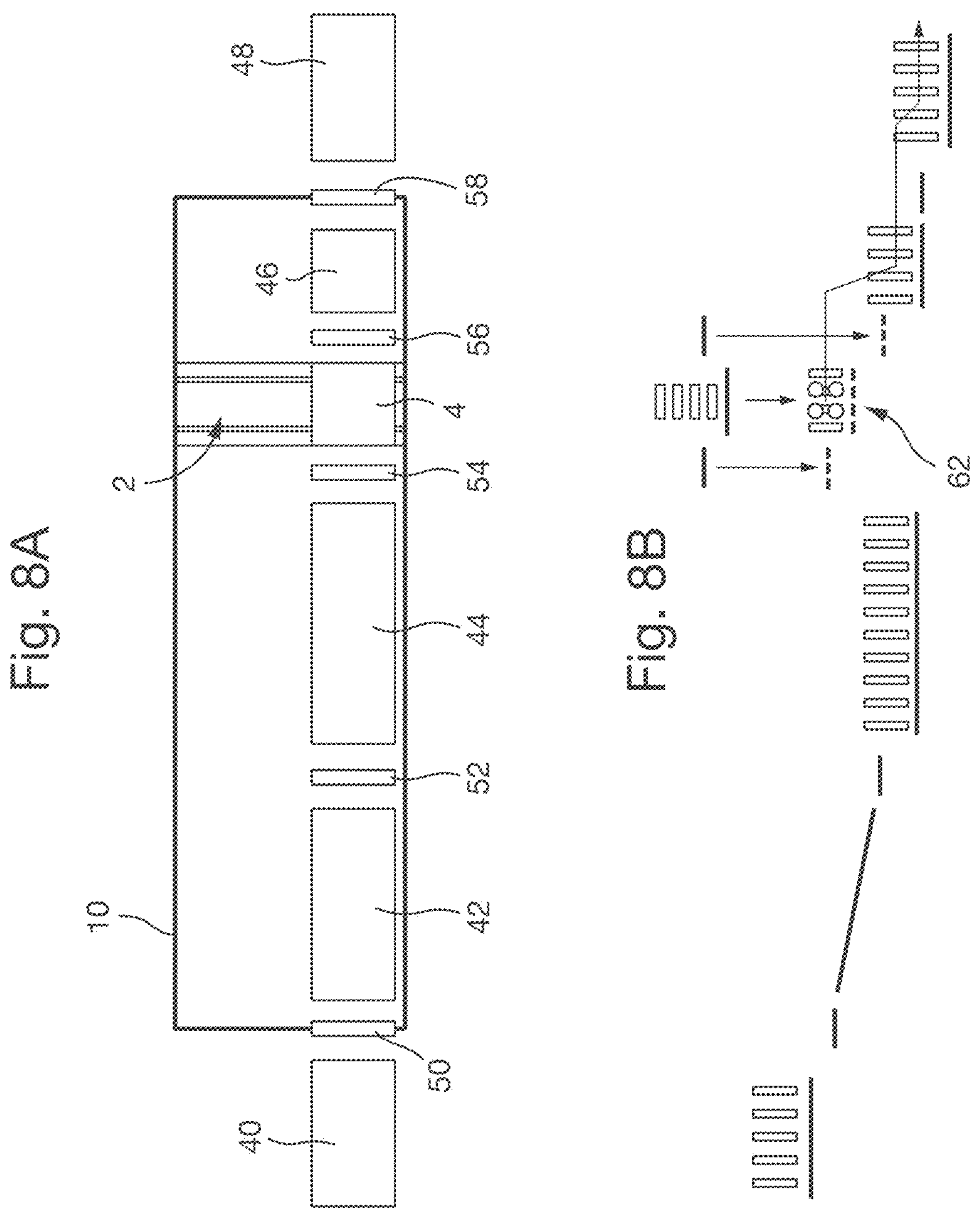
FIGS. 8A and 8B show the DC potentials applied to the spectrometer at a stage when the ions are ejected from the drift cell at the ion entry/exit device.

FIGS. 8A and 8B correspond to FIGS. 7A and 7B, except that they show the DC potentials applied to the spectrometer at a stage when the ions are ejected from the drift cell 2 at the ion entry/exit device 4. As shown by the arrows in FIG. 8B, the DC potentials of the entrance gate 54, array electrodes 20,22 and exit gate 56 are lowered to the DC potentials illustrated by the horizontal dashed lines. The DC potentials of the entrance gate 54, array electrodes 20,22, exit gate 56, exit cell 45 and ion transfer cell 48 progressively decrease such that the ions are urged out of the ion entry/exit device 4 and along the spectrometer towards the ion transfer cell 48. The ions leave the ion entry/exit device 4 through the exit orifice 28 of the exit end plate 24 described above in relation to FIG. 2. A travelling DC wave is applied to the rows of electrodes in the electrode arrays 20,22 in order to urge ions out of the exit orifice 28. This is represented by the series of vertical lines 62 in the electrode array region of FIG. 8B.

Varying the potentials applied to the ion entry/exit device 4 relative to the remainder of the drift cell 2 during loading or ejection of ions at the ion entry/exit device 4 facilitates ion entry and exit from the drift cell 2 without having to alter the potentials of the other components of the spectrometer that are upstream or downstream. This also enables a bypass mode in which ions are not separated in the drift cell 2. For example, the DC potentials of the entrance gate 54, electrode arrays 20,22 and exit gate 56 may be made equivalent to the DC potentials of the accumulation cell 44 and exit cell 46 such that ions pass continuously from the accumulation cell 44, through the ion entry/exit device 4 and into the exit cell 46 without being separated in the drift cell 2.

The travelling DC waves applied to the drift cell 2 outside of the ion entry/exit device 4 may be operated continually during the above modes.

For example, although travelling DC potentials have been described as being used for driving ions around the region of the drift cell 2 outside of the ion entry/exit device 4, static DC gradients may be used instead for this purpose.

It will be appreciated that drift cells 2 having continuous ion guiding paths of shapes other than circular or oval paths are also contemplated as being within the scope of the present disclosure.

The drift cell 2 (or other type of device) need not be a closed-loop device around which ions are guided. For example, the ion entry/exit device 4 could be used in a linear device. The ions may pass along such a non-closed loop device once, or may be reflected along the device multiple times.

The geometry of the electrode arrays 20,22 may be varied and need not be arrays having columns and rows of electrodes.

The direction of the travelling DC potentials in the electrode arrays may be changed or may provide multiple directional travel options.

It will be appreciated that, although not shown in FIGS. 5A to 8B, the IMS device may be coupled to a mass analyser for performing mass spectrometry on ions leaving the device. Such arrangements are shown, for example, in US 2017/0076926 (Micromass), the entire contents of which is incorporated herein by reference. For example, ions may be passed via the transfer cell 48 to a mass analyser of a mass spectrometer, such as a Time of Flight mass analyser.

Figure 9:
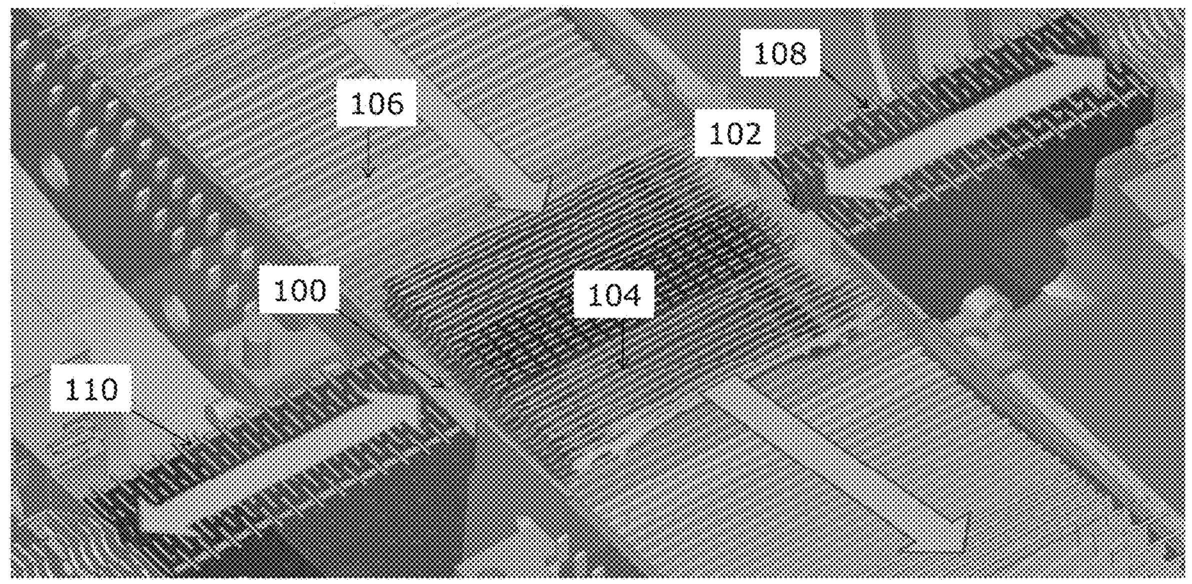
FIG. 9 illustrates the arrangement of stores associated with an array of an ion entry/exit device in one embodiment.

Referring to FIG. 9, a detail of an IMS device in the region of the ion entry/exit device is shown. This is similar to the earlier embodiments described, but illustrates in more detail the possible location of ion stores associated with the separator. The IMS device includes an entrance 100 and an exit 102 to a cyclic drift cell 106, and one or more array of electrodes 104 for controlling the movement of ions in the region of the entrance and exit to provide an ion entry/exit device as in the earlier embodiments. In use, ions may travel around the cyclic drift cell in the direction of the arrows extending along the direction of the drift cell. A first ion store 110 is provided on one side of the drift cell 106, and extends in a direction orthogonal to the direction of movement of ions around the drift cell 106. A second ion store 108 is provided on an opposite side of the drift cell 106, again extending in a direction orthogonal to the direction of movement of ions around the drift cell 106. The first and second ion stores may be referred to as pre and post ion stores respectively, based on their position relative to the array 104. The ion entry/exit device may control the movement of ions to enter or leave either of the ion stores at desired times during operation of the IMS device as shown by the arrows superposed on the stores. For example, ions may be caused to enter a respective store when an instance of an "eject to prestore" or "eject to post store" mode is implemented.

FIG. 10 illustrates an embodiment of a user interface which may be used to build an experiment made up of a sequence of instances of modes of operation of the IMS device. In some embodiments, user interface may be presented to a user via a display device of a computing device (see, for example, FIG. 25). The computing device may be communicatively coupled to an IMS device or otherwise operative to receive information therefrom (for instance, via a data store). In various embodiments, computing device may include processing circuitry or other logic(s) for implementing the user interfaces, methods, processes, and/or the like according to various embodiments. Processing circuitry or logic may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 2100. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

The user interface includes a first area 202 in which a pool of available modes of operation of the IMS device are listed. These include modes for the injection of ions to the separator e.g., drift cell, the separation of ions in the separator e.g., drift cell, the ejection of ions from the separator to the pre-store, the reinjection of ions to the separator from the pre store, the ejection of ions from the separator to the post store, the reinjection of ions from the post store to the separator, a bypass mode in which ions pass through the IMS device without undergoing separation, and a mode in which ions are ejected for detection/data acquisition ("eject and acquire"). This list of modes is merely exemplary. A minimal list might include only inject, separate and eject and acquire modes. A bypass mode may also be present. More complex modes such as inject and activate might be used. The pool of modes may be customised as desired.

The user may select any one of the modes in the pool to add an instance of the mode to a list of selected instances of modes in a second region 204 of the interface. This list of selected instances of modes is in the form of a table, including columns in which various parameters for configuring the IMS device in respect of each selected instance of a mode are displayed. These parameters include parameters relating to the timing of the instance of the mode, and parameters relating to voltages associated with implementation of the instance of the mode. The way in which the parameters may be defined by a user will be described below.

A user may delete instances of modes once added to the list in the second area of the interface and/or reorder the instances of modes as required, until an ordered sequence of instances of modes desired to be run as an experiment is obtained. Once the user is happy with the sequence, and all parameters have been set as desired, the user may select a "append sequence" button 206 to initiate performance of the sequence, i.e., the injection of ions to be subject to the functions defined by the sequence of instances of modes. It will be appreciated that the sequence will typically be performed repeatedly, in relation to successive pulses of ions. A sequence will be completed before a new set of ions is injected in a repeat of the sequence. This may be performed continually until the user specifies a new experiment i.e., provides a new sequence of instances of modes and associated parameters. The user may also save a sequence of instances of modes and the associated parameters once specified using a save sequence button 208. A "load sequence" button may be used to load a saved sequence. It will be appreciated that the list of available modes in the pool may be customised, and need not correspond to the example given. Typically, at least bypass, injection, ejection and separation modes are available. Additional modes might include one or more eject for further processing modes, such as a fragmentation or activation mode. This may allow a subset of ions to be subjected to such processing prior to be reintroduced to the separator.

Some ways in which timing parameters in relation to an instance of a mode may be defined will now be described. As shown in FIG. 10, in the table in the second area 204, in respect of each instance of a mode, columns for adding timing parameters are provided. These include a duration ("time"), and an absolute end time ("time abs"). Of course, any suitable timing parameters may be used indicative of a duration and some reference absolute time. Initially default values of the parameters may be shown. The user may simply input the desired times into the text boxes or modify default values. Alternatively or additionally, the user may input the timing data through interaction with a displayed ion mobility chromatogram. It is also envisaged that a timing parameter e.g., a duration of an instance of a mode, may be set relative to another time e.g., a proportion or fraction of the duration of another instance of a mode e.g., 80% of duration of a given instance of a separation mode.

In a third area 210 of the interface, spectra are displayed. These include a mass spectrum 212 and an ion mobility chromatogram 214. The spectra are based upon substantially real time data. When ions are ejected from the IMS device for detection, they pass through a mass analyser and are detected. A mass spectrum is obtained based on the detected ions. In addition, an ion mobility chromatogram is obtained based on detected ions. The user is able to interact with the ion mobility chromatogram to specify timings in relation to selected instances of modes as described below.

The ion mobility chromatogram and mass spectrum are substantially real time i.e., based on substantially real time data. It will be appreciated that a data acquisition time will typically be defined for the system, being the time period over which data obtained using detected ions is summed. Thus, the real time chromatogram or mass spectrum may reflect the result of analysing only the last pulse of ions, or may be based upon summing the results of analysing multiple pulses of ions. The number of pulses of ions will depend upon the data acquisition time, and the time for a pulse to pass through the IMS device and be detected. Generally, a new pulse is only introduced once a preceding pulse has exited the device, and thus the timing of injection of pulses of ions will tend to be separated at least by the duration of the specified sequence of instances of modes. By way of example, if the sequence length is 100 ms, and the acquisition time has been set as 1 sec, data from ten pulses of ions would be expected to be summed in obtaining the substantially real time chromatogram or mass spectrum. However, the sequence length may vary, and could be up to a number of seconds depending upon the complexity of the sequence. Thus, the time period to which data used in obtaining a chromatogram or mass spectrum which is considered to be substantially real time relates may cover a time period of such an order, and may vary depending upon factors such as sequence length.

It will be appreciated that a mass spectrometer may be arranged to provide ion mobility data when operating in an ion mobility mode. For example, rather than summing all mass spectra obtained to provide a resultant spectrum, a sequence of a given number of mass spectra e.g., 200 acquired following a pulse may be used to obtain a drift time dimension, and hence provide ion mobility data. Mobility timing data may be based upon a known spectrum number, together with a knowledge of the temporal length of each spectrum. For example, if spectra are acquired every 50 microsecs, then 200 mass spectra represent 10 ms of drift time. The time to pass through the Time of Flight mass analyser is not recorded as part of the drift time.

Figure 13:
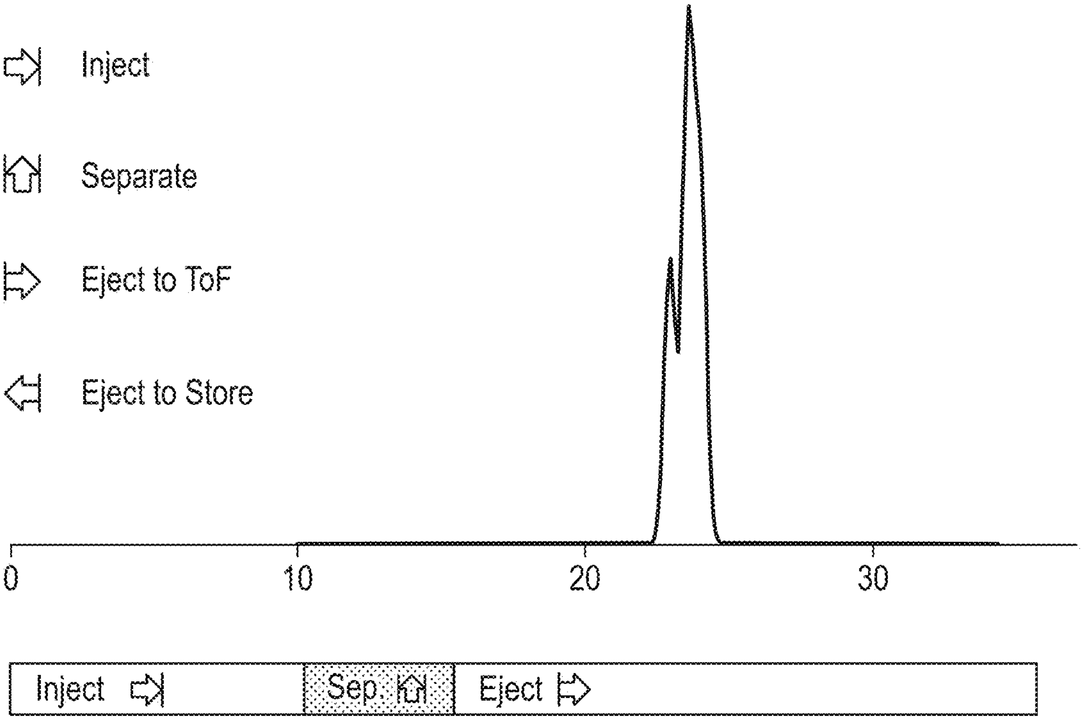
FIG. 13 illustrates an alternative way of labelling the instances of modes represented by a bar shown alongside a chromatogram used in setting timings of the instances of modes.

As may be seen in FIG. 10, a horizontal bar 216 is displayed aligned with the time axis of the chromatogram 214. The bar includes a plurality of horizontal portions, 218, 220 etc., each representing a given instance of a mode selected by the user. Here, the portion labelled "3" corresponds to the third instance of a mode i.e., "eject to pre-store" in the list of modes in the table in the second area 204, and so on. Alternatively the portion may be labelled with a description of the mode, as shown in FIG. 13 (eject to ToF refers to eject to Time of Flight mass analyser, corresponding to an eject for detection/data acquisition mode). Any suitable way of identifying to which mode the instance of a mode represented by a portion of the bar relates may be used. For example, any one or ones of numbers, icons, written descriptions etc. may be used.

When the user selects an instance of a mode in the table in area 204, two marker lines, labelled A and B appear overlaid on the chromatogram display. In the example illustrated in FIG. 10, the third instance of a mode in the sequence i.e., "eject to prestore" has been selected. This selection may be made by highlighting the instance of a mode in the table in the second region 204, or by highlighting the relevant portion of the bar in the third area 210. The user may drag the markers A and B to adjust the boundaries of the portion of the bar, and hence adjust the timing of the instance of the mode. The markers A and B extend to be overlaid over the chromatogram. In this way, the user may select a subset of the ions corresponding to ions having a particular mobility range to be subject to a particular function corresponding to a given instance of a mode e.g., to be ejected to or from a store, subjected to fragmentation etc. The values of the time parameters shown in the table in area 204 are updated as the boundaries are moved.

The user may add a new instance of a mode directly to the bar, such that a portion of the bar is added corresponding to the instance of the mode. This may be achieved by dragging and dropping a mode from the pool of modes in the first area 202 into a position on the bar. A portion of the bar will then be defined on the bar, whose boundaries may be manipulated as described above to adjust the timing of the instance of a mode. The table in area 204 will then be updated. Thus, to add an instance of a mode, the user may drag a mode from the pool in area 202 into the table in area 204 or onto the bar in area 210. The portions of the bar may be dragged to manipulate their position relative to one another to adjust the order of instances of modes to provide an alternative to specifying the order in the table in area 204.

Figure 11:
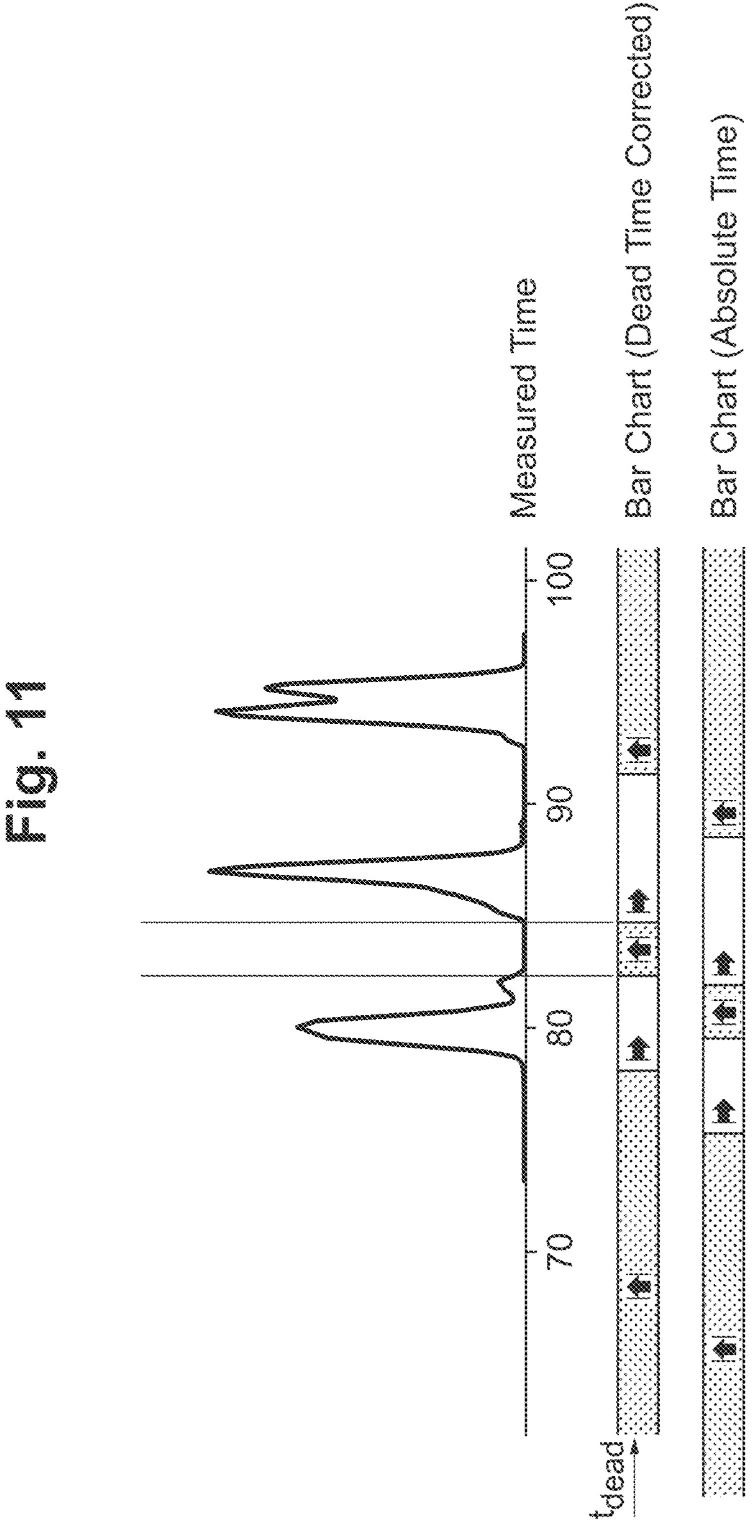
FIG. 11 illustrates a way in which the displayed chromatogram may be corrected for a "dead time"

Referring to FIG. 11, in order to correctly align the bar with the time axis of the ion mobility chromatogram, an offset is applied to the bar to correct for "dead time" ($t_{dead}$). This is the time taken for ions to travel from the IMS device to the detector i.e., the detector of the mass analyser. With this dead time offset applied, user interaction is straightforward in that modifications of the timing of instances of modes, e.g., dragging the boundaries of portions of the bar representing the modes, or adding new portions corresponding to new instances of modes, is directly correlated in the chromatogram.

It will be appreciated that a simulate chromatogram may be produced to assist in off-line method development, in which the mobility range or species of interest are specified by the user. Where only a mobility range is specified, it may be populated with a number of synthetic species, at, for example, regular intervals in mobility.

Figure 12:
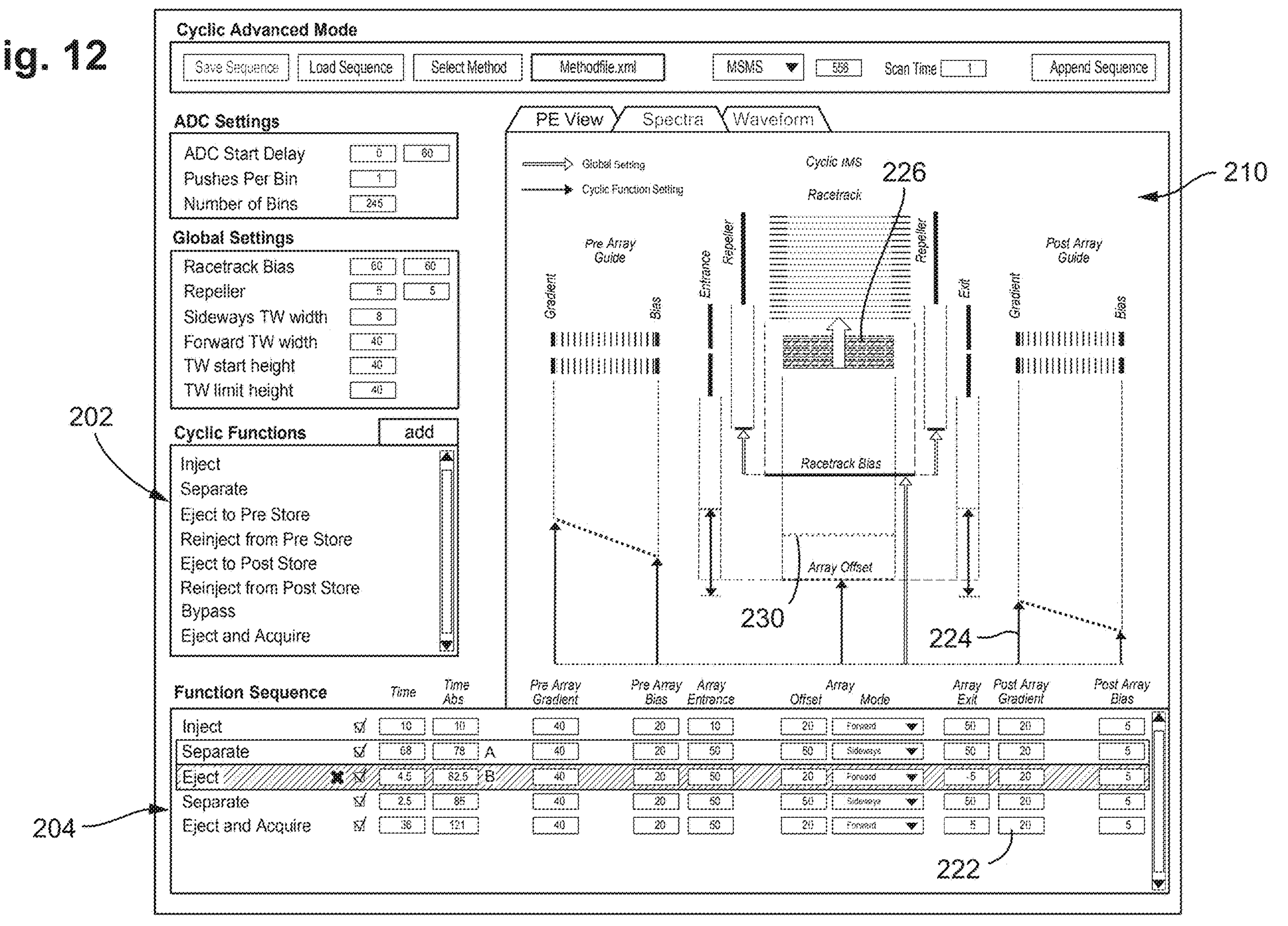
FIG. 12 illustrates the user interface in a second display mode, providing a potential energy diagram view.

The content displayed in the third area 210 of the interface may vary depending upon a selected display mode of the interface. In FIG. 10, a spectra display mode is selected using one of the tabs at the top of the area. Alternatively, the user may select a PE view tab. This will result in a view as shown in FIG. 12. It will be appreciated that other means of specifying the display mode may be used e.g., buttons etc. In the PE view, rather than the spectra, now a potential energy diagram is displayed in the third area 210 of the interface. This facilitates understanding of various voltage related parameters which may be specified by the user in relation to a given selected instance of a mode. In this case, the given selected instance of a mode is the "separate" mode, which has been highlighted in the table in area 204. The voltage related parameters may be voltages applied to different ion optic elements. In the example, these include an array gradient, pre array bias, array entrance voltage, array offset, array mode (being the direction of the travelling way in the array, which may be forward, sideways or reverse), array exit voltage, post array gradient and post array bias associated with the instance of the mode. The parameters which are specific to the particular instance of a mode are represented in lighter grey, while parameters which are set globally in relation to all instances of a mode are illustrated in darker grey (the voltages indicated by the arrows extending upwardly on either side of the race track bias, and the arrow extending upwardly to point to the right hand side of the line denoting the racetrack bias. In the potential energy diagram, a representation is provided of each one of the instance specific parameters which may be set by the user. These representations are in the form of arrows and horizontal bars.

The table in the second area 204 is initially populated with default values, and the diagram is initially based upon these. As the user modifies the default values for the voltage related parameters in the table in area 204, the potential energy diagram is adjusted to provide a graphical representation of the adjusted parameter. The arrow representing each given voltage related parameter in the diagram is vertically aligned with the applicable column in the table where that parameter may be set. This provides greater ease of use for the user and more intuitive operation. Thus, the column for setting the post array gradient 222 is aligned with the arrow 224 representing this parameter. Area 226 illustrates the direction of travel of the travelling waves in the array. Where a voltage setting is different to that provided for the applicable element in respect of a preceding instance of a mode in the sequence, the previous setting may be depicted by a grey line, as shown in area 230.

Some examples of sequences of instances of modes which may be input by a user to define experiments, will now be described by way of example only.

Figure 14:
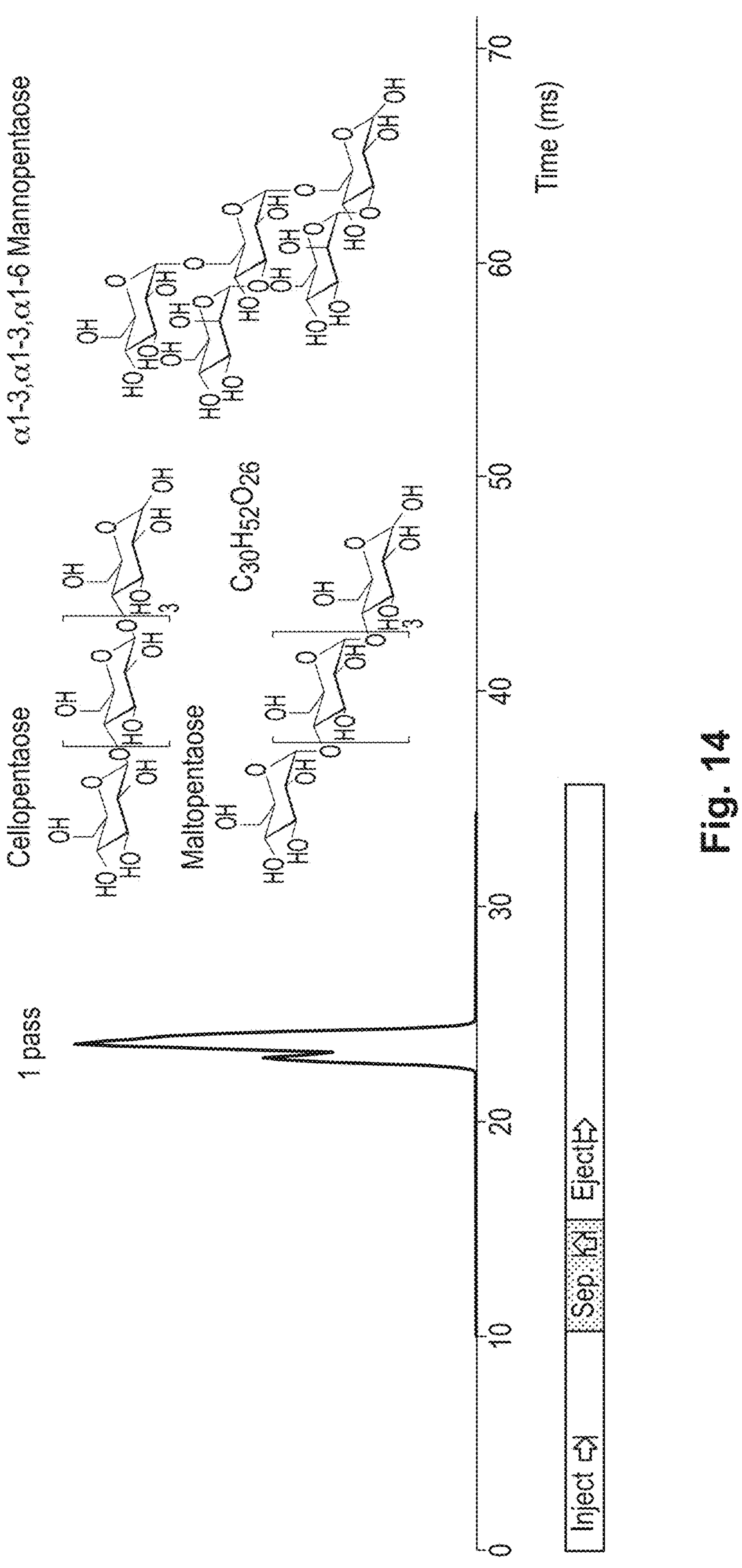
FIGS. 14-19 illustrate examples of sequence of instances of modes which may be specified to provide various experiments for analysing a mixture of three isomeric pentasaccharides.

FIG. 14 shows an ion mobility chromatogram obtained when a sample including three isomerric pentasaccharides as shown is subjected to a single pass i.e., one cycle in the separator of the cyclic IMS device disclosed in FIGS. 1-8B. The chromatogram is indicative of the intensity of ions detected with respect to time (the y axis is indicative of intensity in the chromatograms shown in FIG. 14 onward). The isomeric pentasaccharides are cellopentaose, maltopentaose, and branched mannopentaose. The collision cross sections of the iosbaric pentasaccharides differs, with cellopentaose having a collision cross section (CCS) less than maltopentaose, which, in turn, has a CCS less than the branched mannopentaose. A quadrupole filter at 851 m/z is used, and the ions are detected as singly charged $Na^+$ adducts. The ions generated in the source are sodium adducts and have a +1 charge state. The ions are m/z filtered by the quadrupole filter prior to mobility analysis. The experiment includes three modes; inject, separate and eject for detection. The timings of the modes are indicated by the bar aligned with the time axis. Here it may be seen that the resolution of the chromatogram obtained does not allow all three isomeric pentasaccharides to be identified.

Figure 15:
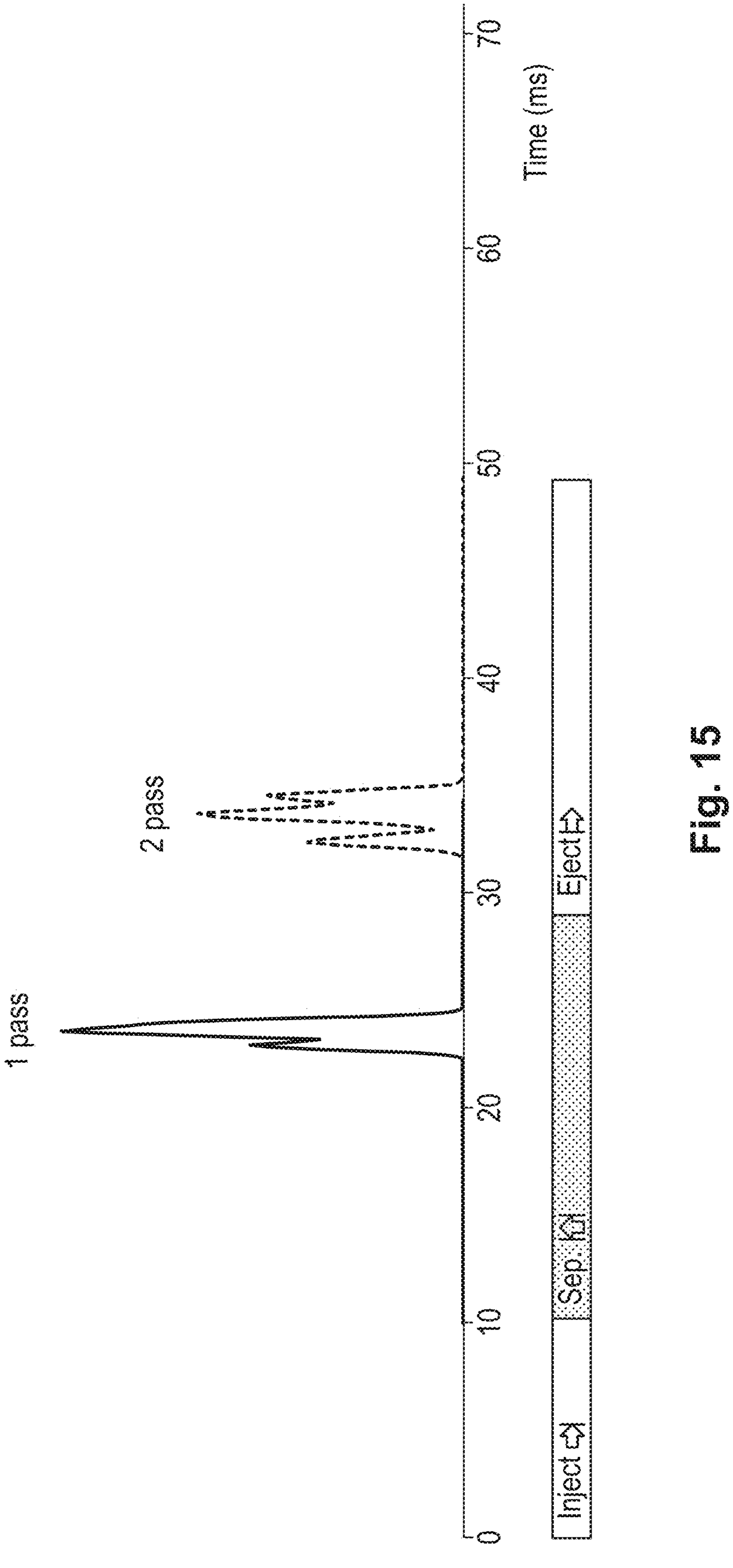

The user now changes the timing of the separate mode. This may be done by dragging the boundaries of the portion of the bar representing the mode adjacent a display of the real time chromatogram in an applicable mode of the user interface as described above. The user increases the length of the separate mode such that ions will perform two passes i.e., cycles of the separator of the IMS device before being ejected for detection. The sequence of modes is shown in the bar in FIG. 15, with the new separate mode highlighted. The resulting chromatogram is shown in lighter grey in FIG. 15. The result from the first experiment is shown again in black, for comparative purposes. It may be seen that now the three isomeric pentasaccharides may be identified.

Figure 16:
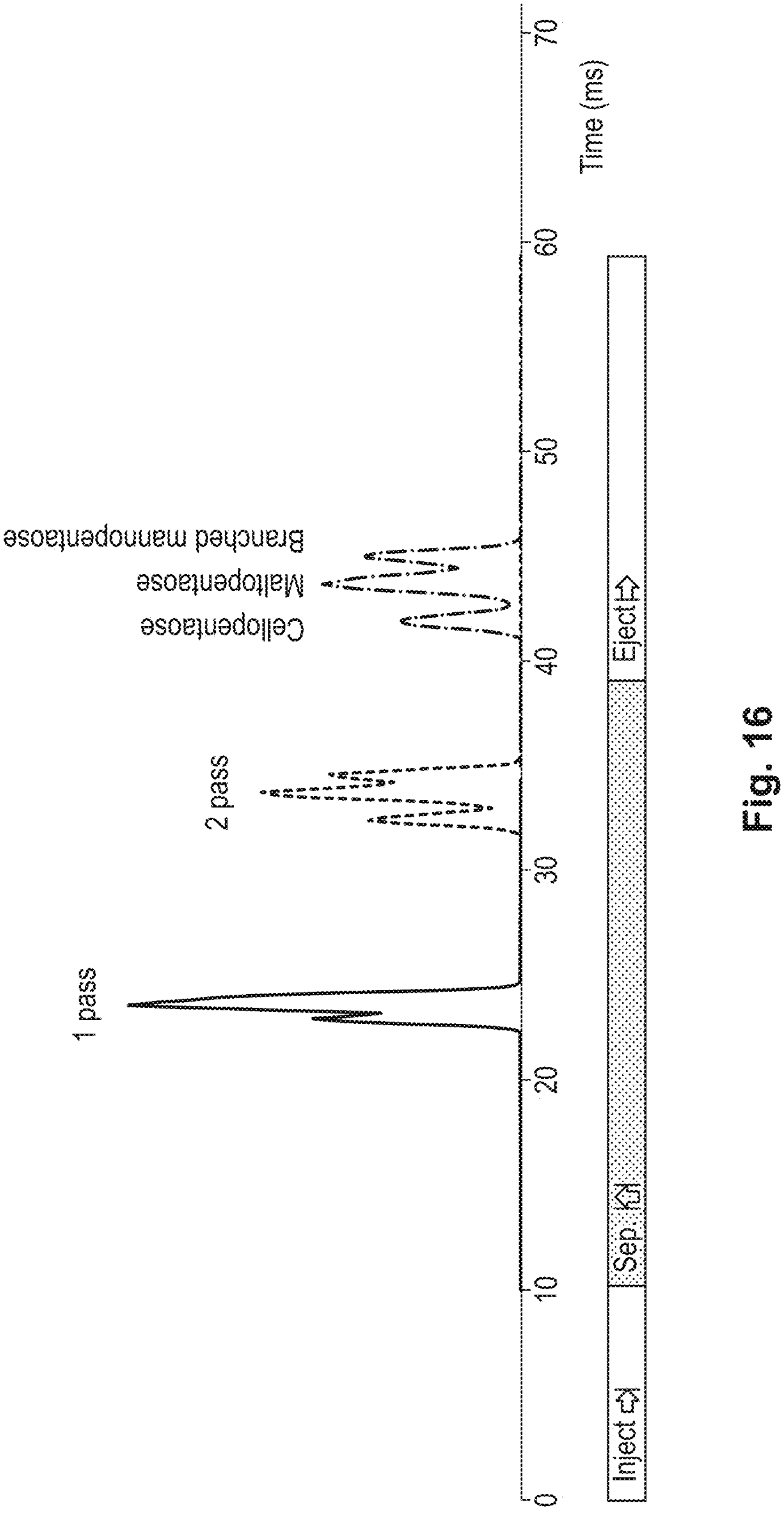

FIG. 16 illustrates the chromatogram obtained following a further change in the timing of the separate mode, so that ions perform three passes i.e., cycles in the IMS device separator. The resulting chromatogram is shown in FIG. 16 in the lightest grey, with the previous chromatograms obtained using the single pass and two pass settings shown for comparative purposes. The individual isomeric pentasaccharides may now be more clearly identified, with further features visible. The bar shows the associated sequence of instances of modes, with the new, longer separate mode highlighted.

Further experiments may be performed, lengthening the separate mode still further to result in ions performing yet more passes in the separator to allow yet more features to become visible. It will be appreciated that the user interface disclosed herein allows a user to rapidly adjust the timing of the separate mode based on real time data to provide greater resolution as required.

Figure 17:
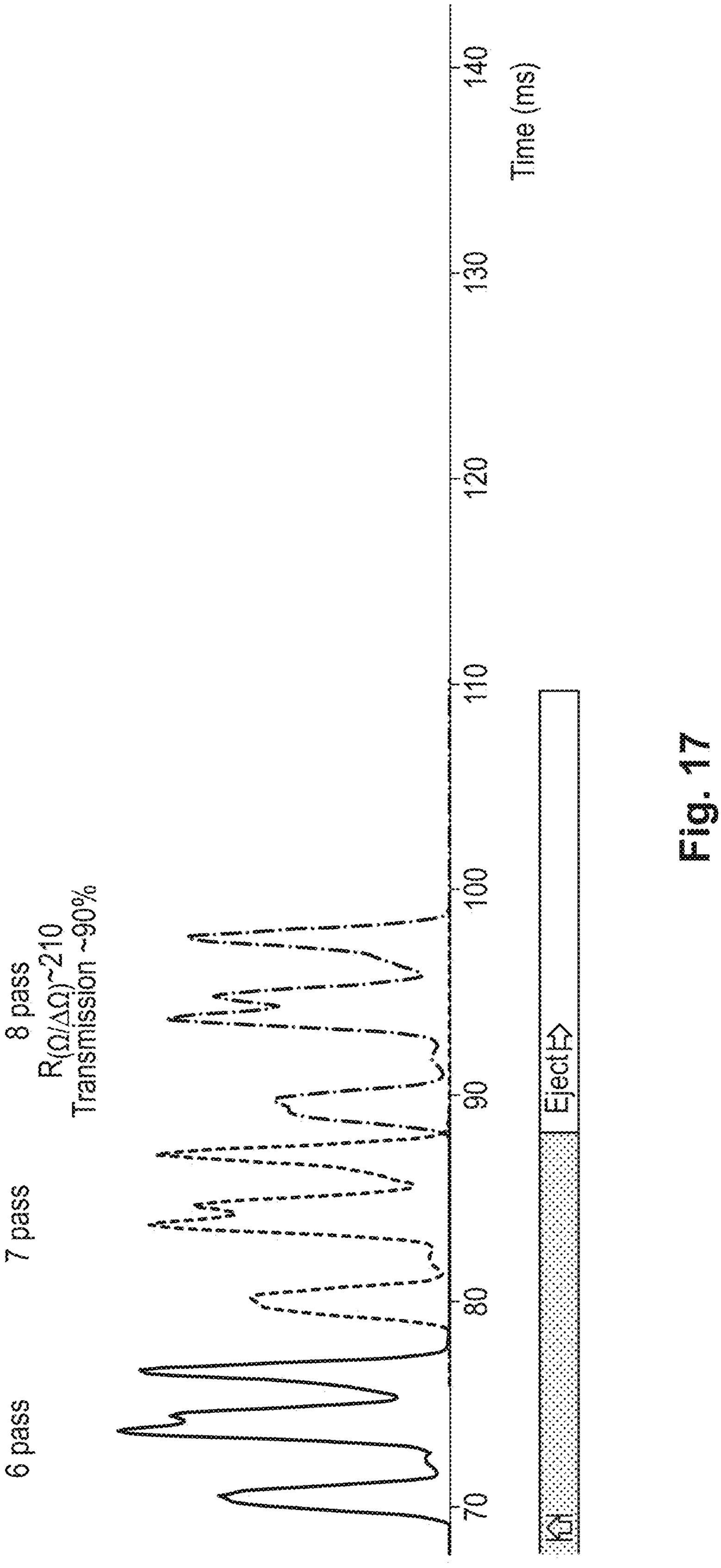

FIG. 17 illustrates yet other functions that may be performed. FIG. 17 illustrates a portion of a chromatogram which is obtained after increasing the separate mode such that ions are subjected to 8 passes in the separator. This shows the chromatograms obtained at 6 and 7 passes respectively for comparative purposes. It may be seen that the chromatogram at 8 passes includes two middle peaks, which correspond to maltopentaose, and two outer peaks, corresponding to the other isomeric pentasaccharides.

Figure 18:
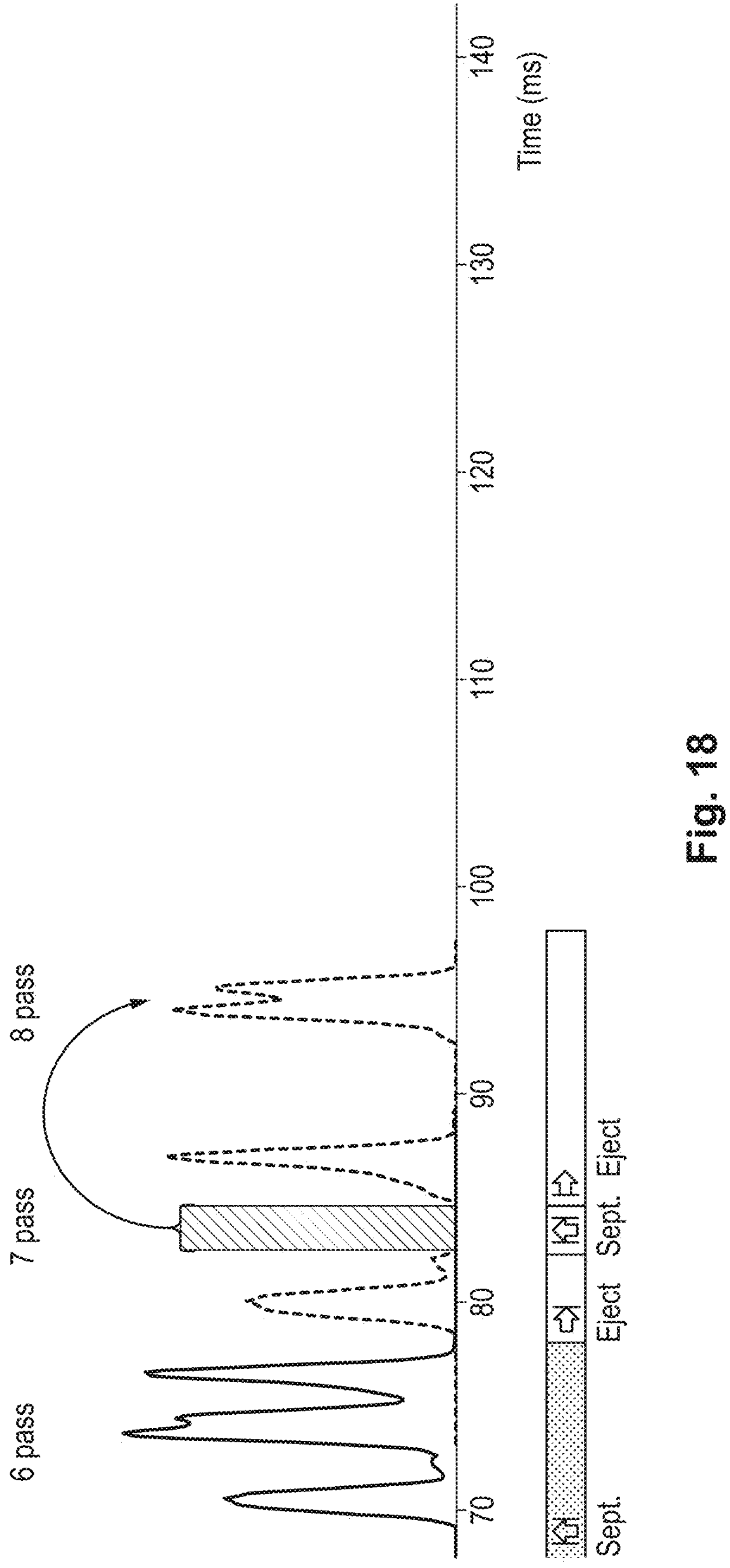

Now, rather than allowing the peaks corresponding to all three isomeric species to be subjected to a separation mode including 8 cycles, the user might want to select only the middle peaks corresponding to maltopentaose for further separation in the IMS device separator. FIG. 18 illustrates how this may be done by selecting a suitable sequence of instances of modes. The user now specifies an instance of the eject for detection mode having a timing such that the ions corresponding to the faster outer peak are ejected after 7 passes. A further instance of a separate mode is specified subsequent to this instance of an ejection mode having a timing to result in a further cycle of separation being performed only in respect of the middle two peaks corresponding to maltopentaose, which have not been ejected. Finally, an eject mode for detection is specified to eject the ions corresponding to the other, slower outer peak corresponding to the third isomeric species, and subsequently, after they have emerged from the additional separation cycle, the ions corresponding to the middle two peak corresponding to maltopentaose. The resultant chromatogram showing the two middle peaks after 8 passes is shown in FIG. 18.

Figure 19:
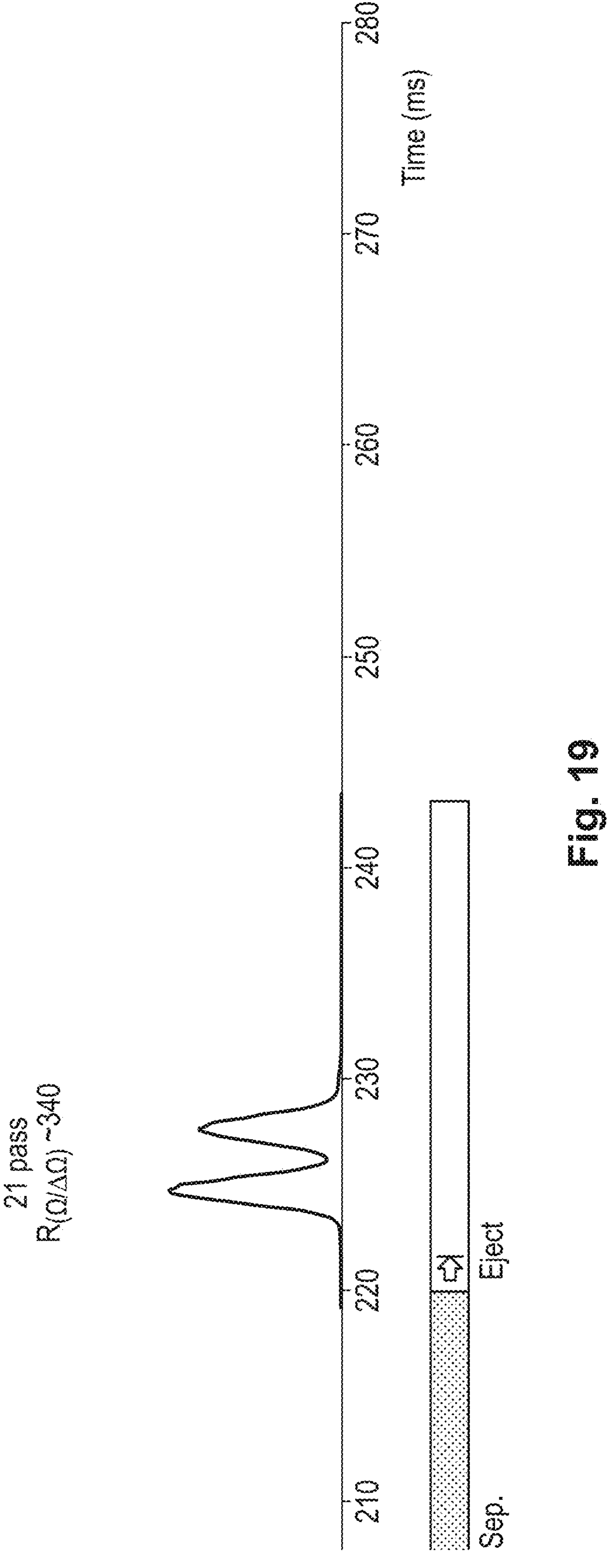

After 21 passes, the maltopentaoese is separated into the two peaks shown in FIG. 19. If more resolution is needed, an increased time for the separate mode can be selected. An eject mode may be specified with a timing to eject the faster component i.e., the left-hand peaks for detection. An instance of an eject to store mode may be specified in relation to the faster peak. The ions may be subjected to selective activation, and subsequent detection. It will be appreciated that corresponding mass spectra may also be obtained, although are not illustrated.

It will be appreciated that in FIGS. 16-19, the instances of an "eject" mode refer to a mode of ejection for detection, unless specified otherwise.

A similar process may be performed in relation to the ions corresponding to the faster component to obtain further information about the components.

The above examples are merely exemplary of the flexibility the embodiments herein provide for a user to customise and modify experiments as required, in embodiments in real-time based upon obtained data relating to a previous experiment.

Figure 20:
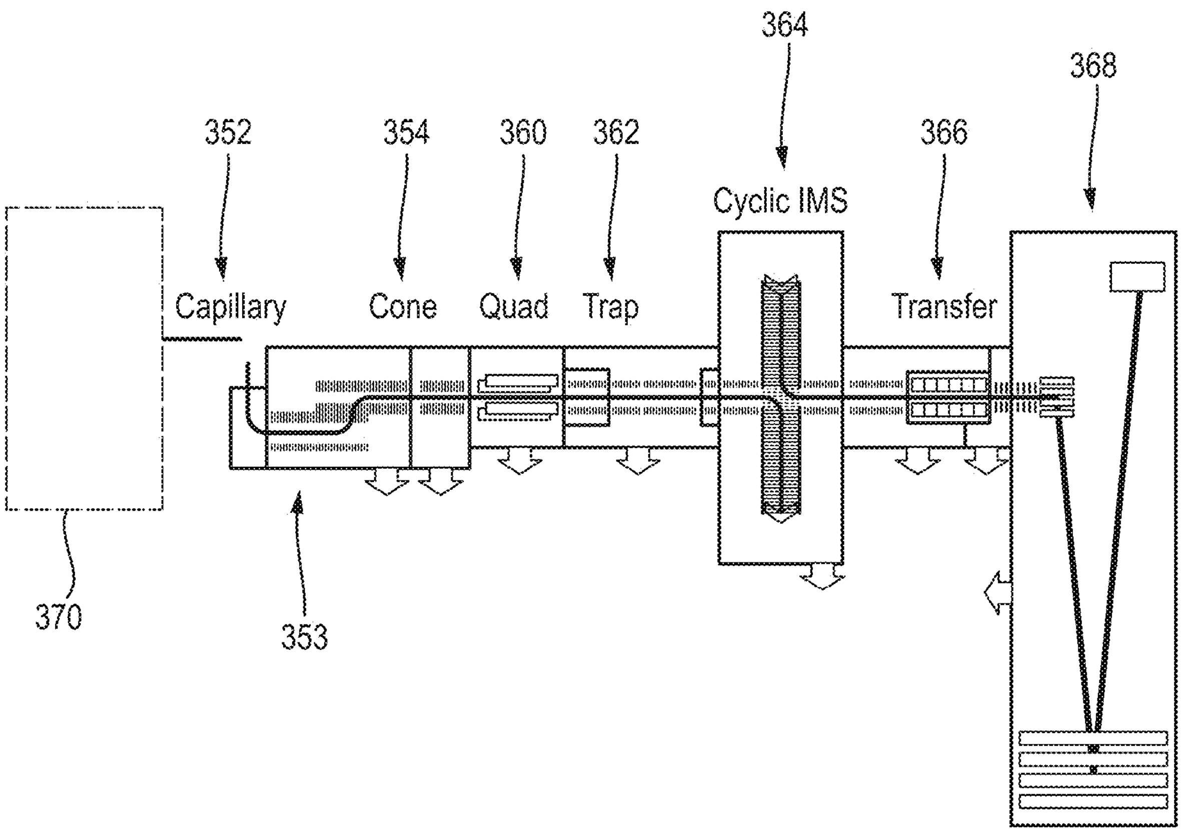
FIG. 20 is a schematic illustration of a spectrometer to which a further embodiment may be applied.

In some embodiments the ion mobility separation device forms part of a spectrometer including an upstream liquid or gas chromatography device. One example of such an arrangement is shown in FIG. 20.

The spectrometer 350 includes a capillary 352, an ion guide 353, a differential pumping aperture 354, through which ions pass from the ion source into the remainder of the spectrometer, a quad filter 360, an ion trap 362, a cyclic ion mobility separation device (IMS) 364, transfer optics 366 and a Time of Flight mass analyser 368. The spectrometer 350 further comprises a liquid chromatography (LC) device schematically indicated as 370. Analyte components eluting from the LC device 370 enter the capillary 352.

Analyte components eluting from the LC device will enter the remainder of the spectrometer through the capillary in groups, depending upon their elution time. The groups of analyte components may be separated by considerable periods of time, in the order of minutes, or at least tens of seconds. The Applicant has recognised that the interface described herein may be used to set conditions for use in an experiment in relation to different sets of the components.

Figure 21:
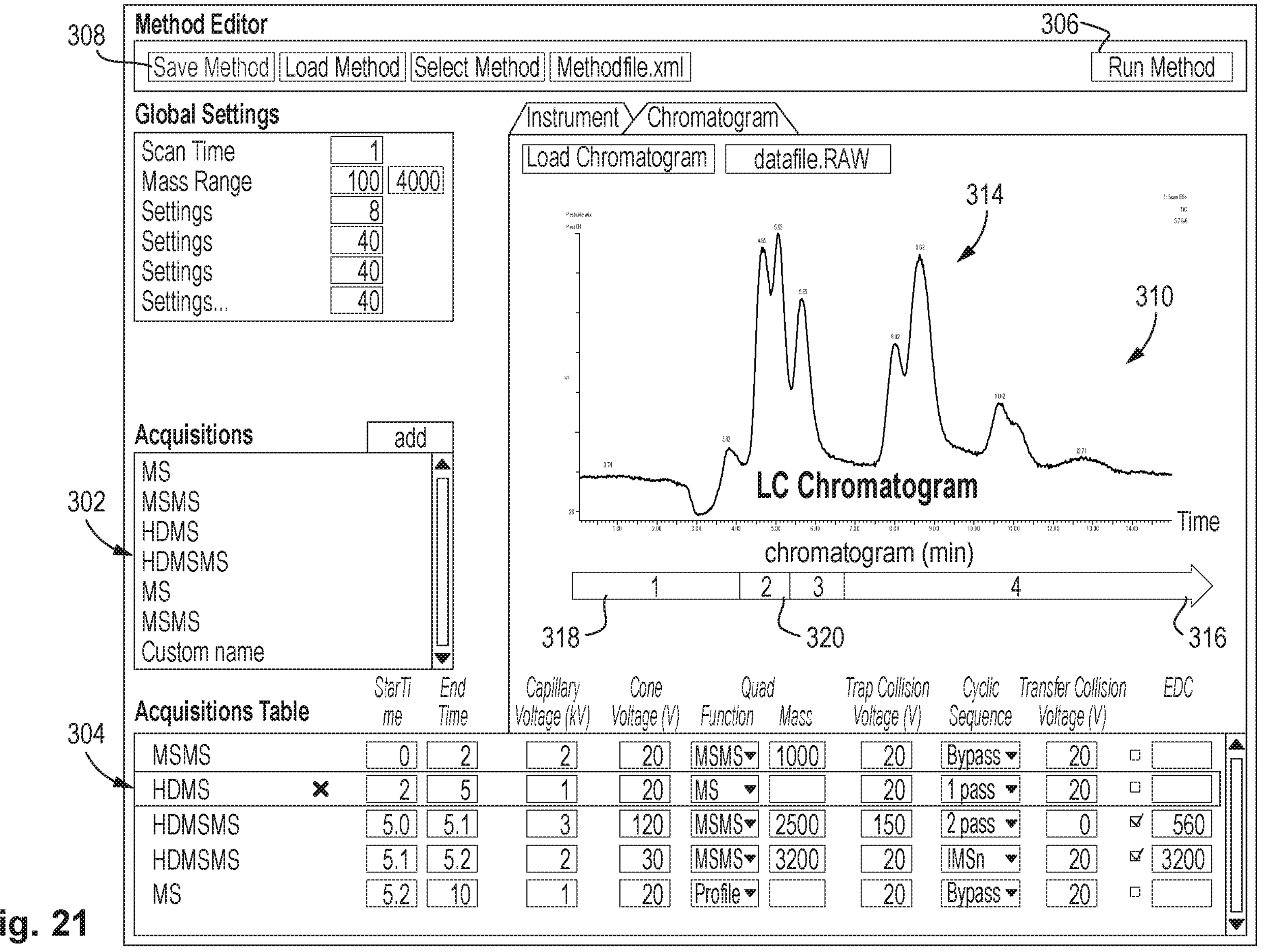
FIG. 21 illustrates a user interface for specifying instances of modes for use in specifying operating conditions to be used when analysing different sets of analyte components which have eluted from a liquid chromatography device upstream of an ion mobility separation device.

FIG. 21 illustrates an embodiment of a user interface which may be used in this way. In some embodiments, user interface may be presented to a user via a display device of a computing device (see, for example, FIG. 25). The computing device may be communicatively coupled to an IMS device and/or spectrometer or otherwise operative to receive information therefrom (for instance, via a data store). In various embodiments, computing device may include processing circuitry or other logic(s) for implementing the user interfaces, methods, processes, and/or the like according to various embodiments. Processing circuitry or logic may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 2100. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

The user interface includes a first area 302 in which a pool of available modes of the spectrometer are listed e.g., MS, MSMS, HDMS etc. This list of modes is merely exemplary. Each mode is associated with some predefined conditions, including a number of cycles of the IMS device, or whether it is to be bypassed, and a condition controlling the function of the quad filter. The user is also able to specify additional parameters in relation to each selected instance of a mode and a timing of the instance of the mode. Each instance of a mode may be used to set the conditions of operation of the IMS device, and other components of the spectrometer, including the quad filter, when analysing a particular set of analyte components eluting from the LC separation device to be considered in an experiment. A sequence of such modes may be built up to provide an experiment in which multiple sets of analyte components are considered.

The user may select any one of the modes in the pool to add an instance of the mode to a list of selected instances of modes in a second region 304 of the interface. This list of selected instances of modes is in the form of a table, including columns in which various parameters for configuring the spectrometer in respect of each selected instance of a mode are displayed. These parameters include parameters relating to the operation of a quad filter, a collision cell, and of an IMS device ("cyclic sequence") e.g., whether the IMS device is to be bypassed, or otherwise the number of passes to be performed. For example, in the illustrated embodiment, the following parameters may be set;

- Capillary Voltage—controls the electrospray ionisation of the liquid sample.
- Cone Voltage—controls the desovlation of analyte molecules.
- Trap Collision Voltage—controls the collision induced dissociation (CID) of ions, before ion mobility separation.
- Transfer Collision Voltage—controls the collision induced dissociation (CID) of ions, after ion mobility separation.
- An EDC (enhanced duty cycle) mode may be selected.

The parameters include parameters relating to a timing of the instance of the mode i.e., a start time and end time.

In this example, the "cyclic sequence" parameter is preset as a default, as is the quad filter function parameter are greyed out. These parameters may be pre-set when setting up the available modes for selection in the area 302. The modes may be set up in advance and saved with appropriate labels (here MS, MSMS, HDMS etc). However, the other parameters of the instances of the modes are user specified. As mentioned below, the default values may be changed by a user using the drop-down menus.

A user may delete instances of modes once added to the list in the second area of the interface and/or reorder the instances of modes as required, until an ordered sequence of instances of acquisition modes desired to be run for analysing different sets of ions in an experiment is obtained. Once the user is happy with the sequence, and all parameters have been set as desired, the user may select a "run method"

button 306 to initiate performance of the sequence of modes. This button will also initiate chromatographic separation in the upstream device.

The user may also save a sequence of instances of modes and the associated parameters once specified using a save method button 308. A "load method" button may be used to load a saved sequence of modes. It will be appreciated that the list of available modes in the pool may be customised, and need not correspond to the example given.

As shown in FIG. 21, in the table in the second area 304, in respect of each instance of a mode, columns for adding timing parameters are provided. These include a start time and an end time. The start time and end time are chosen to result in the mode being applied to a particular set of analyte components being considered in the experiment. The set of analyte components is a set of analyte components that is expected to elute from the LC device and enter the remainder of the spectrometer for analysis in that time period. It will be appreciated that the sets of analyte components that elute from the LC device will provide corresponding sets of ions arriving at the IMS device.

Some ways in which timing parameters in relation to an instance of a mode may be defined will now be described.

In a third area 310 of the interface, a liquid chromatography (LC) chromatogram is displayed based on components eluting from the LC device 370. The chromatogram may be obtained in a previous run using the sample to be considered in the experiment, and saved. The chromatogram may then be loaded into the area 310 for use in setting the timings of the modes for use in the experiment being set up. The user is able to interact with the chromatogram to specify timings in relation to selected instances of modes in the manner described above in relation to the earlier embodiment, with reference to FIG. 10. As may be seen in FIG. 21, a horizontal bar 316 is displayed aligned with the time axis of the chromatogram 314. The bar includes a plurality of horizontal portions, 318, 320 etc., each representing a given instance of a mode selected by the user.

When the user selects an instance of a mode in the table in area 304, the boundaries of the corresponding portion of the horizontal bar representing that instance of a mode may be manipulated by the user in a similar manner to that described in the earlier embodiment to set the timing for the mode.

The user may set the timings of modes such that the mode will be applied to a given set of ions that is expected to elute at that time for analysis. When the experiment is run, the timings of the elutions of analyte components may be expected to correspond to the timings in the run used to provide the chromatogram for use in setting up the mode timings.

It will be seen that other parameters of components of the spectrometer may also be specified by the user in relation to modes, including parameters relating to the operation of the capillary, the cone, and the collision trap.

Figure 22:
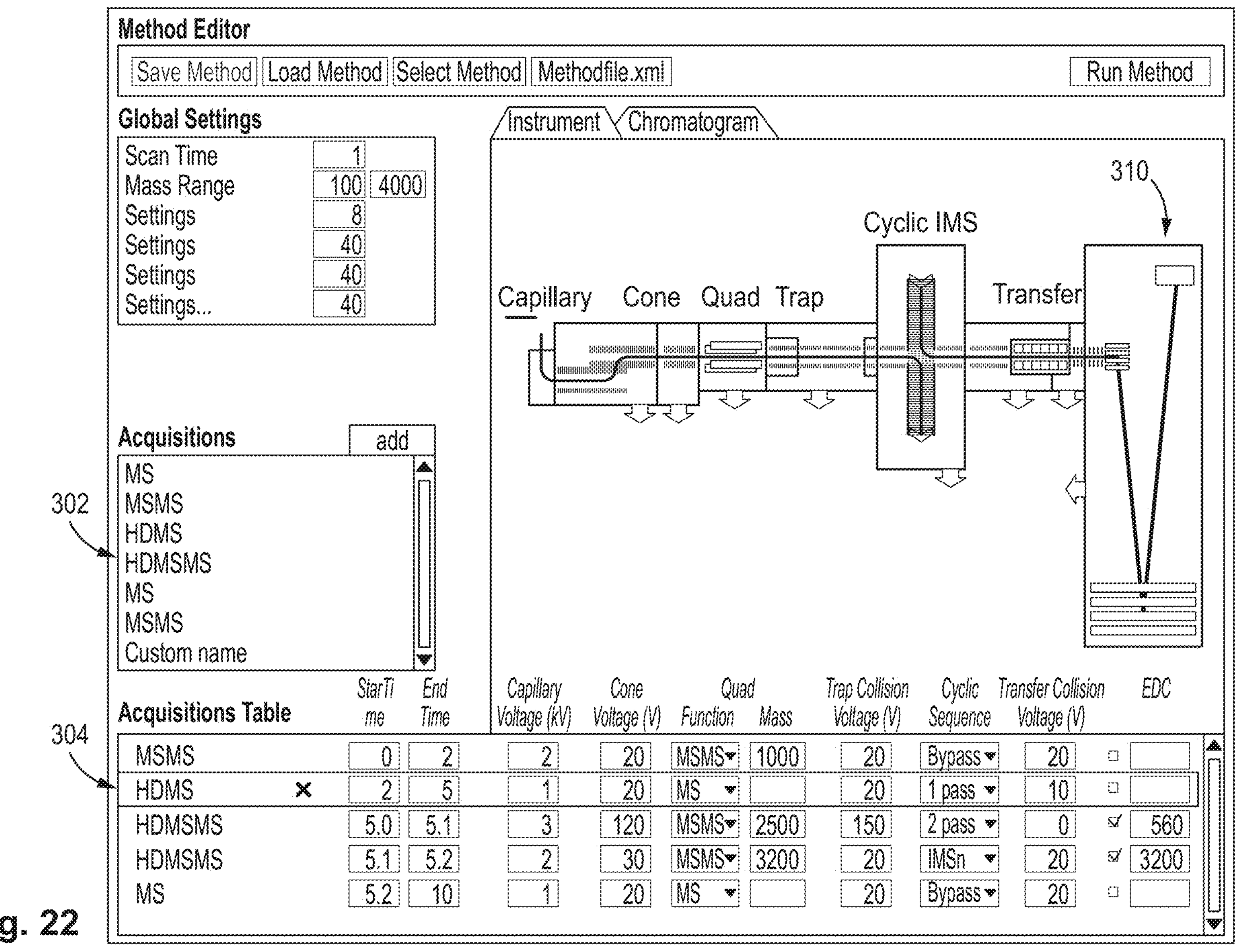
FIG. 22 illustrates the user interface of FIG. 21 in a second display mode, providing an overview of the spectrometer.

As with the earlier embodiment, the third area 310 of the interface may display different content, depending upon a selected display mode. Rather than displaying the chromatogram as shown in FIG. 21 (obtained by selecting the "chromatogram" tab), an "instrument" view may instead be shown, as illustrated in FIG. 22. This illustrates various components of the spectrometer whose operating parameters may be set using the modes, facilitating understanding of the settings used to define the modes.

The above techniques are equally applicable when other forms of upstream analyte separation device(s) are used, such as another form of chromatography device e.g., a gas chromatography device, or indeed other forms of analyte separation device which may result in sets of analyte components eluting at different times, giving rise to sets of ions arriving at different times at the IMS. Such a separation device may be an ionic or non-ionic separation device. For example, a non-cyclic IMS (ion mobility separation) device might be used. The separation device may, for example, comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The upstream separation device(s) should result in sets of analyte components (and hence ions arriving at the IMS being controlled) being separated by time periods which are relatively long compared to the periods separating ions which may be expected when using the IMS whose operation is controlled (which are typically in the order of milliseconds).

Some examples of modes which may be available for use in building up a sequence of instances of modes in these further embodiments will now be exemplified. These modes may be referred to as "acquisition modes" and are associated with certain pre-set default conditions for controlling operation of the quad filter and cyclic IMS device.

- "MS" acquisition mode may involve the quad filter operating in non-resolving (filtering) mode. Cyclic sequence is set such that ions bypass the cyclic IMS device.
- "MSMS" acquisition mode may involve quad filter operating in resolving mode. Cyclic sequence is set such that the mass selected ions bypass the cyclic IMS device.
- "HDMS" acquisition mode may involve the quad filter operating in non-resolving mode. Cyclic sequence is set such that ions travel around the cyclic IMS device for a number of passes defined for the mode. Alternatively, other cyclic IMS sequences can be chosen to perform IMS/IMS (or IMS^n) experiments.

In an IMS/IMS experiment, ions would be subjected to 1 (or more) passes around the cyclic IM (ion mobility) separator. Then a subset of ions will be transferred to the pre array store (Eject to Pre Store function). Then ions from the pre array store will be activated and transferred to cyclic IM separator and subjected to 1 or more passes around the cyclic IM separator. In general, precursor ions may be mobility selected, dissociated and product ions separated according to their mobility (IMS/IMS). This can be done multiple times for example IMS/IMS/IMS or IMS^n.

- "HDMSMS" acquisition mode may involve the quad filter operating in resolving mode. Cyclic sequence is set such that the mass selected ions travel around the cyclic IMS device for a number of passes defined for the mode. Alternatively, other cyclic IMS sequences can be chosen to perform IMS/IMS (or IMS^n) experiments.

In the illustrated example, further customisation is achieved by controlling the desolvation of ions (via Cone Voltage setting) and pre- and post-IMS dissociation of ions (via Trap and Transfer Collision Voltages).

It will be appreciated that these further embodiments may be used independently or in combination with the earlier embodiments used to build up a sequence of operations of the IMS device, e.g., as illustrated in FIGS. 10 and 12. It will be seen that there is a default pre-set cyclic sequence for each acquisition mode. Custom cyclic sequences can also be selected from the drop-down menu in the cyclic sequence column. The options which may be selected may include a cyclic sequence for controlling the IMS device set up and saved e.g., using button 208 in accordance with the earlier embodiments.

Included herein are one or more logic flows representative of exemplary methodologies for performing novel aspects of the disclosed embodiments. While, for purposes of simplicity of explanation, the one or more methodologies shown herein are shown and described as a series of acts, those skilled in the art will understand and appreciate that the methodologies are not limited by the order of acts. Some acts, steps, and/or the like may, in accordance therewith, occur in a different order and/or concurrently with other acts from that shown and described herein. In addition, certain acts, steps, and/or the like may be excluded. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

FIG. 23 illustrates an embodiment of a logic flow 2300. Logic flow 2300 may be representative of some or all of the operations executed by one or more embodiments described herein, such as a computing device implementing the processes and/or user interfaces of FIGS. 10-19 and/or the computer architecture 2500.

At block 2302, logic flow 2300 may display to a user via a user interface a pool of modes of operation of the ion mobility separation device, wherein each one of the modes is selectable by the user for inclusion in an experiment. Logic flow 2300 may receive, via the user interface, an indication from the user of a selection of one or more instance of each one of a plurality of the modes from the pool to be included in an experiment at block 2304. Logic flow 2300 may receive, via the user interface, an indication of a set of one or more parameters for controlling the ion mobility separation device in implementing a selected instance of a mode, and the method further comprises receive, via the user interface, in respect of one or more of the selected instances of modes, an indication from the user of a set of one or more parameters for controlling the ion mobility separation device in implementing the instance of the mode at block 2306. At block 2308, logic flow 2300 may control the operation of the ion mobility separation device in accordance with the received indications.

FIG. 24 illustrates an embodiment of a logic flow 2400. Logic flow 2400 may be representative of some or all of the operations executed by one or more embodiments described herein, such as a computing device implementing the processes and/or user interfaces of FIGS. 20-22 and/or the computer architecture 2500. In some embodiments, logic flow 2400 may include controlling the operation of a spectrometer comprising an ion mobility separation device, wherein the spectrometer further comprises one or more analyte separation devices upstream of the ion mobility separation device, wherein, in use, different sets of ions enter the ion mobility separation device at different times based on sets of analyte components eluting at different times from the one or more analyte separation devices upstream thereof.

At block 2402, logic flow 2400 may display to a user via a user interface a pool of modes of operation for controlling operation of at least the ion mobility separation device of the spectrometer, wherein each one of the modes is selectable by the user for inclusion in an experiment. Logic flow 2400 may receive, via the user interface, an indication from the user of a selection of one or more instance of each one of a plurality of the modes from the pool to be included in an experiment, wherein each instance of a mode is for use in controlling the operation of at least the ion mobility separation device of the spectrometer when analysing a respective one of the sets of analyte components eluting from the one or more analyte separation devices at different times at block 2404. Logic flow 2400 may allow a user to provide an indication of one or more parameters relating to a selected instance of a mode, the one or more parameters including one or more parameters indicative of a timing of a selected instance of a mode, and receive, via the user interface, in respect of each one of the selected instances of modes, an indication from the user of a set of one or more parameters including one or more parameters indicative of a timing of the selected instance of the mode, the timing of the selected instance of the mode being selected to result in the instance of the mode being performed in relation to analysing a particular one of the sets of one or more analyte components eluting from the one or more upstream analyte separation device at block 2406. At block 2408, logic flow 2400 may control the operation of at least the ion mobility separation device of the spectrometer in accordance with the received indications.

Figure 25:
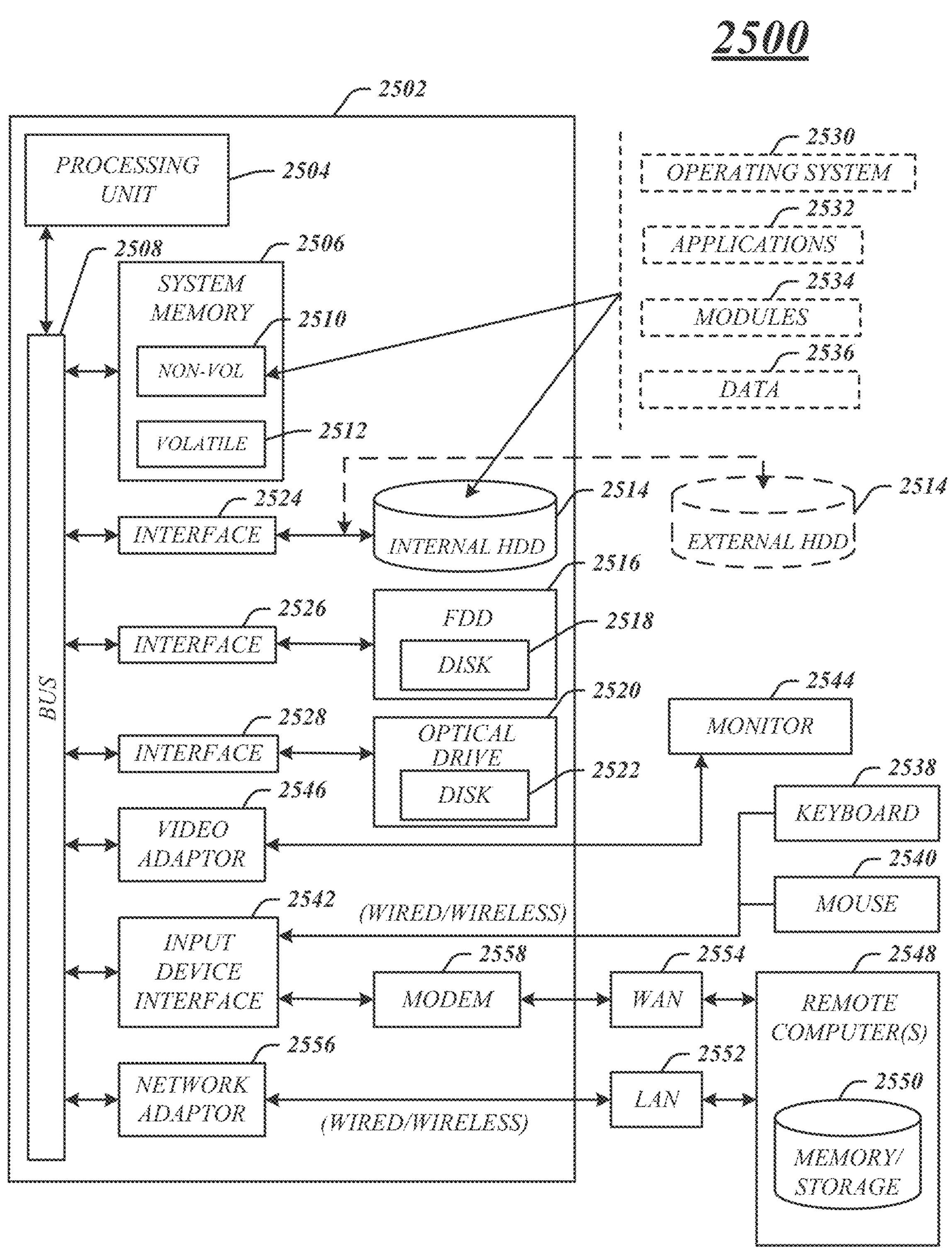
FIG. 25 illustrates an embodiment of a computing architecture.

FIG. 25 illustrates an embodiment of an exemplary computing architecture 2500 suitable for implementing various embodiments as previously described. In various embodiments, the computing architecture 2500 may comprise or be implemented as part of an electronic device. In some embodiments, the computing architecture 2500 may be representative, for example, of a computing device operative to implement the processes and user interfaces of FIGS. 10-22. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 2500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2500.

As shown in FIG. 25, the computing architecture 2500 comprises a processing unit 2504, a system memory 2506 and a system bus 2508. The processing unit 2504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi processor architectures may also be employed as the processing unit 2504.

The system bus 2508 provides an interface for system components including, but not limited to, the system memory 2506 to the processing unit 2504. The system bus 2508 can be any of several types of bus structure that may further interconnect to a memory bus (with or without a memory controller), a peripheral bus, and a local bus using any of a variety of commercially available bus architectures. Interface adapters may connect to the system bus 2508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 2506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 25, the system memory 2506 can include non-volatile memory 2510 and/or volatile memory 2512. A basic input/output system (BIOS) can be stored in the non-volatile memory 2510.

The computer 2502 may include various types of computer-readable storage media in the form of one or more lower speed memory units, including an internal (or external) hard disk drive (HDD) 2514, a magnetic floppy disk drive (FDD) 2516 to read from or write to a removable magnetic disk 2518, and an optical disk drive 2520 to read from or write to a removable optical disk 2522 (e.g., a CD-ROM or DVD). The HDD 2514, FDD 2516 and optical disk drive 2520 can be connected to the system bus 2508 by a HDD interface 2524, an FDD interface 2526 and an optical drive interface 2520, respectively. The HDD interface 2524 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 2510, 2512, including an operating system 2530, one or more application programs 2532, other program modules 2534, and program data 2536. In one embodiment, the one or more application programs 2532, other program modules 2534, and program data 2536 can include, for example, the various applications and/or components of computing device 110.

A user can enter commands and information into the computer 2502 through one or more wire/wireless input devices, for example, a keyboard 2538 and a pointing device, such as a mouse 2540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2504 through an input device interface 2542 that is coupled to the system bus 2508, but can be connected by other interfaces such as a parallel port, IEEE 1394 serial port, a game port, a USB port, an IR interface, and so forth.

A monitor 2544 or other type of display device is also connected to the system bus 2508 via an interface, such as a video adaptor 2546. The monitor 2544 may be internal or external to the computer 2502. In addition to the monitor 2544, a computer typically includes other peripheral output devices, such as speakers, printers, and so forth.

The computer 2502 may operate in a networked environment using logical connections via wire and/or wireless communications to one or more remote computers, such as a remote computer 2548. The remote computer 2548 can be a workstation, a server computer, a router, a personal computer, portable computer, microprocessor-based entertainment appliance, a peer device or other common network node, and typically includes many or all of the elements described relative to the computer 2502, although, for purposes of brevity, only a memory/storage device 2550 is illustrated. The logical connections depicted include wire/wireless connectivity to a local area network (LAN) 2552 and/or larger networks, for example, a wide area network (WAN) 2554. Such LAN and WAN networking environments are commonplace in offices and companies, and facilitate enterprise-wide computer networks, such as intranets, all of which may connect to a global communications network, for example, the Internet.

When used in a LAN networking environment, the computer 2502 is connected to the LAN 2552 through a wire and/or wireless communication network interface or adaptor 2556. The adaptor 2556 can facilitate wire and/or wireless communications to the LAN 2552, which may also include a wireless access point disposed thereon for communicating with the wireless functionality of the adaptor 2556.

When used in a WAN networking environment, the computer 2502 can include a modem 2558, or is connected to a communications server on the WAN 2554, or has other means for establishing communications over the WAN 2554, such as by way of the Internet. The modem 2558, which can be internal or external and a wire and/or wireless device, connects to the system bus 2508 via the input device interface 2542. In a networked environment, program modules depicted relative to the computer 2502, or portions thereof, can be stored in the remote memory/storage device 2550. It will be appreciated that the network connections shown are exemplary and other means of establishing a communications link between the computers can be used.

The computer 2502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. An apparatus for controlling the operation of an ion mobility separation device, the apparatus comprising a control circuit configured to:

control a user interface to display to a user a pool of modes of operation of the ion mobility separation device, wherein the pool of modes comprises a plurality of modes selectable by the user for inclusion in an experiment; and in response to receiving, via the user interface, an indication from the user of a selection of an instance of a mode of the plurality of modes:

control the ion mobility separation device to implement the instance of the mode in accordance with a set of one or more parameters for the instance of the mode.

2. The apparatus of claim 1, wherein the control circuit is configured to control the user interface to:

allow a value for a parameter of the set of one or more parameters to be configured by the user via the user interface.

3. The apparatus of claim 1, wherein the control circuit is configured to control the user interface to display to the user, via the user interface, the set of one or more parameters for the instance of the mode.

4. The apparatus of claim 1, wherein the control circuit is configured to, in response to receiving, via the user interface, an indication from the user of a selection of instances of plural modes of the plurality of modes:

control the ion mobility separation device to implement the instances of the plural modes in a sequence.

5. The apparatus of claim 4, wherein the control circuit is configured to control the user interface to allow the user to provide an indication of an order in which the selected instances of the plural modes are to be performed, and wherein said sequence is based on said indication of an order in which the selected instances of the plural modes are to be performed.

6. The apparatus of claim 1, wherein the control circuit is configured to automatically control the ion mobility separation device to implement an instance of each of one or more other modes in addition to the mode selected by the user via the user interface.

7. The apparatus of claim 6, wherein the control circuit is configured to control the user interface to allow the user to provide an indication of:

the order in which instances of the one or more other modes are to be performed relative to one another; and/or the order in which the mode selected by the user is to be implemented relative to a mode of said one or more other modes.

8. The apparatus of claim 6, wherein the control circuit is configured to control the user interface to:

allow a user to remove said selection of the instance of the mode, while preventing the user from removing an instance of said one or more other modes.

9. The apparatus of claim 5, wherein the control circuit is configured to control the user interface to:

display the indicated order in which the selected instances of the plural modes are to be performed; and allow the user to modify the indicated order in which the selected instances of the modes are to be performed.

10. The apparatus of claim 2, wherein the control circuit is configured to control the user interface to display different content depending upon a user selected display mode of the user interface, wherein the content displayed in the different display modes is content to assist the user in specifying the value for a parameter of the one or more parameters.

11. The apparatus of claim 10, wherein the control circuit is configured to cause the user interface to:

in a first display mode, display first content for assisting the user in specifying a value for a voltage related parameter; and in a second display mode, display second content for assisting the user in specifying a value for a timing related parameter.

12. The apparatus of claim 11, wherein the first content comprises a potential energy diagram based on the voltage related parameter, and wherein the control circuit is configured to control the user interface to modify the potential energy diagram in response to a change in the value for the voltage related parameter.

13. The apparatus of claim 11, wherein the second content comprises an ion mobility chromatogram obtained based on ions detected after passing through the ion mobility separation device, wherein the user may specify a value for the timing related parameter through interaction with the chromatogram.

14. The apparatus of claim 1, wherein the pool of modes comprises modes for one or more of: (i) the injection of ions to the ion mobility separation device; (ii) the separation of ions within the ion mobility separation device; (iii) the ejection of ions from the ion mobility separation device; and (iv) the storage of ions in an ion store of the ion mobility separation device.

15. The apparatus of claim 1, wherein the control circuit is configured to control the operation of the ion mobility separation device when performing ion mobility separation in relation to respective ones of different sets of ions entering the ion mobility separation device at different times, and wherein each instance of a mode is for use in controlling the operation of the ion mobility separation device when analysing a respective one of the different sets of ions.

16. The apparatus of claim 15, wherein the set of one or more parameters include a parameter indicative of a timing of the selected instance of a mode, the timing of the selected instance of the mode being selected to result in the instance of the mode being performed in relation to analysing a particular one of the sets of ions.

17. A mass and/or ion mobility spectrometer comprising the ion mobility separation device and the apparatus of claim 1.

18. A method of controlling the operation of an ion mobility separation device, the method comprising:

displaying to a user, via a user interface, a pool of modes of operation of the ion mobility separation device, wherein the pool of modes comprises a plurality of modes selectable by the user for inclusion in an experiment;

receiving, via the user interface, an indication from the user of a selection of an instance of a mode of the plurality of modes; and controlling the ion mobility separation device to implement the instance of the mode in accordance with a set of one or more parameters for the instance of the mode.

19. A non-transitory computer readable storage medium storing computer software code which, when executing on a processor, performs a method of controlling the operation of an ion mobility separation device, the method comprising:

displaying to a user, via a user interface, a pool of modes of operation of the ion mobility separation device, wherein the pool of modes comprises a plurality of modes selectable by the user for inclusion in an experiment;

receiving, via the user interface, an indication from the user of a selection of an instance of a mode of the plurality of modes; and controlling the ion mobility separation device to implement the instance of the mode in accordance with a set of one or more parameters for the instance of the mode.

* * * * *